(12) United States Patent
Washington

(10) Patent No.: US 7,995,652 B2
(45) Date of Patent: Aug. 9, 2011

(54) SYSTEMS AND METHODS FOR MULTI-STREAM IMAGE PROCESSING

(75) Inventor: Richard G. Washington, Marble Falls, TX (US)

(73) Assignee: UTC Fire & Security Americas Corporation, Inc., Bradenton, FL (US)

( * ) Notice: Subject to any disclaimer, the term of this patent is extended or adjusted under 35 U.S.C. 154(b) by 1394 days.

(21) Appl. No.: 10/804,478

(22) Filed: Mar. 19, 2004

(65) Prior Publication Data

US 2004/0218099 A1 Nov. 4, 2004

Related U.S. Application Data

(60) Provisional application No. 60/456,294, filed on Mar. 20, 2003.

(51) Int. Cl.
 *H04N 7/12* (2006.01)
 *H04N 7/14* (2006.01)
 *H04N 5/46* (2006.01)

(52) U.S. Cl. ............... 375/240.11; 348/14.12; 348/558

(58) Field of Classification Search ............ 375/240.11; 348/14.12, 558
 See application file for complete search history.

(56) References Cited

U.S. PATENT DOCUMENTS

| | | | |
|---|---|---|---|
| 4,198,656 A | 4/1980 | Mathisen | |
| 4,516,156 A | 5/1985 | Fabris et al. | |
| 4,698,672 A | 10/1987 | Chen et al. | |
| 5,027,222 A | 6/1991 | Shinbo et al. | |
| 5,095,196 A | 3/1992 | Miyata | |
| 5,216,502 A | 6/1993 | Katz | |
| 5,237,408 A | 8/1993 | Blum et al. | |
| 5,258,837 A | 11/1993 | Gormley | |
| 5,272,527 A | 12/1993 | Watanabe | |
| 5,450,140 A | 9/1995 | Washino | |
| 5,481,297 A | 1/1996 | Cash et al. | |
| 5,491,511 A | 2/1996 | Odle | |
| 5,521,634 A | 5/1996 | McGary | |
| 5,526,133 A | 6/1996 | Paff | |
| 5,537,157 A * | 7/1996 | Washino et al. | ............... 348/722 |
| 5,625,410 A * | 4/1997 | Washino et al. | ............... 348/154 |
| 5,850,352 A * | 12/1998 | Moezzi et al. | ................ 345/419 |
| 5,988,863 A | 11/1999 | Demos | |
| 6,025,882 A | 2/2000 | Geshwind | |
| 6,356,313 B1 | 3/2002 | Champion et al. | |

(Continued)

FOREIGN PATENT DOCUMENTS

EP 0570092 A 11/1993

(Continued)

OTHER PUBLICATIONS

Intellution's PlantTV™, 5 pages, publically available prior to U.S. Appl. No. 60/456,294, filed Mar. 20, 2003 from which the present U.S. Appl. No. 10/804,478 claims priority.

(Continued)

*Primary Examiner* — Tung Vo
*Assistant Examiner* — Anner Holder
(74) *Attorney, Agent, or Firm* — Kinney & Lange, P.A.

(57) ABSTRACT

Systems and methods for the processing of images over bandwidth-limited transmission interfaces, such as processing of high resolution video images over standard analog video interfaces, using multi-stream and/or multi-resolution analog methodology. The disclosed systems and methods may also be implemented to provide video resolutions across standard analog video interfaces in a manner that supports digital capture and imaging techniques obtain useful information from digitally zoomed and enhanced video.

58 Claims, 21 Drawing Sheets

U.S. PATENT DOCUMENTS

| | | | |
|---|---|---|---|
| 6,928,489 B2* | 8/2005 | Togashi | 709/247 |
| 7,113,654 B2* | 9/2006 | Russo | 382/298 |
| 2002/0141732 A1* | 10/2002 | Reese et al. | 386/46 |
| 2002/0196848 A1 | 12/2002 | Roman | |
| 2003/0048353 A1* | 3/2003 | Kenoyer et al. | 348/14.12 |
| 2003/0122971 A1 | 7/2003 | Tanaka | |
| 2004/0120591 A1 | 6/2004 | Brower et al. | |
| 2004/0184529 A1 | 9/2004 | Henocq et al. | |
| 2004/0223058 A1 | 11/2004 | Richter et al. | |
| 2005/0117055 A1 | 6/2005 | Kerofsky | |

FOREIGN PATENT DOCUMENTS

| | | |
|---|---|---|
| GB | 2123646 A | 2/1984 |
| WO | 0169911 A | 9/2001 |

OTHER PUBLICATIONS

Recording/Playback Software Free Inside Every lqeye3, Bright Noise, http://www.brightnoise.com/article.php?sid=80&mode=thread&order=0, (Posted: Oct. 24, 2003), printed off Internet on Aug. 2, 2004, 5 pgs.

IQinVision Press Release, IQinVision Announces the Availability of IQrecorder, The Complete IP Video Network System, http://www.eyeqcam.com/news/IQrecorder.htm, (Jan. 26, 2004), printed off Internet Aug. 31, 2004, 2 pgs.

IQrecorder Wins Award for Best IP Hardware At IIPSec, The Complete IP Video Network System, http://www.livesecure.nl/readon.php?content_id=42&categoryid=4, (Feb. 3, 2004), printed off Internet Aug. 2, 2004, 1 pg.

Industrial Video & Control, IVC's Video Systems Are User Configurable, Upgradeable, Scaleable From 1 to 100s of Cameras, and Are Easy to Install, http://www.ivcco.com/products, (labeled © 2003), printed off Internet Aug. 3, 2004, 3 pgs.

Industrial Video & Control, IVC's ActiveX Tools Make Integration Easy, http://ivcco.com/products/SCADAIntegration.html, (labeled © 2003), printed off Internet Aug. 3, 2004, 2 pgs.

IQinvision, IQeye3 Smart Camera Platform, labeled © 2002, 2 pgs.

IQinvision, IQeye3 Smart Network Camera, labeled © 2003, 2 pgs.

IQinvision, IQeye User's Guide, Mar. 11, 2002, 115 pgs.

IQinVision Press Release, IQinVision Digital Web Camera Stands Up to Sub-Zero Cold, Burning Heat, http://www.iqeye.com/news/IQ1XT1ch.htm, (Sep. 27, 1999), printed off Internet Aug. 5, 2004, 2 pgs.

IQinVision Press Release, IQinVision Launches IQeye1 PC-Independent Digital Web Server Camera, http://www.iqeye.com/news/IQI1Inch.htm, (Aug. 2, 1999), printed off Internet Aug. 5, 2004, 2 pgs.

IQinVision Press Release, IQeye1 Camera Puts Harvey Mudd Machine Shop On Web, http://www.iqeye.com/news/hmudd.htm, (Jan. 24, 2000), printed off Internet Aug. 5, 2004, 2 pgs.

IQinVision Press Release, IQinVision IQeye Camera Puts Aquarium of the Pacific on World Wide Web, http://www.iqeye.com/news/1baop.htm, (May 15, 2000), printed off Internet Aug. 5, 2004, 2 pgs.

IQinVision Press Release, IQinVision Launches IQeye2 and IQeye2 Industrial Internet Cameras, http://www.iqeye.com/news/IQ21nch.htm, (Oct. 30, 2000), printed off Internet Aug. 5, 2004, 2 pgs.

IQinVision Press Release, IQinVision Launches IQeye3, First Mega-Pixel Network Camera, http://www.iqeye.com/news/IQeye31nch.htm, (Apr. 30, 2001), printed off Internet Aug. 5, 2004, 2 pgs.

IQinVision Press Release, Philips CSI Selects IQinVision IQeye3 Camera For Philips Color e-dome, http://www.iqeye.com/news/edome.htm, (Jul. 30, 2001), printed off Internet Aug. 5, 2004, 2 pgs.

IQinVision Press Release, IQinVision Selects Equator's BSP Family of Chips to Enhance Its Smart Camera Platform, http://www.iqeye.com/news/equator.htm, (Apr. 17, 2002), printed off Internet Aug. 5, 2004, 2 pgs.

IQinVision Press Release, IQinVision Adopts RCC1S Real-Time MPEG-4 Encoder, http://www.iqeye.com/news/RCCMPEG.htm, (May 8, 2002), printed off Internet Aug. 5, 2004, 2 pgs.

IQinVision Press Release, IQinVision Launches IQeye3-W, Bringing High Resolution Video to Wireless 802.11b Networks, http://www.iqeye.com/news/IQ3W1nch.htm, (Jul. 8, 2002), printed off Internet Aug. 5, 2004, 2 pgs.

IQinVision Press Release, IQinVision Enchances IQeye3 Smart Camera Platform, Doubling Frame Rates For Many Applications, http://www.iqeye.com/news/IQ3fps.htm, (Jul. 25, 2002), printed off Internet Aug. 5, 2004, 2 pgs.

IQinVision Press Release, Smart Network Camera With Free Recording and Playback Software Embedded In the Camera, http://www.iqeye.com/news/IQlibrarian.htm, (Sep. 22, 2003), printed off Internet Aug. 5, 2004, 2 pgs.

IQinVision Press Release, IQeye3 Megapixel Network Camera Version 2 Offers HDTV Image Support For High Resolution Surveillance and Remote Monitoring, http://www.iqeye.com/news/IQ3v2.htm, (Mar. 1, 2003), printed off Internet Aug. 5, 2004, 2 pgs.

Sony, SNCCS50N, Multi Codec Fixed Network Camera, Printed from Internet Apr. 3, 2006; Copyright 2005,2006 and last update Mar. 2006, 2 pgs.

Sony, SNCRZ25N, Mpeg4/JpegP/T/ZoomNetworkCa, Printed from Internet Apr. 3, 2006; Copyright 2005,2006 and last update Mar. 2006, 3 pgs.

Sony, SNCP1, Mpeg4/JpegNetwork Color Came, Printed from Internet Apr. 3, 2006; Copyright 2005,2006 and last update Mar. 2006, 2 pgs.

Panasonic, Mega Pixel Color Network Camera, WV-NP1004, Printed from Internet Apr. 3, 2006, 4 pgs.

JVC Professional, V.Networks, From Multi-Camera Browsing to Remote Viewing and Distribution, JVC's Powerful Software Packages Maximize Your Net Camera's Potential, Printed from Internet Apr. 3, 2006, 2 pgs.

JVC Professional, VN-C3OU, New State of the Art Network Camera System Features Built-In In Web Server and High Resolution Imaging Capability for Versatile Remote Surveillance, Printed from Internet Apr. 3, 2006, 2 pgs.

Search Report, PCT/US04/08460; Jun. 27, 2006, 3 pgs.

Copending Application, "Systems and Methods for Video Stream Selection", U.S. Appl. No. 11/194,914, Aug. 1, 2005, 51 pgs.

Copending Application. "Systems and Methods for Providing High-Resolution Regions-Of-Interest", U.S. Appl. No. 11/442,658, May 26, 2006, 71 pgs.

"Axis Introduces a Professional Day and Night Camera for Demanding Security Applications", Axis Communications, Mar. 8, 2005, 1 pg.

Panasonic, Panasonic Enhances Intelligent Technology Offerings With the Introduction of I-Pro Series, Sep. 12, 2005, 2 pgs.

JVC News Release, JVC Professional Products Company Offers Revolutionary IP Video Security Networking Solution, Mar. 31, 2004, 3 pgs.

Panasonic, Panasonic Showcases New I-Pro Series IP Cameras, Sep. 12, 2005, 2 pgs.

Sony Press Release, Sony Unveils Ipela Cameras, Recorders and Monitors As Part of Comprehensive IP Security Lineup, Sep. 12, 2005, 2 pgs.

Sony Press Room, Industry Software Leaders Support Third-Generation, Multi-Codec Sony Security Cameras, Apr. 5, 2006, 4 pgs.

Axis Communications, Axis Introduces Revolutionary PTZ Network Camera Without Moving Parts, May 8, 2005, 2 pgs.

European Supplementary Search Report issued in connection with corresponding EP Patent Application No. 04757892 on Apr. 15, 2009.

* cited by examiner

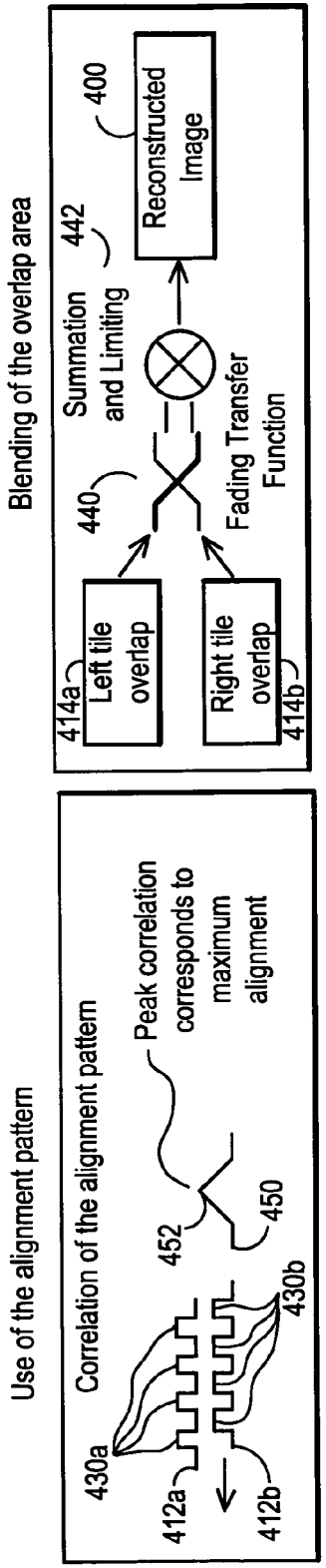

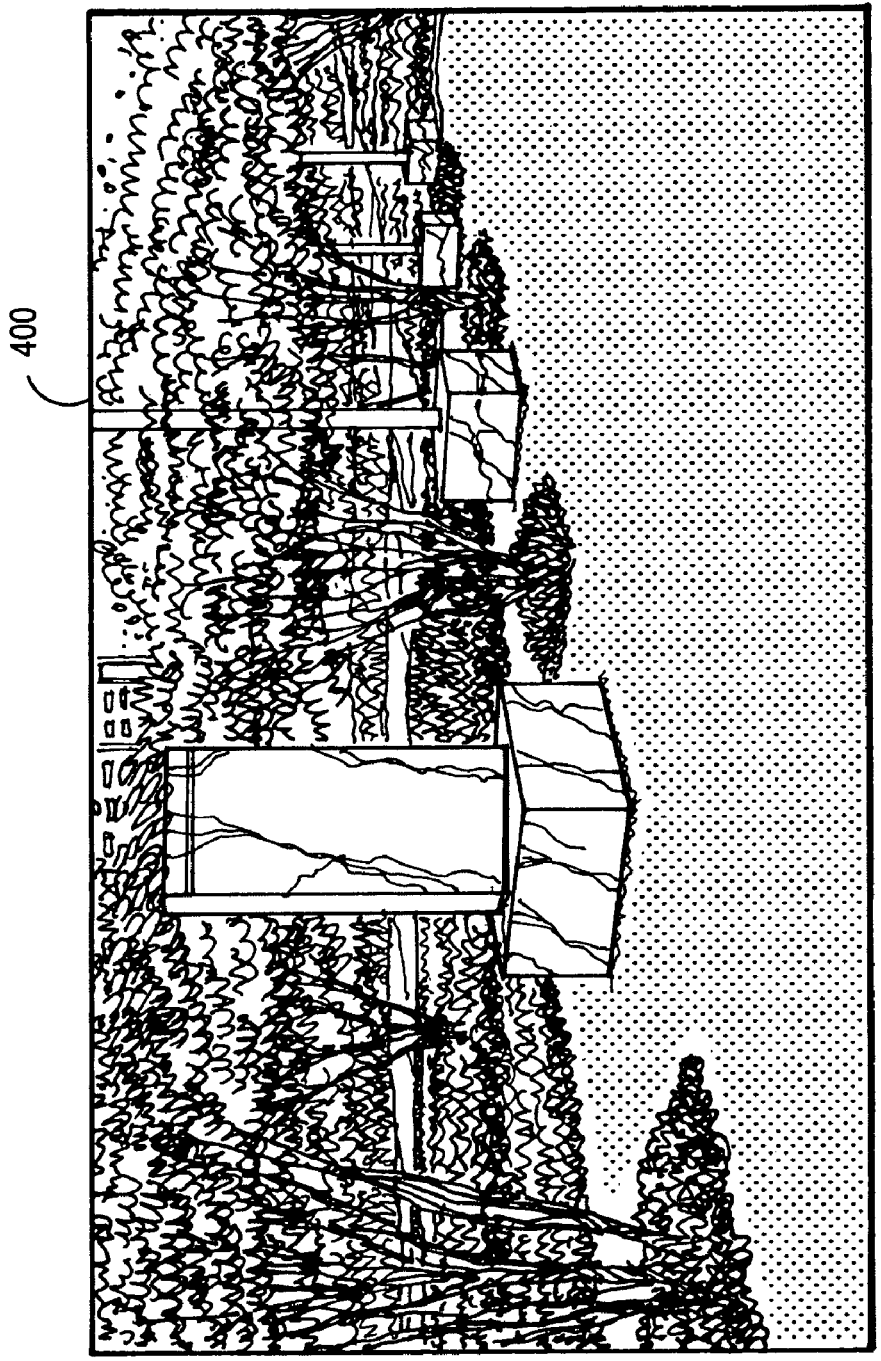
FIG. 4D - Reconstructed Image

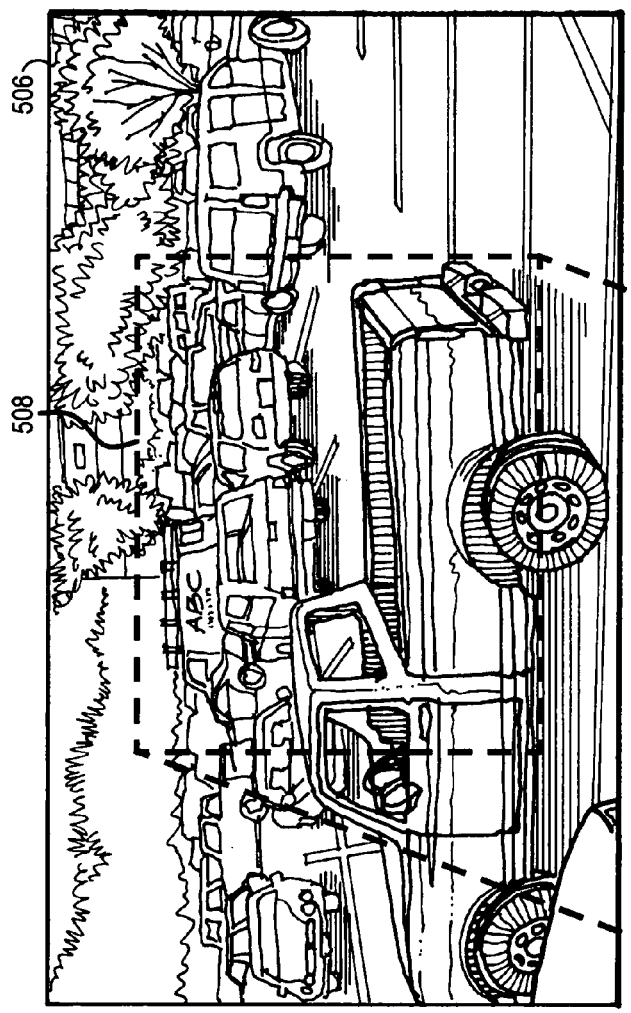
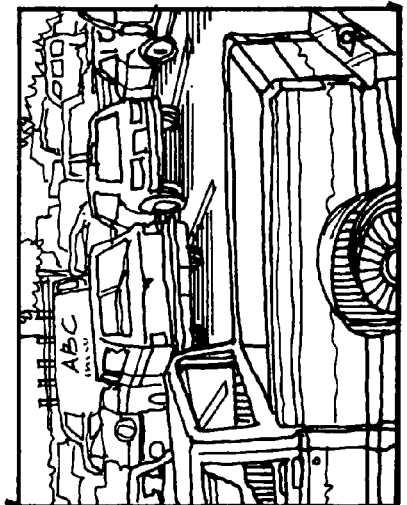
FIG. 5A
FIG. 5B
Example of extraction of a 640x480 area out of the 1280x720 sensor array

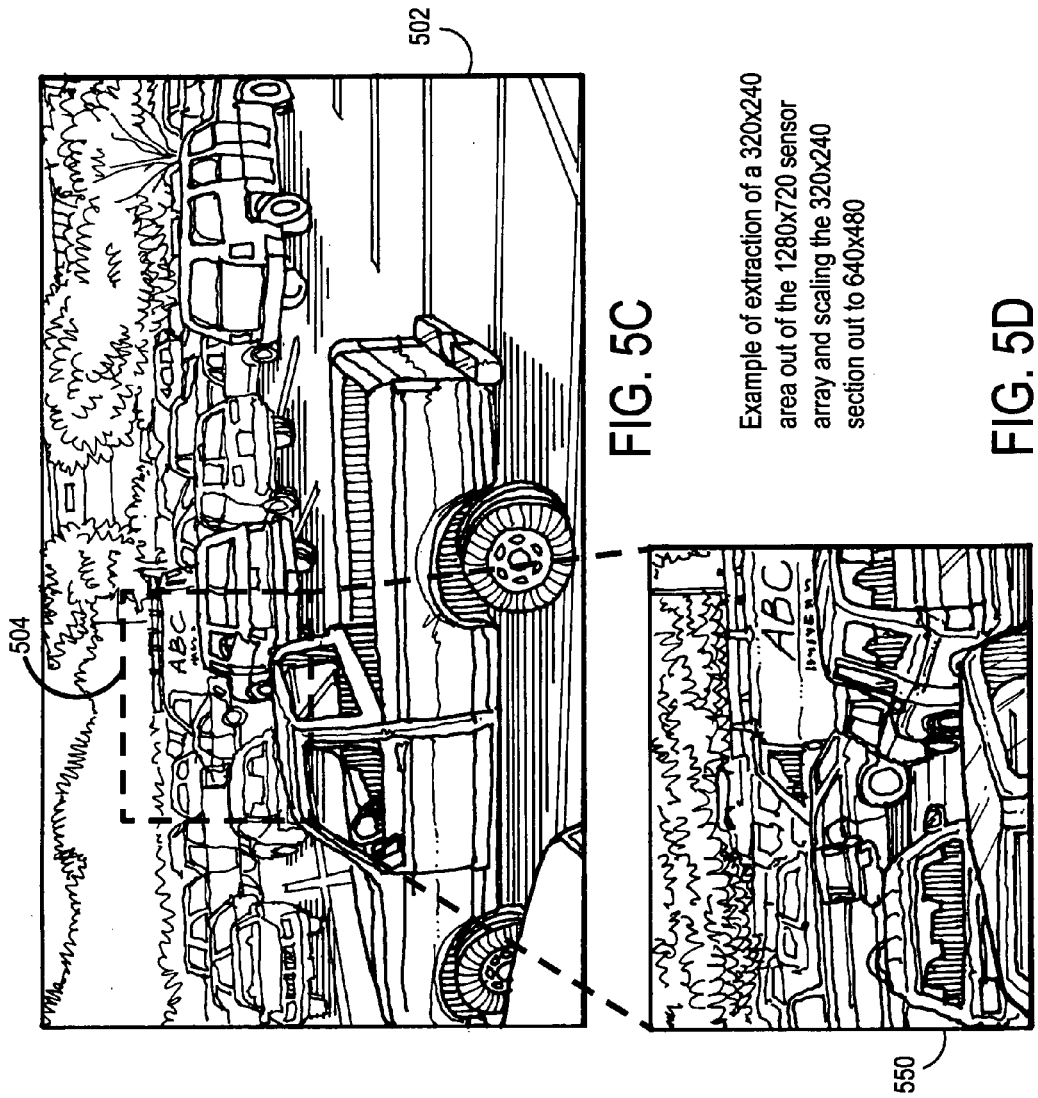

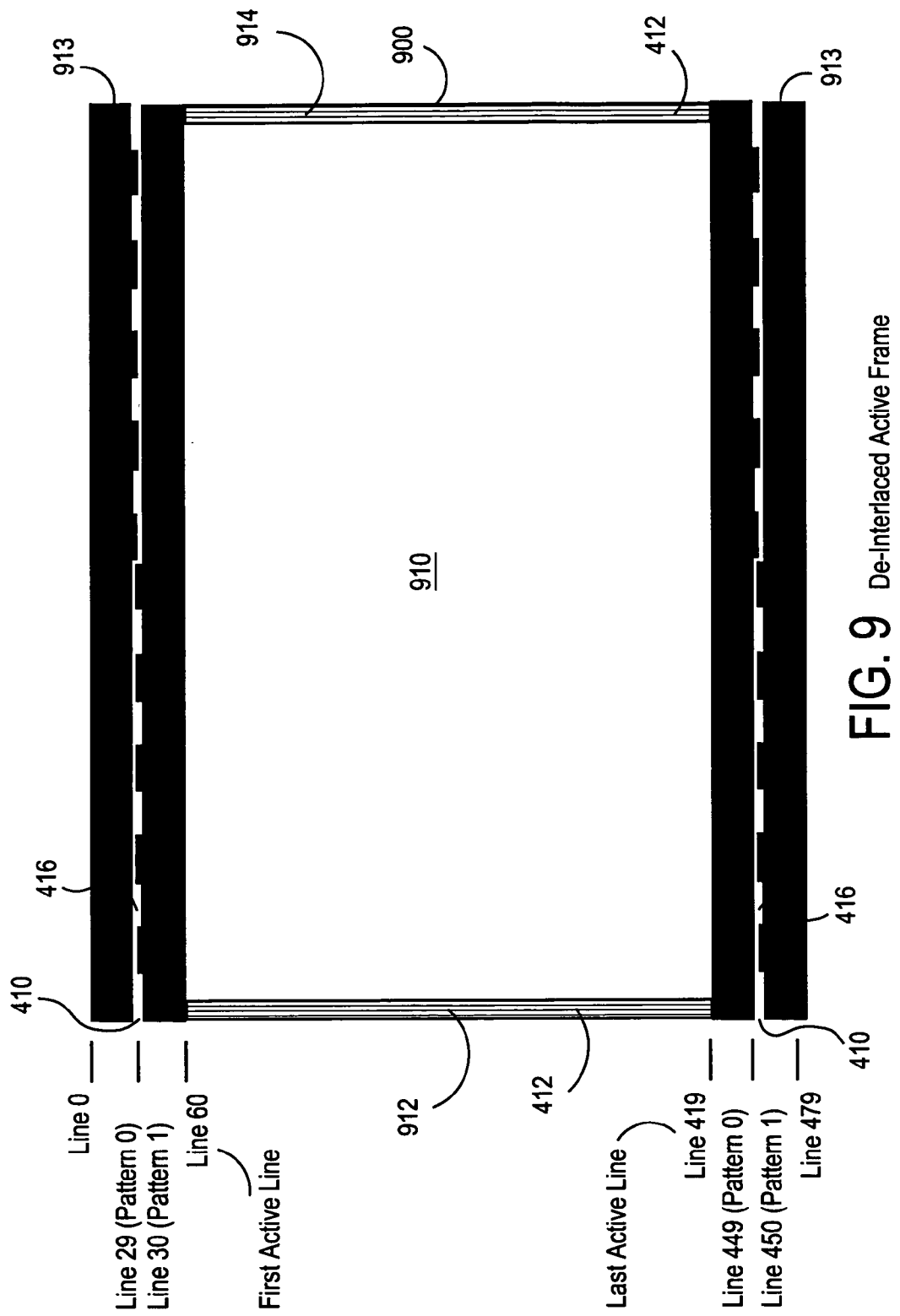
FIG. 9  De-Interlaced Active Frame

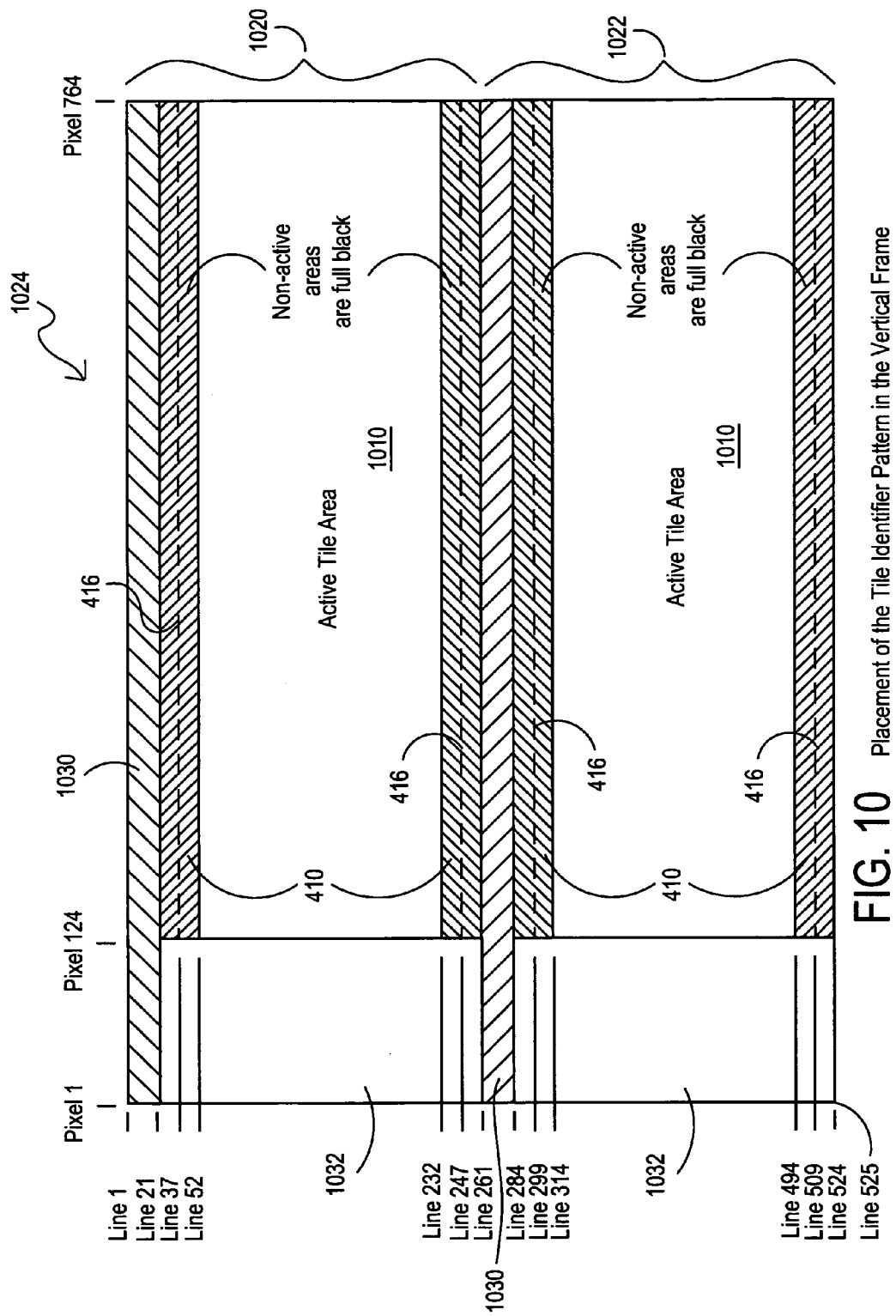
FIG. 10  Placement of the Tile Identifier Pattern in the Vertical Frame

SYSTEMS AND METHODS FOR MULTI-STREAM IMAGE PROCESSING

This patent application claims priority to U.S. Provisional patent application Ser. No. 60/456,294, filed Mar. 20, 2003, and entitled "Systems And Methods For Creation, Transmission, And Viewing Of Multi-Resolution Video" by Washington, the entire disclosure of which is incorporated herein by reference.

BACKGROUND OF THE INVENTION

The present invention relates generally to video systems, and in one exemplary application to multi-image video systems.

Existing closed circuit television ("CCTV") analog video transmission-based surveillance installations typically employ ITU/ISO NTSC (720×480) or PAL (720×576) standard video resolutions that are limited by realizable system bandwidth and cost constraints associated with such installations. FIG. 1 depicts an example of such a prior art CCTV installation 100 including a standard resolution (i.e., NTSC or PAL) digital camera 102 that is connected to a multi-port personal computer-based digital video recorder ("DVR") 104 through a bandwidth-limited analog transmission interface 106 to provide a standard resolution displayed image 108.

Factors that limit the maximum bandwidth of such prior art installations include signal attenuation associated with required maximum installation cabling length (typically up to 1000 feet), the type of cabling used (typically standard RG59 coax) and standard installation techniques that can result in non-optimal terminations. Increased costs associated with use of improved cabling, improved installation techniques, and/or custom interface circuitry preclude their use to achieve increased bandwidth capability in many situations. Transmission of higher resolution video imagery may be accomplished using digital transmission technology, but requires additional investments for new higher cost equipment, including compression and transport circuitry.

SUMMARY OF THE INVENTION

Disclosed herein are systems and methods that may be employed for the processing (e.g., creation, transmission and/or reconstruction) of a desired video scene (e.g., CCTV scene). In one embodiment, the disclosed systems and methods may be employed for the analog transmission of a video scene, including transmission of the desired scene over standard analog interfaces (e.g., standard CCTV interfaces), and for the display of the desired scene simultaneously in multiple resolutions (e.g., high and standard resolutions simultaneously), and/or for the display of multiple images of the desired scene on an analog display (e.g. conventional analog composite video monitor), using multi-stream (e.g., dual-stream analog) methodology.

Advantageously, the disclosed systems and methods may be implemented in one embodiment to fulfill the need for higher-than-standard video resolution imaging for video surveillance installations using existing digital video equipment (e.g., using existing standard digital to analog encoders, existing coax connections, existing chipsets, existing standard analog to digital de-encoders, etc.) with modified or new software capable of implementing one or more features of the disclosed systems and methods (e.g., in one exemplary embodiment by modifying Windows-based DVR software on PC or Intel-based DVR systems). Using the disclosed systems and methods CCTV video resolutions may be provided that support and take advantage of digital capture and imaging techniques to obtain useful information from digitally zoomed and enhanced video.

In another embodiment, the disclosed systems and methods may be implemented to generate multiple camera views from a relatively higher resolution image source (e.g., high resolution image sensor, image storage device containing high resolution image data, etc.) for transmission and display over relatively lower resolution video media components (e.g., standard video media such as across a standard analog composite video interface for display on a standard analog composite video display monitor). In such an embodiment, multiple image information streams may be integrated into a standard definition video stream as embedded camera views and/or may be sent as individual video streams, simultaneously over additional video media. In one exemplary embodiment, a single camera or video image storage device may be employed to virtualize and emulate multiple image sources (e.g., multiple cameras) with individual viewing and control capabilities.

As used herein, "high resolution" may be characterized as a video resolution that is greater than standard NTSC or PAL resolutions. Therefore, in one embodiment the disclosed systems and methods may be implemented to provide a resolution greater than standard NTSC and standard PAL resolutions, or greater than 720×576 pixels (414,720 pixels, or greater), across a standard composite video analog interface such as standard coaxial cable. Examples of some common high resolution dimensions include, but are not limited to: 800×600, 852×640, 1024×768, 1280×720, 1280×960, 1280×1024, 1440×1050, 1440×1080, 1600×1200, 1920×1080, and 2048×2048. In another embodiment, the disclosed systems and methods may be implemented to provide a resolution greater than about 800×600 pixels (i.e., 480,000 pixels), alternatively to provide a resolution greater than about 1024×768 pixels, and further alternatively to provide HDTV resolutions of 1280×720 or 1920×1080 across a standard composite video analog interface such as standard coaxial cable. Examples of high definition standards of 800×600 or greater that may be so implemented in certain embodiments of the disclosed systems and methods include, but are not limited to, consumer and PC-based digital imaging standards such as SVGA, XGA, SXGA, etc. It will be understood that the forgoing examples are representative of exemplary embodiments only and that the disclosed systems and methods may be implemented to provide enhanced resolution that is greater than the native or standard resolution capability of a given video system, regardless of the particular combination of image source resolution and type of interface.

In another embodiment, high resolution image source/s (e.g., 1024×768 pixel range or greater) may be processed in a fashion that generates multiple output video streams, that may be used to provide separate viewing capabilities. This may be accomplished, for example, by taking the video source output (e.g., image sensor based video output) which may be a stream of video 'frames', and generating (either physically or logically) multiple video output streams to individual processing units. These video output streams may all be identical, or alternatively may be samplings of different visual regions of the output video frames of the image source. It will be understood that the actual visual content of each video stream may vary according to the needs or desired characteristics for a given application, and is independent of the implementation of one or more features of the disclosed systems and methods.

In the practice of the disclosed systems and methods, examples of advantages that may be realized (e.g., alone or in any combination) using the disclosed systems and methods to provide higher resolution video and/or multiple-resolutions for video surveillance or other video signal processing applications include, but are not limited to, the following. Higher resolution and multiple resolution video of the disclosed systems and methods may be implemented to allow for a reduction in the number of cameras required to cover an area of interest. In one example, use of HDTV resolutions may allow for a reduction in the number of cameras (e.g., of a video surveillance system) by a ratio approaching or equal to 4:1 since the HDTV horizontal resolution is roughly 4 times that of standard definition cameras. Stored content associated with higher resolution video of the disclosed systems and methods may also be taken advantage of to provide more useful information. For example, in most cases involving the occurrence of an event of interest (e.g., occurrence of a security event such as theft, break-in, assault, etc.), cameras are often not zoomed into the correct space or given spatial portion of the video image to capture the most relevant or detailed data associated with the event. However, higher resolution information captured using the disclosed systems and methods may be used to provide substantially increased detail of a given portion of a video image and to provide greater information as to what was occurring at the time around an event of interest, even when the video camera is not zoomed into that give portion of the video image. Multiple resolution images of the disclosed systems and methods may also be used to provide the capability to maintain an overall awareness of a general situation while allowing simultaneous focus/zoom on a specific area/s of activity or interest.

In one embodiment, a multi-resolution video stream may be generated over a standard closed circuit television interface utilizing a high resolution sensor. The high resolution images from this sensor, may be scaled down to standard NTSC or PAL resolution and transmitted at a frame rate slower than that normally associated with NTSC or PAL frame rates (e.g., 25 to 30 frames per second). Frame periods not occupied by the scaled video images may then be used to transmit a tiled version of the full resolution image along with embedded information that allows the full high resolution image to be reconstructed without visible artifacts. Image reconstruction may be performed by a personal computer, processor-based DVR, or other suitable processor or dedicated hardware, and the resultant high resolution image made available for display along with the lower resolution image on a high resolution monitor and/or made available for digital storage. Using the embedded information also allows transmission of non-tiled versions of the original high resolution image intermixed with the tiled information. Examples would be specific areas of the original high resolution image that have been scaled, the entire original image scaled to a standard definition size, etc. In this way both a blend of lower frame rate high resolution images and higher frame rate standard resolution images may be sent across a single interface In such an embodiment, the disclosed systems and methods may be implemented in a manner compatible with reduced frame rate characteristics of existing CCTV video surveillance industry technology. In this regard, typical digital video recorders provide a capability of less than 30 frames/sec for video storage or display, with the average frame rates utilized by the industry being in the range of from about 3 to about 8 frames/sec. In the video surveillance industry, this frame rate has been considered to provide an acceptable tradeoff between situational awareness, video storage size, cost, and processing power requirements. Therefore, high resolution images at these lower frame rates may be acceptable, and/or high resolution images at even lower frame rates may suffice for some situations where lower resolution (e.g., standard resolution images) are simultaneously available at higher frame rates. Although higher frame rates may be desirable for some applications (e.g., such as trying to capture illegal sleight-of-hand techniques in gambling or theft situations), it has been estimated that even these situations require only from about 15 to about 18 frames/sec. In this regard, the disclosed systems and methods may be implemented in one exemplary embodiment to provide standard resolution images within the range of from about 15 to about 30 frames/sec while simultaneously sending tiled images for subsequent reconstruction.

In another embodiment, the disclosed systems and methods may be implemented to take advantage of the unused bandwidth associated with discarded or "dropped" frames of video that occur, for example, when a given frame rate (e.g., 30 frames/sec) is available for transmission, but only a portion (e.g., about 2 to 7.5 frames/sec) of the given frame rate is stored and/or displayed. This unused bandwidth may be utilized to transmit higher resolution images, multiple resolution images, combinations thereof, etc.

In various embodiments of the disclosed systems and methods, a number of exemplary features may be advantageously implemented, alone or in combination, to create, transmit, and/or view video scenes. Examples of such exemplary features include, but are not limited to, creation of a multiple resolution video stream compatible with standard CCTV interfaces; transmission of a multiple resolution video stream compatible with standard CCTV interfaces; utilization of patterns within unused portions of a video frame for proper reconstruction of higher resolution images to reduce or eliminate visual artifacts; and utilization of patterns within unused portions of a video frame for marking of image segments as to their original spatial relationship and subsequent detection and reaction to these markings.

In the practice of the disclosed systems and methods, one or more portions of an image produced by an image source (e.g., image sensor, image storage device, etc.) may be zoomed before or after transmission across an analog interface. For example, in one embodiment one or more zoomed portions of an image received from an image source may be generated prior to transmission in real time across an analog interface for analog display with no further processing, i.e., as zoomed image/s produced and then transmitted as part of analog video signals across an analog interface by multi-stream image processing circuitry of a camera. In another embodiment, one or more portions of an image may be digitally processed and zoomed in real time after receipt of the image from across an analog interface (e.g., after transmission of tiled images across an analog interface and reconstruction of a high resolution image therefrom in a PC-based DVR). In yet another embodiment, image information may be first stored after receipt across an analog interface (e.g., with or without further digital processing to reconstruct a high resolution or other type image from multiple tiles), and then retrieved and further digitally processed as appropriate to produce one or more desired zoomed images (e.g., in a PC-based DVR or using any other suitable type of DVR or circuitry suitable for this purpose). The term "zoomed" herein refers to the spatial scaling of all or part of an original image. In this regard, the scaling factor may range in value from less than 1 (reduction) and into positive factors greater than 1 (enlargement).

In one respect, disclosed herein is a method of providing multiple image streams for transmission across one or more interfaces, including: receiving at least one digital image data input stream, the digital image data input stream containing digital image information; creating at least two digital image data streams from the at least one digital data input stream, each of the at least two digital image data streams including at least a portion of the digital image information; converting the at least two digital image data streams into at least two respective output image streams; and providing the at least two respective output image streams for transmission across the one or more interfaces.

In another respect, disclosed herein is a method of providing an image across an interface, including: segmenting at least a part of an original digital image into multiple tile segments; providing the multiple tile segments together across the interface; receiving the multiple tile segments together from across the interface; and reassembling the received multiple tile segments to form at least a part of the original digital image.

In another respect, disclosed herein is a method of processing digital image data, including: providing the digital image data; processing the digital image data in a first processing operation to create first processed image data; processing the digital image data in a second processing operation to create second processed image data; and providing the first and second processed image data for communication together across one or more interfaces. The first processed image data may have an image resolution that is different from an image resolution of the second processed image data, or the first processed image data may be provided for communication across the interface at an image frame rate that is different from an image frame rate at which the second processed image data is provided for communication across the interface, or the first processed image data may include a different portion of the digital image data than the second processed image data, or a combination thereof.

In another respect, disclosed herein is a method of providing multiple images for transmission across an analog interface, including: providing at least two digital video frames, each of the digital video frames containing a respective digital image; converting the at least two digital video frames into at least two respective separate analog video frames; and providing the analog video frames for transmission together across the analog interface.

In another respect, disclosed herein is a method of processing images, including: segmenting at least one original digital video image into at least one digital image tile segment, the digital image tile segment including a portion of the at least one original digital video image; formatting the at least one digital image tile segment into a digital video frame that contains the digital image tile segment; and converting the digital video frame into an analog video frame.

In another respect, disclosed herein is multiple stream image creation circuitry configured to receive at least one digital image data input stream containing digital information, the multiple stream image creation circuitry including multi-stream image processing circuitry configured to: create at least two digital image data streams from the at least one digital data input stream, each of the at least two digital image data streams including at least a portion of the digital image information; convert the at least two digital image data streams into at least two respective output image streams; and provide the at least two respective output image streams for transmission together across one or more image transmission interfaces. The multi-stream image processing circuitry may further include at least one window circuitry component, at least one image scaler circuitry component, at least one image deconstruction circuit component, at least one alignment data circuitry component, and at least one image mux circuitry component; and the at least one window circuitry component, at least one image scaler circuitry component, at least one image deconstruction circuit component, at least one alignment data circuitry component, and at least one image mux circuitry component may be operably coupled to create the at least two digital image data streams from the at least one digital data input stream, and to convert the at least two digital image data streams into the at least two respective output image streams. An image processing system may include the multiple image creation circuitry, and may further include multiple stream image receiving circuitry coupled to the multiple image creation circuitry by a common image transmission interface, the multiple stream image receiving circuitry configured to: receive the at least two respective output image streams from across the common transmission interface, convert each of the at least two received respective analog image output streams into at least one digital image data stream including the first image and into at least one digital image data stream including the second image; and at least one of store the respective first and second images, provide the first and second images for simultaneous display, or a combination thereof.

In another respect, disclosed herein is multiple stream image creation circuitry including multi-stream image processing circuitry and conversion circuitry, the multi-stream image processing circuitry including at least one window circuitry component, at least one image scaler circuitry component, at least one image deconstruction circuit component, at least one alignment data circuitry component, and at least one image mux circuitry component.

In another respect, disclosed herein is an image processing system including multiple image creation circuitry coupled to multiple image receiving circuitry by at least one image transmission interface.

In another respect, disclosed herein is a system for processing digital image data, including image creation circuitry configured to: process the digital image data in a first processing operation to create first processed image data; process the digital image data in a second processing operation to create second processed image data; and provide the first and second processed image data for communication together across an interface. The first processed image data may have an image resolution that is different from an image resolution of the second processed image data, or the first processed image data may be provided for communication across the interface at an image frame rate that is different from an image frame rate at which the second processed image data is provided for communication across the interface, or the first processed image data may include a different portion of the digital image data than the second processed image data, or a combination thereof.

BRIEF DESCRIPTION OF THE DRAWINGS

FIG. 4B illustrates correlation of an alignment pattern according to one embodiment of the disclosed systems and methods.

FIG. 4C illustrates blending of tile overlap areas according to one embodiment of the disclosed systems and methods.

FIG. 4D represents a reconstructed image according to one embodiment of the disclosed systems and methods.

FIG. 5A-5B represents selectable extraction of higher rate high resolution image area out of a lower rate high resolution image according to one embodiment of the disclosed systems and methods.

FIG. 5C-5D represents selectable extraction of high resolution image area out of a larger standard resolution image according to one embodiment of the disclosed systems and methods.

FIG. 9 illustrates a de-interlaced active frame according to one embodiment of the disclosed systems and methods.

FIG. 10 illustrates placement of a tile identifier pattern in a vertical frame according to one embodiment of the disclosed systems and methods.

DESCRIPTION OF ILLUSTRATIVE EMBODIMENTS

The disclosed systems and methods may be implemented to allow image information that originates from one or more image sources to be processed and provided across a transmission interface in multiple resolutions and/or multiple streams in a manner that allows for reconstruction, storage and/or display as one or more images on one or more suitable analog and/or digital video display devices. In this regard, it will be understood that the actual image content, format, and/or spectral characteristics (e.g., visual image, infrared image, radar image, etc.) of image streams processed and transmitted according to the disclosed systems and methods may vary according to the needs or desired characteristics for a given application, and is independent of the implementation of one or more features of the disclosed systems and methods.

In one embodiment, the disclosed systems and methods may be employed for receiving image information having a native resolution and frame rate from one or more image source/s, and for processing and providing the image information across an analog interface for display in digital format as one or more images of native or less than native resolution and/or of native or less than native frame rate (e.g., as one or more native high resolution image/s, as one or more images of native and/or less than native frame rate, as one images of native or less than native resolution, as one or more zoomed or non-zoomed images, or as any combination thereof). In this regard, a single image may be displayed or multiple images may be simultaneously displayed, e.g., two or more images of multiple resolution, frame rate, and/or zoom scale may be simultaneously displayed on a single digital display device (e.g., computer monitor) or on multiple digital display devices. For example, a desired scene may be transmitted over standard analog interface (e.g., standard CCTV interface), and displayed simultaneously in multiple resolutions (e.g., windows containing high and standard resolution simultaneously).

In another embodiment, the disclosed systems and methods may be employed for receiving image information having a native resolution and frame rate from one or more image source/s, and for processing and providing the image information across an analog interface for display in analog format as one or more images (e.g., as one or more zoomed or unzoomed images, or a combination thereof). In this regard, a signal image may be displayed or multiple images may be simultaneously displayed on a single analog display device (e.g. conventional analog composite video monitor) or on multiple analog display devices. For example, a desired scene may be transmitted over standard analog interface (e.g., standard CCTV interface), and displayed simultaneously in multiple zoom scales (e.g., unzoomed and zoomed windows displayed simultaneously).

Transmission Across Analog Interface for Display on Digital Display Device

Figure 2:
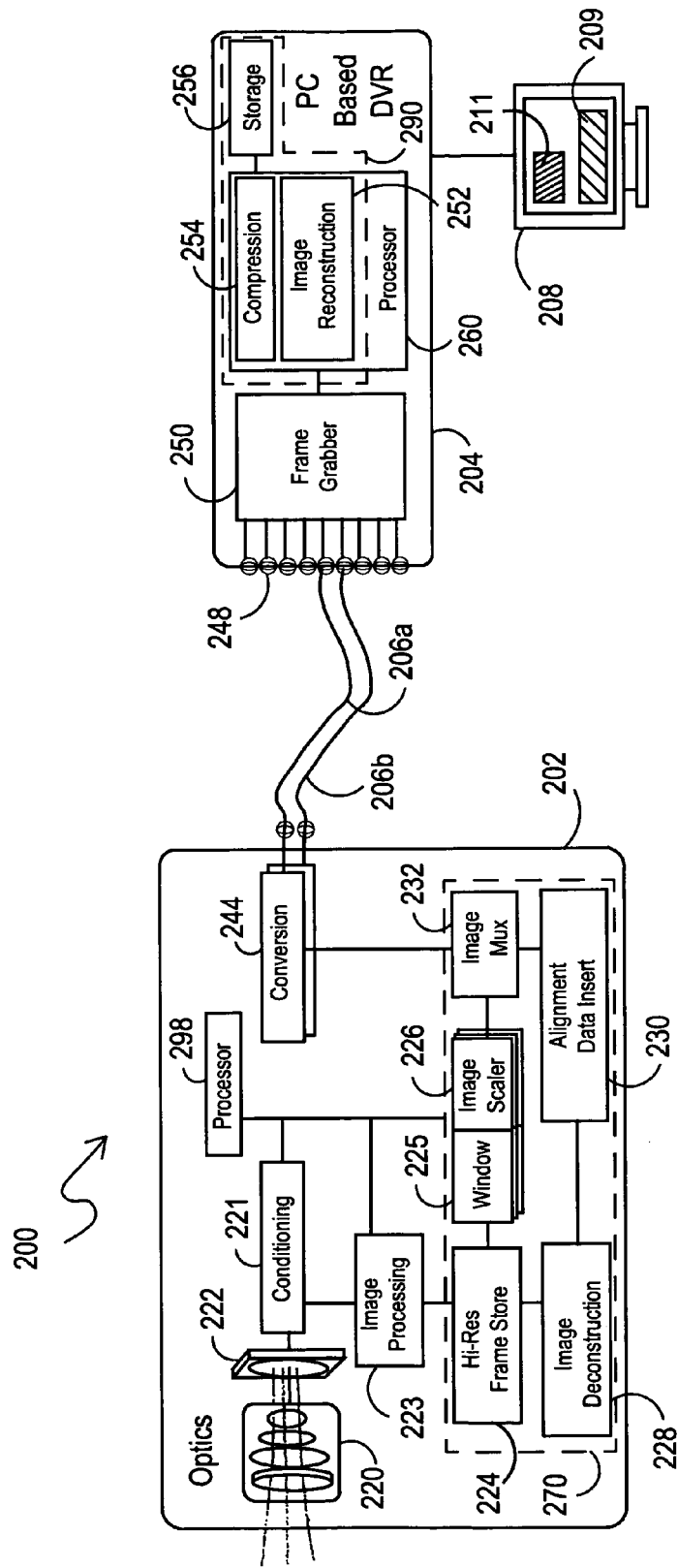
FIG. 2 is a simplified schematic of a multiple resolution video system according to one embodiment of the disclosed systems and methods.

In one embodiment, the disclosed systems and methods may be implemented with multiple image creation circuitry that may be coupled to create and provide multiple image information (e.g., multiple-resolution and/or multiple-stream image information) via analog signals to multiple image processing circuitry for image storage, image display, and/or further image processing. As an example, FIG. 2 illustrates one exemplary embodiment of a video system 200 having multiple resolution image capability that may be implemented in the practice of the disclosed systems and methods, for example, to create and provide multiple-resolution image transmission capability over a conventional analog transmission interface 206, e.g., having a frequency limit of 4-5 MHz. As shown in FIG. 2, video system 200 may include multiple stream image creation circuitry in the form of an enhanced resolution digital camera 202 that includes multiple stream image processing components (224, 225, 226, 228, 230, 232), the features of which may be implemented using any suitable hardware and/or software configuration (e.g., digital signal processor ("DSP"), application specific integrated circuit, field programmable gate array, combinations thereof, etc.). Also shown in FIG. 2 is multiple stream image receiving circuitry in the form of a PC-based DVR 204 that includes image reconstruction and multiple stream processing/storage capabilities. As shown in FIG. 2, video system 200 may be implemented in one embodiment to provide a multiple resolution image display on a standard PC monitor 208 (e.g., simultaneous display of both standard resolution image 209 and high resolution image 211).

Although FIG. 2 illustrates a multiple resolution video system 200 capable of providing multiple resolution image capability (e.g., standard and high resolutions in this exemplary embodiment), it will be understood that the disclosed systems and methods may be alternatively implemented to provide a video system capable of providing multiple (e.g., two or more, three or more, etc.) resolutions and/or that the multiple image resolutions may be selected to be any combination of desired resolutions, e.g. whether the multiple resolutions are selected to each be high resolutions, each to be standard resolutions, or whether a combination of such resolutions is selected.

Furthermore, it will be understood that it is not necessary that the disclosed systems and methods be practiced with two or more image resolutions that are not standard and/or high resolution images as defined herein. In this regard, any two or more multiple resolutions of desired different resolutions (i.e., of lower and higher resolution relative to each other) may be selected, including selected resolutions that are neither standard or high resolution. In this regard, a multiple stream image system having multiple resolution capability may be employed, for example, in the embodiment described with relation to FIG. 2 for creation, transmission and optional display of standard and high resolution images, it being understood that this embodiment is exemplary only and that other embodiments of the disclosed systems and methods may be configured for the creation, transmission and optional display of three or more images of differing resolutions, and/or for the creation, transmission and optional display of two or more images with differing resolutions that are not necessarily either standard and/or high resolution images. In addition, it will also be understood that the disclosed systems and methods need not be practiced to process and transmit multiple image resolutions, but instead may be implemented to process and transmit a single resolution using multiple streams.

Figure 1:
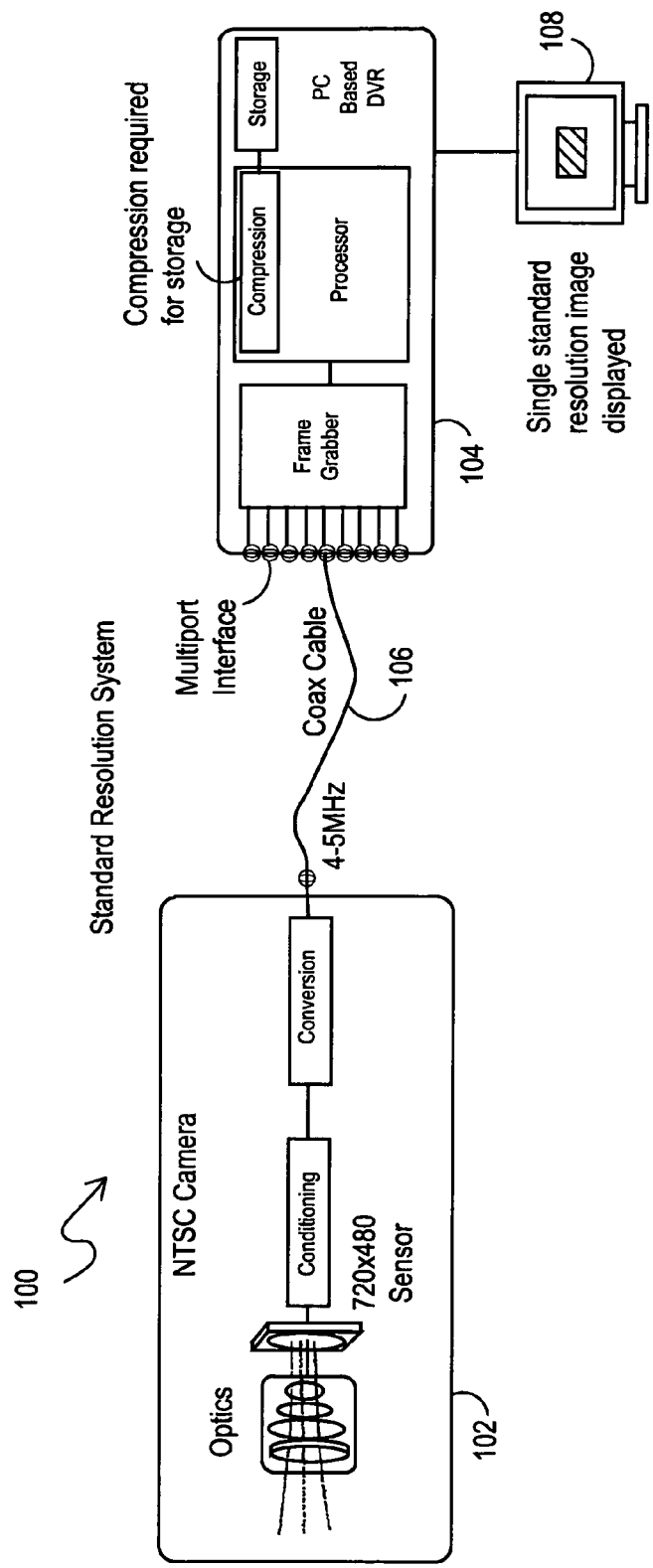
FIG. 1 is a simplified schematic of a prior art standard resolution CCTV video surveillance system.

In FIG. 2, enhanced resolution digital camera 202 is shown coupled to PC-based DVR 204 by bandwidth-limited analog interface 206 (e.g., similar to the bandwidth-limited analog interface 106 of FIG. 1). As used herein, the term "bandwidth limited interface" is used to describe a signal transmission format (e.g., standard composite video analog transmission interface) that has the characteristic of limited transmission capacity relative to the transmission capacity required to transmit a given image signal (e.g., high resolution image signal). One example of a bandwidth limited interface is a typical coaxial cable-based analog video transmission format that is limited to approximately 485 TV lines of resolution due to the following factors:

Bandwidth limitations associated with transmission of a level based signal (such as analog video) over coaxial cable which will roll off the higher frequencies as the length of the cable increases.

Encoding of the luminance and chrominance into a single composite video signal which requires frequency attenuation of the luminance data in order for it to not be interpreted as chrominance information.

Limitations built into existing frame grabber interfaces which are designed to work with the expected video bandwidths.

It will be understood that a standard composite video analog transmission interface is only one example of a bandwidth limited interface. Furthermore, although a bandwidth-limited interface is illustrated in FIG. 2, it will be understood that the disclosed systems and methods may be implemented to provide images over any other type of interface/transmission media suitable for analog and/or digital signal transmission, including interfaces that are not bandwidth-limited relative to the desired signal to be transmitted. Other examples of interfaces with which the disclosed systems and methods may be advantageously employed to transmit a desired image signal using multi-stream methodology include, but are not limited to, fiber optic interface formats, wireless (radio frequency) interface formats, serial digital formats, etc. In this regard, examples of other types of suitable interfaces include, but are not limited to, conversion to digital video for transmission over fiber, conversion to the RF domain for transmission over coaxial cable or direct wireless transmission, etc. It will thus be understood that any type of signal may be transmitted (in bandwidth or in non-bandwidth limited format relative to the interface), and that additional processing or conversion may be employed as long as the transmission contains multi-stream information in accordance with the systems and methods disclosed herein. In the case where the interface is non-bandwidth limited the techniques described herein may be usefully employed, e.g., to reduce the data bandwidth in order to preserve other system resources such as hard drive storage.

As illustrated for the exemplary embodiment of FIG. 2, digital camera 202 includes optics 220 and an image source in the form of video or image sensor 222, in this exemplary embodiment a high resolution video sensor having a standard HDTV resolution of 1280×720 (as opposed to the standard 720×480 or 720×576 resolution of the video sensor of prior art digital camera 102 of FIG. 1). Although a HDTV high resolution sensor is illustrated and described in relation to the exemplary embodiment of FIG. 2, it will be understood with benefit of this disclosure that a digital camera may be provided with any other type and/or resolution of high resolution or standard resolution image sensor or combination of such sensors that are suitable for generating image information having characteristics described further herein. Examples of suitable image sensors include, but are not limited to, image sensors having resolutions of 1920×1080, 1280×1024, 2048×2048, etc. Suitable types of image sensors include, but are not limited to, CCD, CMOS, ultraviolet, near infrared, infrared, etc.

Although video system 200 of the exemplary embodiment of FIG. 2 is configured having a camera with an image source in the form of an image sensor, it will be understood that a multiple resolution video system may be configured in the form of a camera or in a non-camera configuration with any one or more types of image sources that are suitable for generating image information in any picture format, e.g., including image sensors, storage devices capable of providing previously generated and stored image information, high frame rate images generated from RADAR or laser mapping, etc.). Furthermore, an image source may be a digital image source, or may be an analog image source producing an analog signal that is converted to digital signal via digital to analog ("DAC") conversion. In one embodiment, the disclosed systems and methods may be implemented to simultaneously receive, process and interleave image signals from two more image sources, e.g., image signals originating from wide-angle view and narrow angle view image sensors, image signals from IR and visible spectrum image sources, image signals from two image storage devices, etc.

As shown in FIG. 2, camera 202 may be configured with conditioning circuitry 221 that is capable of converting information from sensor 222 into video information having a desired digital video form. In this regard, conditioning circuitry 221 may be any circuitry suitable for converting raw sensor information into desired digital video form (e.g., standard format digital video form) including, but not limited to circuitry capable of converting CCD or CMOS sensor information (e.g., the bayer pattern red-green-blue ("RGB"), or alternately cyan-magenta-yellow ("CMY")) into planar RGB or CMY. Other possible tasks which may be performed by conditioning circuitry 221 include, but are not limited to, the control of an image sensor to produce the proper signal levels (exposure control), providing the correct synchronization of sensor control signals, and other conditioning aspects such as aperture correction (i.e. high frequency boost), white balance, color correction, demosaicing, dynamic range processing, dynamic range compression, formatting, etc. Color space conversion such as RGB or CMY to 4:4:4, 4:2:2 or 4:2:0 format YCrCb may also be performed by circuitry 221. In one exemplary embodiment, conditioning related processing may be performed via embedded digital logic or via algorithms running on a DSP or any other suitable processing element. It will be understood that type/s and combination/s of types of conditioning may vary and may be performed by circuitry 221 as desirable to fit the characteristics of a given application. It is also possible that no conditioning circuitry may be present, for example, in the case of a digital video signal received from a video source in the desired signal form (e.g., received in the form of a standard format digital video signal).

As illustrated for the exemplary embodiment of FIG. 2, multiple stream image creation circuitry in the form of camera 202 may be configured with multi-stream image processing circuitry 270 that includes Frame store circuitry 224 that stores the higher resolution frame, one or more instances of Window circuitry 225 that is configured to extract a selected portion of the higher resolution frame to form a full or windowed partial image, one or more instances of Image Scaler circuitry 226 that scales the higher resolution image down to a NTSC, PAL, SECAM, etc. compatible format or scales a smaller section of the higher resolution frame up to NTSC/PAL compatible formats for output over one of the output interfaces 206, , Image Deconstruction circuitry 228 that segments or "Tiles" the high resolution image into multiple tile segments (e.g., four pieces), Alignment Data Insert circuitry 230 that inserts alignment data into the unused lines of the tiled image, and Image Mux circuitry 232 that selects the information from separate sources (e.g., either the high resolution image scaled down to NTSC/PAL resolutions, a high resolution tile, or zoomed segment of a high resolution image) and transmits it in a multiple stream (e.g., dual stream) format. In this regard, it will be understood that multiple instances of window circuitry 225 and image scaler circuitry 226 may be provided in order to implement separate image data paths that may be multiplexed for transmission in a manner as will be described further herein, for example, in relation to FIG. 8A. Although not illustrated, it is also possible to have multiple instances of other circuitry within multi-stream image processing circuitry 270 (e.g., circuitry 228, circuitry 230, etc.) as necessary or desired to meet the requirements of a given application.

Also shown in FIG. 2 is optional supplemental image processing circuitry 223 that may be implemented as shown for purposes of implementing algorithms such as facial or target recognition and advanced motion detection algorithms. In such an exemplary embodiment, these types of algorithms may be provided with access to full frame rate and full resolution video in it's highest quality form, e.g., before any chrominance downsampling to 4:2:2 and/or any degradation going to the analog domain and back again. Such an implementation may be employed as an alternative or in addition to implementation of such algorithms in multiple stream image receiving circuitry (e.g., such as PC-based DVR 204) after transmission of analog signals across interface(s) 206.

In the illustrated embodiment, optional supplemental image processing circuitry 223 may be any circuitry suitable for receiving higher resolution image frames from a suitable image source, in this case conditioning circuitry 221, and for implementing one or more supplemental image processing algorithms/circuitry that is sensitive to pixel resolution (i.e., sensitive to the number of pixels in an image) prior to providing frames to Frame store circuitry 224. In this regard, pixel resolution-sensitive algorithms/circuitry refers to any algorithms/circuitry that is affected by degradation or loss of pixels from an original image (e.g., due to image processing in multi-stream image processing circuitry 270 or other processing that results in loss of pixels). Specific examples of pixel resolution-sensitive algorithms/circuitry include, but are not limited to, facial, license plate, or target recognition algorithms and circuitry used to implement same; motion detection algorithms and circuitry used to implement same; etc. In this regard, increased pixel resolution may facilitate recognition of movement, features, etc. within an image prior to further processing. Further, increased frame rate of an original image (e.g. prior to processing that reduces frame rate) also may benefit operation of such algorithms/circuitry. Examples of suitable circuitry configurations that may be employed for optional supplemental image processing circuitry 223 include, but are not limited to, digital logic contained within an FPGA, ASIC, or standalone integrated circuit ("IC") or algorithms running on a DSP or other suitable processing element, etc.

In the illustrated embodiment, Frame store circuitry 224 may be any circuitry suitable for storing higher resolution frames received from a suitable image source, in this case conditioning circuitry 221 (or from optional supplemental image processing circuitry 223 when present), and for providing these frames to Window circuitry 225/Image Scaler circuitry 226 and/or Image Deconstruction circuitry 228 as may be appropriate for a given application or operating mode of same. In this regard, Frame store circuitry 224 may be configured to store or stage high resolution frames and then provide them to Image Deconstruction circuitry 228 where high resolution image frames are segmented (or separated into tiles) by circuitry 228. Furthermore, Frame store circuitry 224 may be configured with bypass circuitry so that high resolution frames received from conditioning circuitry 221 or optional supplemental image processing circuitry 223 may be directly provided to Window circuitry 225/Image Scaler circuitry 226 without frame storage. Alternatively a switch or other suitable selection mechanism (not shown) may be provided with corresponding signal paths that together are configured to selectably route high resolution frames to either of Frame store circuitry 224 or directly to Window circuitry 225/Image Scaler circuitry 226 without frame storage. Examples of suitable circuitry configurations that may be employed for Frame store circuitry 224 include, but are not limited to, SDRAM or SRAM either standalone or contained within an ASIC or FPGA, etc.

Window circuitry 225 and Image Scaler circuitry 226 may be any circuitry configurations suitable for respectively extracting portions of a higher resolution image and scaling frames of a higher resolution image obtained from Frame store circuitry 224 (or alternatively received directly from conditioning circuitry 221 or from optional supplemental image processing circuitry 223 when present) to frames of a lower resolution image (e.g., NTSC, PAL, SECAM, etc. compatible format), and for providing these scaled lower resolution frames to Image Mux circuitry 232. Alternately selected areas may be scaled up for larger display on the monitor 208 via one of the transmission interfaces 206. The advantage of this alternate path is the ability to send higher frame rate scaled images at the same time the lower effective frame rate higher resolution images are being transmitted. Examples of suitable circuitry configurations that may be employed for Window circuitry 225 and Image Scaler circuitry 226 include, but are not limited to, digital logic contained within an FPGA, ASIC, or standalone IC or algorithms running on a DSP or other suitable processing element, etc.

Image Deconstruction circuitry 228 may be any circuitry suitable for segmenting (or separating into tiles) the high resolution image frames received from Frame store circuitry 224 into two or more multiple high resolution segments, performing appropriate buffering operations to prevent latency issues from arising, and for providing the segmented high resolution frames or tiled high resolution images to Alignment Data Insert circuitry 230. Examples of suitable circuitry configurations that may be employed for Image Deconstruction circuitry 228 include, but are not limited to, digital logic contained within an FPGA, ASIC, or standalone IC or algorithms running on a DSP or other suitable processing element, etc.

Alignment Data Insert circuitry 230 may be any circuitry suitable for inserting tile identification information, horizontal alignment information, and/or vertical alignment information into the unused lines of the segmented frames or tiled images received from Image Deconstruction circuitry 228. Examples of suitable circuitry configurations that may be employed for Alignment Data Insert circuitry 230 include, but are not limited to, digital logic contained within an FPGA, ASIC, or standalone IC or algorithms running on a DSP or other suitable processing element, etc.

Image Mux circuitry 232 may be any circuitry suitable for selecting the scaled lower resolution frames from Image Scaler circuitry 226 or the higher resolution tile images from Alignment Data Insert circuitry 230 for transmission using multiple stream (i.e., two or more stream) format. In this regard, Image Mux circuitry 232 may provide the selected image information to conversion circuitry 244. In one embodiment, Image Mux circuitry 232 may be configured to include digital buffering and switching circuitry and may be characterized as a media router. Examples of suitable circuitry configurations that may be employed for Image Mux circuitry 232 include, but are not limited to, digital logic contained within an FPGA, ASIC, or standalone IC or algorithms running on a DSP or other suitable processing element, etc. In an alternative embodiment, analog multiplexing may be used. It will be understood that Image Mux circuitry 232 may be configured to output multiple signal streams, e.g., to multiple buffers and/or DAC circuits for transmission across one or more analog interfaces 206.

As illustrated in FIG. 2, multiple instances of conversion circuitry 244 may be optionally provided to output separate signal streams (e.g. each being multiple or single streams themselves) to separate respective analog interfaces. It will be understood, however, that multiple interfaces 206 need not be present however, and that a single analog interface 206 may be employed. It will further be understood that one or more digital transmission interfaces (e.g., such as described elsewhere herein) may alternatively be employed and, in one embodiment, may be employed in combination with one or more analog transmission interfaces. Use of multiple transmission interfaces may be employed to allow increased frame rate and/or resolution to be transmitted simultaneously. For example, using two analog interfaces 206 allows multiple image creation circuitry 202 to transmit a four-tile HDTV image at an effective frame rate of 7.5 fps over a first analog interface 206a, while at the same time transmitting a full standard definition image at 30 fps over a second analog interface 206b. In such a case, the HDTV image and the standard definition image may be displayed simultaneously on the same display device, displayed on separate respective display devices, and/or stored.

It will further be understood that the disclosed systems and methods may be advantageously practiced in combination with one or more digital transmission interfaces, e.g., to reduce bandwidth requirements. In one embodiment, for example, the disclosed systems and methods may be advantageously implemented in combination with a digital transmission interface where bandwidth capacity is an issue, e.g., due to the supported rate of a particular connection or a particular series of connections, due to cost associated with bandwidth, due to a need to multiplex several video signals over one digital link (e.g., due to topology constraints, cost issues, right of way, physical access and availability, etc).

As further illustrated in FIG. 2, one or more embedded processors 298 (e.g., multiprocessor, DSP, or other suitable processor/s) may be present in camera 202 for implementing one or more tasks (e.g., algorithms) described herein and related to one or more individual circuitry components 221, 223, 270 and 244. As shown in FIG. 2, camera 202 may also include a conversion block 244 for digital to analog encoding (e.g., conversion from digital video to standard composite NTSC analog video) for transmission across interface 206.

Although FIG. 2 illustrates one exemplary embodiment including multiple stream image creation circuitry that is provided within a camera 202 it will be understood that it is possible that multiple stream image creation circuitry may be implemented in any other suitable form or configuration, e.g., as circuitry provided within a camera or as circuitry provided wholly or in-part separate to a camera, as circuitry with any other suitable configuration of optics and/or image sensor, as circuitry that is operably coupled for receiving signals from non-camera video sources, combinations thereof, etc. Furthermore, it will be understood that in other embodiments multiple stream image creation circuitry (e.g., configured within a camera, configured as separate circuitry, etc.) may be implemented with other types of image processing circuitry.

It will also be understood that multi-stream image processing components may be implemented using any alternative circuit configuration suitable for providing any one or more of the respective capabilities thereof as described herein. In this regard, one or more of the exemplary illustrated components of multi-stream image processing circuitry 270 (e.g., 224, 226, 232, 228 and 230) may be alternatively rearranged and/or combined in any alternative configuration suitable for implementing the functionality described herein, either in relation to each other, and/or in relation to other circuitry (e.g., such as optional image processing circuitry 223, optional conditioning circuitry 221, conversion circuitry 244, etc.). Furthermore, it is possible that additional circuitry components may be provided in the path between multiple image creation circuitry and a coupled bandwidth-limited transmission interface as may be needed or desired for other purposes without departing from the scope of the disclosed systems and methods. In this regard, examples of such circuitry include, but are not limited to, image storage circuitry, one or more types of image conditioning circuitry, one or more types of supplemental image processing circuitry, etc.

Still referring to the exemplary embodiment of FIG. 2, video system 200 is configured with multiple stream image receiving circuitry in the form of PC-based DVR 204. As illustrated in FIG. 2, PC-based DVR 204 includes frame grabber circuitry 250 for analog to digital conversion of analog signals (e.g., multi-stream analog signals) transmitted from enhanced resolution digital camera 202 across interface 206. Frame grabber circuitry 250 is shown coupled to bandwidth limited interface 206 via multiport interface component 248, although coupling via any other suitable type of interface component is possible. DVR 204 is also shown provided with multi-stream image processing circuitry 290 that is complementary to multi-stream image processing circuitry 270 of camera 202. In this regard, components of multi-stream image processing circuitry 290 of the exemplary embodiment of FIG. 2 include Image Reconstruction circuitry 252 that may be used to reconstruct tiled image segments back into the original high resolution image, Multi Stream Compression circuitry 254 that may be used to compress both the standard and high resolution images to decrease storage requirements, and Multi Image/Stream Storage circuitry 256 that may be used to store the raw or compressed images, e.g., based on system or system operator requirements.

As shown in FIG. 2, for this exemplary embodiment Image Reconstruction circuitry 252 and Multi Stream Compression circuitry 254 may be implemented together on processor 260 (e.g., PC-based microprocessor such as an Intel Pentium) of PC-based DVR that may be in turn coupled to multiple image storage 256, which may be any data storage device or combination of data storage devices suitable for storage of raw or compressed image information, e.g., such as hard or floppy disk/s, EEPROM, FLASH, DRAM, SRAM, etc. However, it will be understood that the configuration of multi-stream image processing circuitry illustrated in FIG. 2 is exemplary only, and that components thereof may be alternatively implemented on more than one processor and/or using dedicated circuitry (e.g., such as PCI-based standalone compression and image processing cards), either of which that may be in whole or in part configured external to other components of a DVR. Furthermore, it will be understood that multiple stream image receiving circuitry may be implemented using non-PC based DVR circuit configurations, or using any other configurations of one or more circuits (e.g., including non-DVR circuit configurations) suitable for providing any one or more of the respective capabilities of multiple image processing circuitry as described herein. For example, it will be understood that capabilities of a frame grabber component may be combined with multi-stream image processing circuitry, and that a multiple image storage component is not required, e.g., multiple image information may be processed and/or displayed only in real time, multiple image information may be processed and then provided without storing to other and separate image processing circuitry for additional image processing, etc.

In the illustrated embodiment of FIG. 2, frame grabber circuitry 224 may be any circuitry suitable for capturing a frame from an analog video signal (e.g., multi-stream analog signal) received across interface 206, converting it to a digital image, and providing it to multi-stream image processing circuitry 290. Examples of suitable circuitry configurations that may be employed for frame grabber circuitry 224 include, but are not limited to, industry standard video decoder IC's coupled to a synchronization and memory controller coupled to SDRAM for video storage, etc.

Image Reconstruction circuitry 252 may be any circuitry suitable for reconstructing tiled image segments back into the original high resolution image originally segmented by Image Deconstruction circuitry 228 using alignment data inserted by Alignment Data Insert circuitry 230 of enhanced resolution digital camera 202. Examples of suitable circuitry configurations that may be employed for Image Reconstruction circuitry 252 include, but are not limited to, PC or DSP based processing with or without dedicated hardware assist, etc.

Multi-Stream Compression circuitry 254 may be any circuitry suitable for compressing both standard and high resolution image information received across interface 206 and/or processed by image reconstruction circuitry 252. In the illustrated embodiment, Multi Stream Compression circuitry 254 may provide such compressed image information to Multi Stream Storage circuitry 256, for example, to decrease storage space required for the image information in Multi Stream Storage circuitry 256. Multi Stream Storage circuitry 256 may additionally or alternatively provide compressed image information to other system or subsystem components, e.g., for purposes of storage or subsequent transmission to other viewing stations via LAN (Local Area Network) or WAN (Wide Area Network). Examples of suitable circuitry configurations that may be employed for Multi Stream Compression circuitry 254 include, but are not limited to, FPGA or ASIC based logic, dedicated standalone MPEG, JPEG, JPEG2000 integrated circuits, etc.

In the embodiment of FIG. 2, Multi Stream Storage circuitry 256 may be any data storage device suitable for storing lower and higher resolution images, e.g., standard and high resolution images. Some examples of suitable data storage devices have been previously described herein. In one exemplary embodiment, lower and/or higher resolution images may be selectably stored in either raw and/or compressed form, e.g., based on command or control signals provided by a system operator or another system or another subsystem component. For example, it may be desirable to store images in raw form in those cases where any lossy form of compression would adversely affect post processing such as facial recognition, or target detection, or cases where the image is to be significantly digitally enlarged before analysis (e.g. retrieval of a license number off of a car tag that does not represent a significant portion of the overall image, personnel identification either by zooming in on a face of other aspects of the persons apparel, etc.). Alternatively, images may be stored in compressed form such as when it is desired that the amount of data be decreased in order to reduce storage requirements (e.g., to reduce cost or to increase the amount of image time span that may be stored) or to enable a higher frame rate over slower communications links (e.g., modem, ISDN, etc.) than would be possible with non-compressed video.

In the embodiment of FIG. 2, multiple resolution image display 208 is illustrated as a single display device (e.g., computer monitor or other suitable digital image display device) configured to simultaneously display standard resolution image 209 and higher resolution image 211 received from DVR 204. However, it will be understood that in the practice of the disclosed systems and methods that three or more multiple images of different resolutions and/or frame rates may be simultaneously displayed on a single display device in real time and/or in playback form from recorded data. It will also be understood that two or more multiple images of different resolutions and/or frame rates may be displayed on multiple display devices (e.g., standard resolution image displayed on a first display device and high resolution image simultaneously displayed on a second display device) in real time and/or in playback form from recorded data. Furthermore, it will be understood that display of multiple images is not necessary in the practice of the disclosed systems and methods. For example, one or more images may be displayed in real time while other non-displayed image information is further processed or recorded for future playback or processing. Alternatively, it is possible that no image is displayed in real time, with all image information being recorded and/or processed by other separate image processing circuitry.

In one embodiment of the practice of the disclosed systems and methods, a multiple resolution video system (e.g., such as illustrated and described in relation to FIG. 2) may be implemented in a manner that allows image information received from one or more image sources (e.g., image sensor/s, storage device/s containing previously generated and stored image information, etc.) to be selectably processed in a manner so as to create two or more image streams based thereupon that have different resolutions and/or frame rates. In this regard, frames of each created image stream may correspond to an entire image received from an image source or may correspond to any portion thereof. In this regard, one or more whole or partial images may be segmented into two or more tile segments for transmission across an analog interface. Multiple images (e.g., higher and lower resolution images) and/or tile segments thereof may be simultaneously transmitted across an analog interface by transmitting each of the multiple images at respective frame transmission rates that together do not exceed the maximum frame transmission rate capacity of the interface.

For example, in one example implementation of the embodiment of FIG. 2, image sensor 222 may provide high resolution image information relating to a scene viewed by sensor 222 to multi-stream image processing circuitry 270 of camera 200. Multi-stream image processing circuitry 270 of enhanced resolution digital camera 202 may in turn generate a standard resolution image frame of the entire scene from the high resolution image information (e.g., using circuitry related to image scaling, segmentation, and multiplexing). This standard resolution image frame may then be transmitted via digital to analog conversion circuitry 244 to DVR 204 across interface(s) 206 that has a maximum frame rate transmission capacity (e.g., 30 frames per second) at a first frame rate (e.g., 15 frames per second) that is less than the maximum frame rate capacity of interface 206. Simultaneously, higher resolution segmented image tiles associated with respective portions of the high resolution image scene may also be transmitted in analog form across interface 206 by multi-stream image processing circuitry components 270 in camera 202 via conversion circuitry 244 to DVR 204 at a second frame rate (e.g., 15 frames per second) that is also less than the maximum frame rate capacity of interface 206, and such that the first and second frame rates do not together exceed the maximum frame transmission capacity (e.g., 30 frames per second) of interface 206.

Once received by DVR 204, frame grabber 250 may provide both the standard resolution and high resolution image information in digital form to multi-stream image processing circuitry 290 of DVR 204. Microprocessor-based image processing circuitry 252 may then be configured to reassemble and display the scene of the standard resolution image at its transmitted frame rate (e.g., 30 frames per second) and/or to display the high resolution scene assembled from the segmented tiles at a frame rate corresponding to the transmission rate of the individual tiles divided by the number of tile segments per image. For example, a high resolution image segmented into four tile segments that are transmitted across interface 206 at a rate of 15 frames per seconds may be reassembled into a single high resolution image that may be processed and/or displayed at a rate of 3.75 frames/sec. In an alternative example, a high resolution-only mode may be implemented that allows for transmission of four high resolution frames at a total rate of 30 frames per second from multi-stream image processing circuitry components 270 of camera 202 to multi-stream image processing components 290 of DVR 204, for reassembly into a single high resolution image at a rate of 7.5 frames/sec, i.e., four frames that are assembled to make up each overall frame of the full image are transmitted every 7.5 seconds.

Tile Reassembly to Form Reconstructed Image

In a further exemplary embodiment of the disclosed systems and methods, two or more multiple image tiles may be transmitted separately (e.g., across standard CCTV composite video interface or other suitable standard or non-standard interface/s) and may be reassembled into a reconstructed image (e.g., high resolution full 1280×720 image). For example, in one exemplary embodiment, such a methodology may be implemented in multi-resolution video system 200 of FIG. 2 to transmit multiple high resolution image tiles (e.g., each high resolution image tile being mapped into a respective standard TV resolution video frame) between camera 202 and DVR 204 across analog interface 206 for reassembly into a reconstructed full high resolution image with little or no visible artifacts. However, it will be understood that such a methodology may be implemented in any other single or multiple-resolution video system environments having any other configuration of one or more circuit blocks suitable for performing one or more of the video signal processing tasks described herein.

In those embodiments where transmission of high resolution images (e.g., 1280×720 images) exceed the capacity of the selected analog transmission media interface (e.g., NTSC, PAL, etc.), tiled high resolution images may be transmitted across the analog interface at a frame rate that is equal to the frame rate of the analog interface divided by the number of tiled images transmitted. For example, NTSC transmission media is limited to 720×480 rectangular pixel ("RP") video frames at 29.97 fps, and PAL transmission media is limited to 720×576 rectangular pixels ("RP") video frames at 25 fps. Thus, where four high resolution tiled images are transmitted across the selected analog interface, the resultant effective frame rate of the reassembled high resolution image may be one-fourth the actual frame transmission rate (e.g., 30/4 or 7.5 fps for NTSC standard, or 25/4 or 6.25 fps for PAL standard).

It will be understood that the capture/archive rate of multiple stream imaging circuitry may not equal the full frame rate of the coupled transmission interface. For example, referring to the embodiment of FIG. 2, PC-based DVR 204 may not capture/archive frames at the full frame rate of analog interface 206 (e.g., 30 fps NTSC, 25 fps PAL). Therefore, without compensation, there may be mismatches between the capture rate of DVR 204 and the timing of the received frames containing the tiled high resolution images. For example, a DVR capturing at a 2 fps rate would capture/archive one out of every 15 frames for an NTSC transmission, and one out of every 12.5 frames for a PAL transmission. In an embodiment where a single high resolution image is transmitted by multiple image stream circuitry in the form of four tiled images in a repeating 1-2-3-4 pattern, there may therefore be a mismatch between the multiple stream image creation circuitry and the coupled multiple stream image receiving circuitry. In one exemplary embodiment, such mismatches may be compensated for by adapting the frame generation pattern of the multiple stream image processing circuitry (e.g., camera 202) to comply with the capture/archive rate of the coupled multiple stream image receiving circuitry (e.g., DVR 204).

The following table illustrates one exemplary manner (i.e., for NTSC standard) in which compensation may be implemented by repeating transmission of each frame containing a given image tile repetitively back-to-back manner for a sufficient number of times to allow capture/archive of at least one frame containing the given image tile based on the capture/archive rate of the multiple image stream receiving circuitry, it being understood that similar methodology may be employed for PAL standard and that other compensation scheme methodologies are also possible.

| DVR NTSC Capture Rate (fps) | Frame Transmission Repetition Rate (Number of Times A Given Frame is Repeatedly Transmitted Back to Back) | Resulting Effective Reassembled Image Rate (fps) |
| --- | --- | --- |
| 30 fps | 1 | 7.5 |
| 15 | 2 | 3.75 |
| 10 | 3 | 2.5 |

The disclosed systems and methods may be advantageously employed to transmit and reassemble tiles in a manner that takes advantage of extra or left-over information space that exists when a image having a first resolution is transmitted using a format that has a second resolution that is greater (e.g., greater number of pixels and/or greater number of rows) than the first resolution. For example, referring to the exemplary video system 200 of FIG. 2, an exemplary 1280× 720 square pixel HDTV sensor 222 of system 200 may be employed in combination with exemplary and conventional video encoder/decoder parts that are based on rectangular pixel formats corresponding to CCIR-656 video streams. For these encoder/decoder parts the resolution of the NTSC image is about 720×480. It will also be understood that 720× 480 rectangular TV pixels ("RP") corresponds to approximately 640×480 square pixels ("SQP").

For the combination of this given example, a 1280×720 image generated by the HDTV sensor 222 may be divided by Image Deconstruction circuitry 228, for example, into four 640×360 tiles for transmission using the NTSC format. Thus, insertion of each 640×360 high resolution tile into a standard NTSC format image leaves 80 horizontal pixels and an additional 120 lines available for alternate (e.g., non-video) purposes, such as described below. It will be understood that this specific combination of 640×360 tiles with NTSC format is exemplary only, and that the disclosed systems and methods may be implemented with any combination of tile size that is smaller relative to the transmission frame size (e.g. PAL format, etc.), such that one or more lines and/or horizontal pixels are available for alternate purposes as further described herein.

Figure 4A:
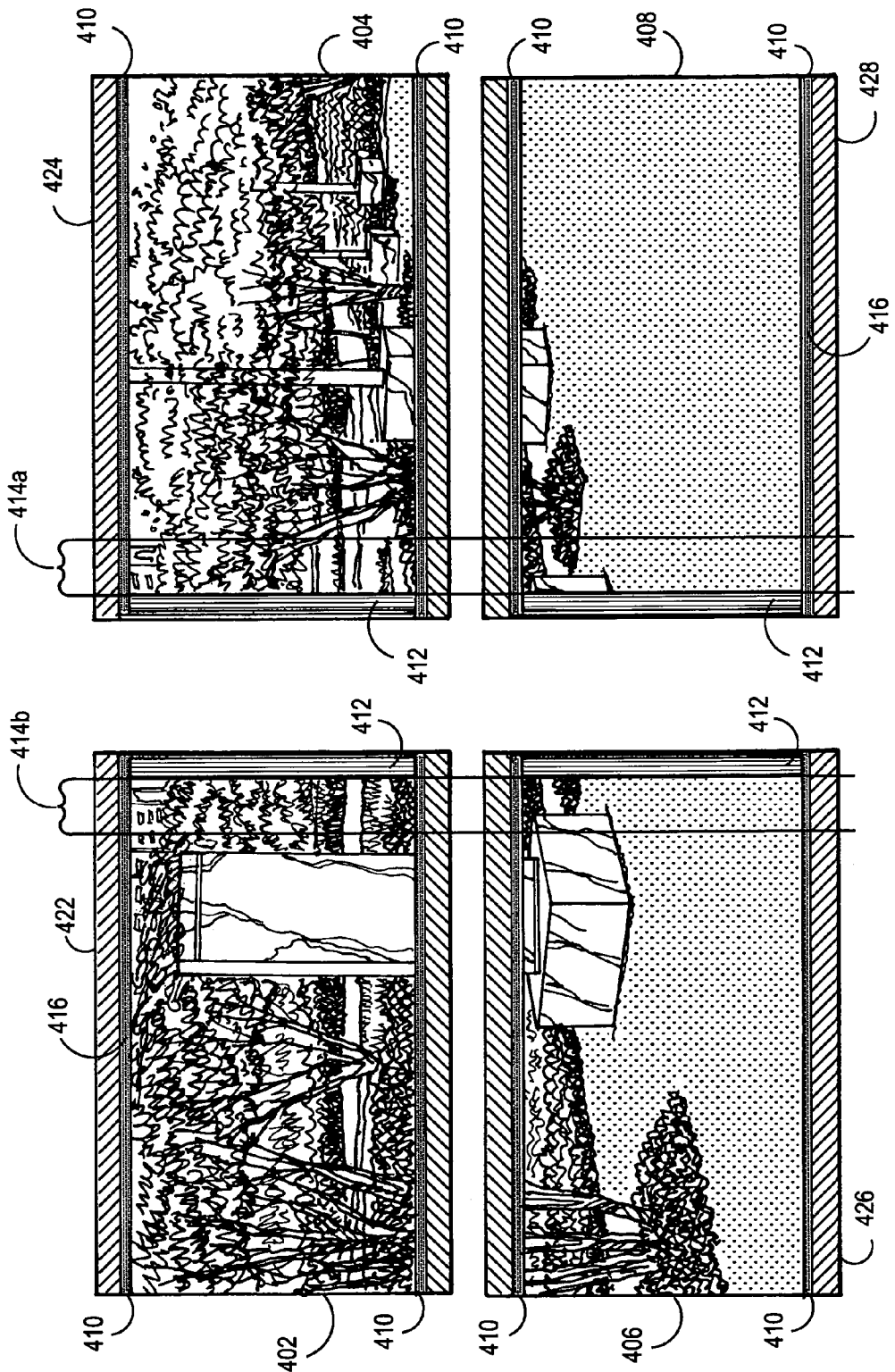
FIG. 4A is a representation of four individual image tiles embedded in video frames as they may be oriented for reassembly into a reconstructed image according to one embodiment of the disclosed systems and methods.

FIGS. 4A-4C illustrate one exemplary embodiment as it may be employed in the reassembly of four 640×360 tiles 402, 404, 406 and 408 that have been inserted for transmission in four respective NTSC frames 422, 424, 426 and 428, e.g., by Image Deconstruction circuitry 228 of system 200 or other suitable circuitry. As shown in FIG. 4A, each tile 402, 404, 406 and 408 may be vertically centered with a vertical line alignment pattern 410 inserted into one of the available lines preceding the active image, e.g., by Alignment Data Insert circuitry 230 of system 200 or other suitable circuitry configuration. In the illustrated embodiment of FIG. 4A, each vertical alignment pattern is also shown provided with an optional tile identifier pattern 416 therein, e.g., also inserted by Alignment Data Insert circuitry 230 of system 200 or other suitable circuitry configuration. In such an embodiment, a vertical line alignment pattern 410 with tile identifier pattern 416 may be used to uniquely identify each tile for reassembly with other tiles into a larger image 400, e.g., as upper left quadrant tile of the larger image, upper right quadrant tile of the larger image 400, etc. In addition, the placement of the alignment pattern 410 in the video stream may be used for proper vertical alignment and reassembly of each tile with adjacent tile/s, e.g., by Image Reconstruction circuitry 252 of video system 200 or other suitable circuitry configuration. For example, a vertical alignment pattern 410 may be defined such that the active image of each 640×360 tile starts at a fixed number of lines (e.g., 16 lines) from the video line that this vertical alignment pattern occupies. In another exemplary embodiment, vertical blanking information area, such as that associated with closed caption, may alternatively or additionally be used to indicate that the field/frame is a "tile" associated with a larger image, as well as to indicate the relative spatial relationship of the tile with respect to the original larger image.

It will be understood that the foregoing examples of vertical alignment patterns are exemplary only, and that other configurations of vertical alignment information and/or tile identifier information (e.g., configured as one or more other types of patterns and/or codes) may be employed that are suitable for vertical alignment and/or identification of a given tile with respect to other tiles of a given image. For example, a tile identifier pattern or other identifier information may be employed that is separate from a vertical alignment pattern or other vertical alignment information employed for the same tile.

Also shown in the exemplary embodiment of FIG. 4A is how each tile 402, 404, 406 and 408 may be configured to support horizontal alignment information, in this example in the form of horizontal alignment patterns 412 e.g., inserted by Alignment Data Insert circuitry 230 of system 200 or other suitable circuitry configuration. In the illustrated embodiment, a horizontal alignment pattern 412 may be configured, for example, to occur temporally to the right of each of the tiles associated with the left of the original image and to the left of each of the tiles associated with the right of the original image.

One exemplary horizontal alignment pattern may be as simple as a set of four 3 pixel wide pulses (pure white pixels on a black background) that may be used (e.g., by Image Reconstruction circuitry 252 of video system 200 or other suitable circuitry configuration) to allow the alignment of the segments or tiles horizontally, e.g., via simple correlation. For example, as shown in FIG. 4B, a horizontal alignment correlation value may be obtained by horizontally shifting lines 412a and 412b of respective horizontally adjacent tiles relative to each other (as indicated by the arrow in FIG. 4B) and performing a standard correlation function 450. In such a case, the peak correlation 452 occurs when the pulses 430a and 430b for horizontally adjacent tiles are at maximum alignment with respect to each other. This methodology may be used to take into account the sampling jitter that may occur when the incoming analog image is being re-sampled by a video decoder chip over multiple frame times.

In a further exemplary embodiment, each tile 402, 404, 406 and 408 may also be configured to include a small horizontal "overlap" area 414, e.g., consisting of 16 pixels, e.g., by Alignment Data Insert circuitry 230 of system 200 or other suitable circuitry configuration. Once the tiles 402, 404, 406 and 408 are properly aligned using horizontal alignment patterns 412 via the horizontal alignment technique described above, the respective overlap areas 414b and 414a of horizontally adjacent tiles (e.g., tiles 402 and 404, and tiles 406 and 408) may be combined (e.g., using fading transfer function 440 and summation and limiting function 442) as indicated in FIG. 4C to form the final larger image 400 shown in FIG. 4D. This combination may be performed, for example, by Image Reconstruction circuitry 252 of video system 200 or other suitable circuitry configuration. It will be understood that techniques other than the simple linear approximation approach illustrated may be employed, e.g., non-linear techniques such as square root or logarithmic, or techniques that take into account the image contrast around the combined area such as adaptive filtering.

It will be understood that the foregoing examples of horizontal alignment patterns and methodology are exemplary only, and that other configurations of horizontal alignment information (e.g., configured as one or more other types of patterns and/or codes) may be employed that are suitable for horizontal alignment and/or identification of a given tile with respect to other tiles of a given image. It will also be understood that alignment and overlap blending may also occur vertically to allow for the case where the tiles are first compressed and stored and then later retrieved, decompressed, and reassembled. This allows for any visual artifacts that may occur due to the compression technique at the image boundaries to be masked. If vertical blending is performed then the tile identifiers may also be used for alignment purposes.

To maximize resolution and bandwidth availability, it will be understood that the tile reassembly techniques described herein may be extended to utilize more of the used pixel area through the proper application of image scaling. For example, the 640 image may be horizontally scaled to 704 before transmission, which still allows for the 16 pixels required for the pattern and overlap area shown in FIGS. 4B and 4C.

It will be understood that the forgoing example utilizing 1280×780 pixel HDTV resolution is exemplary only, and that other image segmentation and reconstruction configurations may be employed to fit a given application. For example, a 1920×1080 HDTV resolution image may be divided into six 640×480 tiles and reconstructed into a single image in a manner similar to described above.

Image Signal Processing for Transmission Across Bandwidth Limited Interface

Figure 8A:
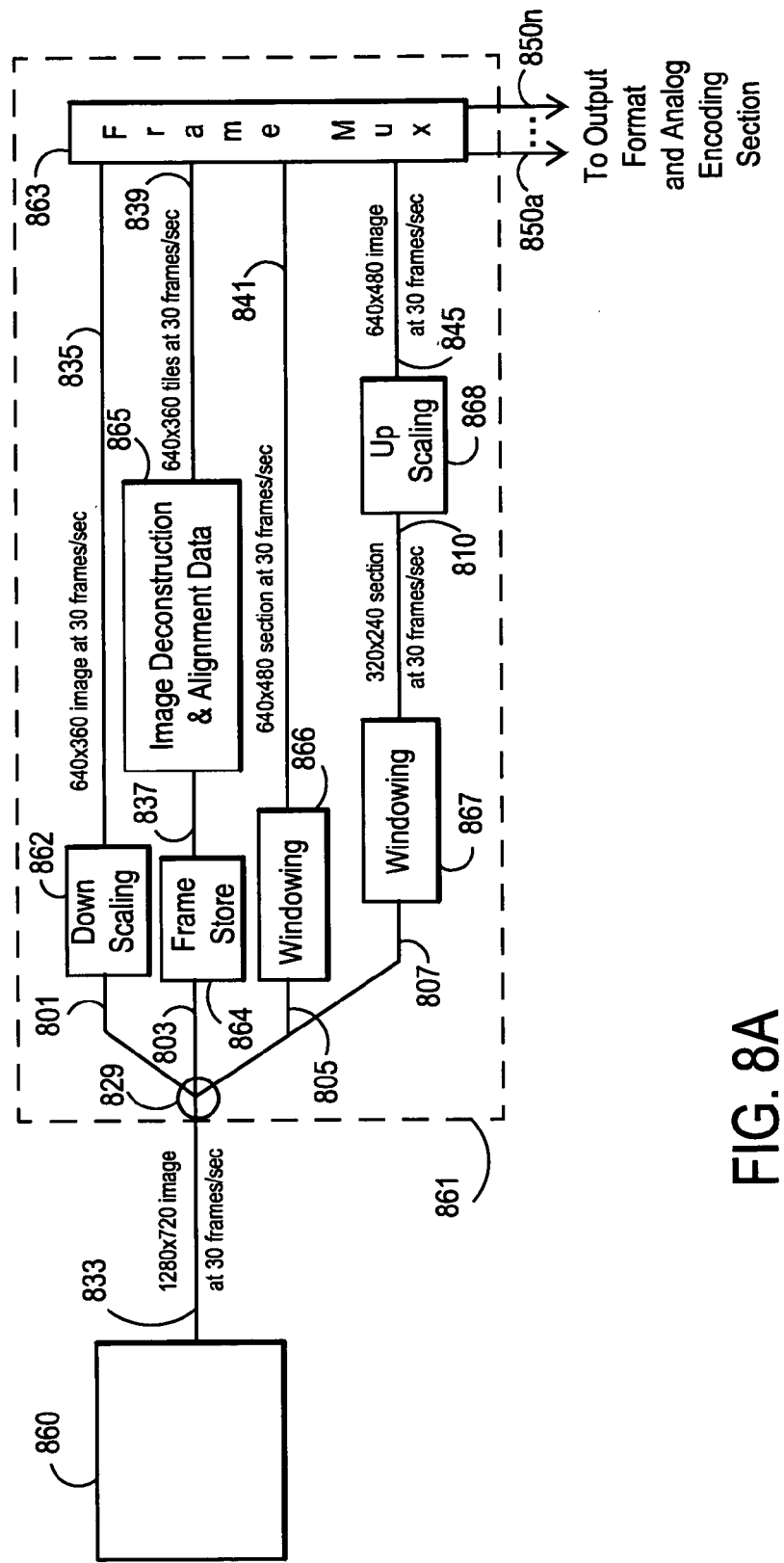
FIG. 8A is a diagram showing image data logic flow according to one embodiment of the disclosed systems and methods.

FIG. 8A illustrates one exemplary embodiment of image data logic flow as may be implemented, for example, using multi-stream image processing circuitry components of camera 202 of FIG. 2 or using other suitable configuration of multi-stream image processing circuitry. In addition to the exemplary circuitry embodiment of FIG. 2, it will be understood that the image data logic flow illustrated in FIG. 8A may be implemented with any alternative circuitry configuration suitable for accomplishing one or more of the image data processing tasks described in relation thereto.

As shown in FIG. 8A, a digital image data 833 may be received from any suitable image source 860 and then travel down one of four exemplary paths before being selected by the frame multiplexing operations 863 for final processing for transmission across a bandwidth-limited interface in a manner as previously described. This exemplary video flow may be employed, for example, to support the various selectable display modes of Examples 1-4 described herein. In this embodiment, multiple windows and scaling functions may be implemented to provide for multiple zoomed or non-zoomed images which may then be combined into a single image (or frame) for analog transmission or sent as sub-images within subsequent frames. These windowing and scaling mechanisms may be implemented by logic contained within an FPGA or ASIC, or alternatively may be performed by a DSP or other suitable high speed processing element.

In the illustrated embodiment of FIG. 8A, image source 206 may provide digital image data 833 (e.g., full high resolution image data of 1280×720 pixels at 30 frames per sec or fps). Image source 860 may be any source of a suitable image, such as is described elsewhere herein. For example, image source 860 may be an image storage device, may be an image sensor that produces raw image data that may be converted into desired digital video form (e.g., standard format digital video form) by conditioning circuitry, etc. As illustrated, image source 860 may provide digital image data 833 for multi-stream image processing 861, e.g., as may be performed by multi-stream image processing circuitry 270 of FIG. 2 or other suitable multi-stream image processing circuitry configuration. Digital image data 833 may be in any suitable digital image data form and, in one exemplary embodiment, may be digital video data having an image size of 1280×720 square pixels at 30 frames/second (fps), although digital image data 833 may also be of greater than or lesser resolution and/or greater than or lesser frame rate in other embodiments. Although digital image data 833 may originate from an image source such as image sensor 222 of FIG. 2, it will be understood that digital image data may be received for multi-stream image processing operations 861 from any other suitable image source configuration, such as described elsewhere herein. Also possible is optional additional image processing (e.g., such as performed by optional supplemental image processing circuitry 223 of FIG. 2) that may be performed prior to providing digital image data for multi-stream image processing 861.

Still referring to the exemplary embodiment of FIG. 8A, multi-stream image processing 861 may be implemented to provide four possible processing paths for digital image data 833, which for purposes of this discussion will be assumed to represent a high resolution image of a desired scene. Selection of one or more of these paths may be accomplished, for example, using a switch, data router, or other suitable selection mechanism 829 provided within circuitry configured for performing multi-stream image processing operations 861. For example, referring to multi-stream image processing circuitry 270 of FIG. 2, bypass circuitry may be provided within frame store circuitry 224 or as separate switchable data provided from conditioning circuitry 221/optional supplemental image processing circuitry 223 to either one of frame store circuitry 224 or window circuitry 225/image scaler circuitry 226.

In first data path 801, digital image data 833 may be downscaled in downscaling operations 862 (e.g., by image scaling circuitry 226 of FIG. 2) to produce downscaled video data 835 of the entire desired scene in standard resolution, e.g., an image scene size of 640×360 square pixels at 30 fps, for transmission as data 835 across analog interface 206 of FIG. 2 after frame multiplexing operations 863 that may be performed, for example, by image mux circuitry 232. In such an embodiment, when received and processed by multiple stream image processing circuitry (e.g., PC-based DVR 204), data 835 may be displayed (e.g., on image display 208 of system 200), for example, as a 640×360 standard resolution image of the entire desired scene at 30 fps.

In second data path 803, frames of the entire desired scene of digital image data 833 may be stored or staged in frame store operations 864 (e.g., by frame store circuitry 224 of FIG. 2) and then provided in data path 837 for image deconstruction and insertion of alignment data at 865 (e.g. image deconstruction circuitry 228 and alignment data insert circuitry 230 of FIG. 2). In this regard, an entire frame of the desired scene or other type of image may be segmented into multiple tiles (e.g., four quadrants), and appropriate alignment data may be inserted at 864 for image reconstruction purposes and the resulting tiled image information provided as tiled image data 839 (e.g., an image tile size of 640×360 square pixels at 30 fps) for transmission as data 839 across analog interface 206 of FIG. 2 after frame multiplexing operations 863. When received and processed by multiple stream image receiving circuitry (e.g., PC-based DVR 204 of FIG. 2), data 839 may be displayed (e.g., on image display 208 of FIG. 2), for example, as a reconstructed 1280×720 high resolution image of the entire desired scene at 30 fps.

In third data path 805, a selected portion of the desired scene or other image may be extracted from frames of digital image data 833 during windowing operations 866 (e.g., performed by window circuitry 225 of FIG. 2) to form a windowed partial image of the desired scene or other type of image, e.g., an image window size of 640×480 square pixels at 30 fps, for transmission as data 841 across analog interface 206 after frame multiplexing operations 863. When received and processed by multiple stream image receiving circuitry (e.g., PC-based DVR 204), data 841 may be displayed (e.g., on image display 208 of FIG. 2), for example, as a 640×480 image of the entire desired scene at 30 fps.

In fourth data path 807, a selected portion of the desired scene or other image may be extracted from frames of digital image data 833 during windowing operations 867 (e.g., by window circuitry 225 of FIG. 2) to form a windowed partial image of the desired scene or other image, e.g., an image window size of 320×240 square pixels at 30 fps, which is represented by windowed partial image data 810 in FIG. 8A. The windowed partial image of data 810 may then be upscaled during upscaling operations 868 (e.g., by image scaler circuitry 226 of FIG. 2) to form a zoomed partial image of the desired scene or other type of image, e.g., a 2X zoomed image window size of 640×480 square pixels at 30 fps, for transmission as data 845 across analog interface 206 after frame multiplexing operations 863. It will be understood that in one embodiment, the amount of magnification of a zoomed image window may be controlled by the size of the portion of the desired scene that is selected for extraction in windowing operations 867 prior to upscaling operations 868 (e.g., when upscaling to a fixed image size in upscaling operations 868). However, it is also possible to control the amount of upscaling (e.g., by varying the size of the upscaled image produced during upscaling operations 868). When received and processed by multiple stream image receiving circuitry (e.g., PC-based DVR 204 of FIG. 2), data 845 may be displayed (e.g., on image display 208 of FIG. 2), for example, as a 1280×960 zoomed image of the entire desired scene at 30 fps. It is also understood that less multiple smaller segments of the larger image may be transmitted to 204 of FIG. 2 via 850 and individually scaled up to larger images at 204.

During frame multiplexing operations 863 (e.g., performed by Image Mux circuitry 232), data is selected for transmission (e.g., data 835, 839, 841 and/or 845) and may be output as selected image data 850 for further appropriate buffering and analog encoding for transmission across one or more analog interfaces (e.g., analog interface 206 of FIG. 2). In this regard identity of the multiple streams transmitted are determined by selection of data 835, 839, 841 and/or 845 during frame multiplexing operations 863.

It will be understood that the illustrated embodiment of FIG. 8A is exemplary only, and that any other combination of different number and types of image streams and stream operations may be implemented. In this regard, the number of data paths may be greater or lesser than four, and any given data path may represent any one or more window or scaling operations suitable for achieving desired image characteristics. Furthermore, although not illustrated in FIG. 8A, it will be understood that the frame rate of any given image data path may vary as may be desired in order to meet the needs of a given application (e.g., to allow transmission of the desired amount of image information within the bandwidth of an analog interface.

Tile Identifier Pattern Insertion and Detection

As previously described, image video signal 839 of FIG. 8A may contain tiled image information (e.g., two or more tiles) for transmission across an analog interface/s to suitable circuitry for reconstruction or reassembly of the multiple tiles into a single image. Such tiled information may be created, for example, by image deconstruction circuitry 228 and alignment data insert circuitry 230 of FIG. 2 or by any other suitable configuration of one or more circuits using, for example, the signal processing flow described in relation to signal 839 of FIG. 8A or any other suitable signal processing methodology.

FIG. 9 illustrates one exemplary embodiment of a representative 640×480 de-interlaced active frame 900 having a vertical line alignment pattern 410 that has been inserted into one of the available lines preceding the active image 910. As previously described, vertical alignment pattern 410 may also be provided with an optional tile identifier pattern 416. In this regard, FIGS. 11A-11D illustrate examples of tile identifier patterns 416 such as they may be employed in the practice of one exemplary embodiment of the disclosed systems and methods. FIG. 9 also shows right tile overlap area 912 and left tile overlap area 914 as they may be together present when frame 900 is a center tile, e.g., of a six tile image. It will be understood that only one of right tile overlap area 912 or left tile overlap area 914 need be present when frame 900 is either a right tile or left tile, e.g., of a four tile image. As shown in FIG. 9, vertical alignment pattern 410 with optional tile identifier pattern 416 may also be present below active tile area 910 in order to serve the purpose of vertical blending of the upper and lower tiles. As further shown, non-active tile areas 913 may be black.

With regard to horizontal overlap area format definition, active tile area 910 of frame 900 of FIG. 9 has been segmented from an original 1280×720 image. In order to split the 1280×720 image into four separate 640×360 tiles and reconstruct the original image without presenting a noticeable seam or other visible artifact an overlap area 912 or 914 may be defined that is 8 pixels wide, i.e., defined on the right border of a left tile or defined on the left border of a right tile. This overlap area 912 or 914 may contain 4 pixels that are repeated for both the left and right tiles, and 4 pixels that are used as a horizontal alignment mechanism 412. Alternatively, both overlap areas 912 and 914 may be defined on respective left and right borders in the case of a center tile.

Still referring to FIG. 9, it will be understood that additional and/or alternative types of tile identification information may be provided to further identify individual tile segments of an original image and/or to synchronize transmission and receipt of a given identified tile across an interface, e.g., to synchronize or coordinate camera circuitry 202 with frame grabber circuitry 250 of video system 200 of FIG. 2, such as under conditions where camera circuitry 202 and frame grabber circuitry 250 are turned on at different times. In one exemplary embodiment, additional lines of frame 900 may be employed to contain additional tile identifier information (not shown in FIG. 9) to distinguish sequential transmitted frames containing respective sequential tiled images from each other, such as four sequentially transmitted frames of a four-tile image such as shown in FIG. 4A. For example, line 28 may be transmitted alternately as full white and full black to indicate frame transmission sequence, e.g., line 28 may be full white to indicate that a given frame 900 is transmitted as frame number one or as frame number three, and line 28 may be full black to indicate that a given frame 900 is transmitted as frame number two or as frame number four. Upon receipt of each frame 900 (e.g., by frame grabber 250), line 28 may be examined to determine whether the given frame is a first or third transmitted frame, or is a second or fourth transmitted frame. It will be understood that additional identification information may be provided to further identify or specify the sequential identity of a given frame 900, e.g., line 27 may be alternately full white and full black in combination with line 28 to specify whether a given frame 900 is transmitted as frame zero (e.g., lines 27 and 28 both white), one (e.g., line 27 white, line 28 black), two (e.g., line 27 black, line 28 white) or three (lines 27 and 28 both black).

Figure 13:
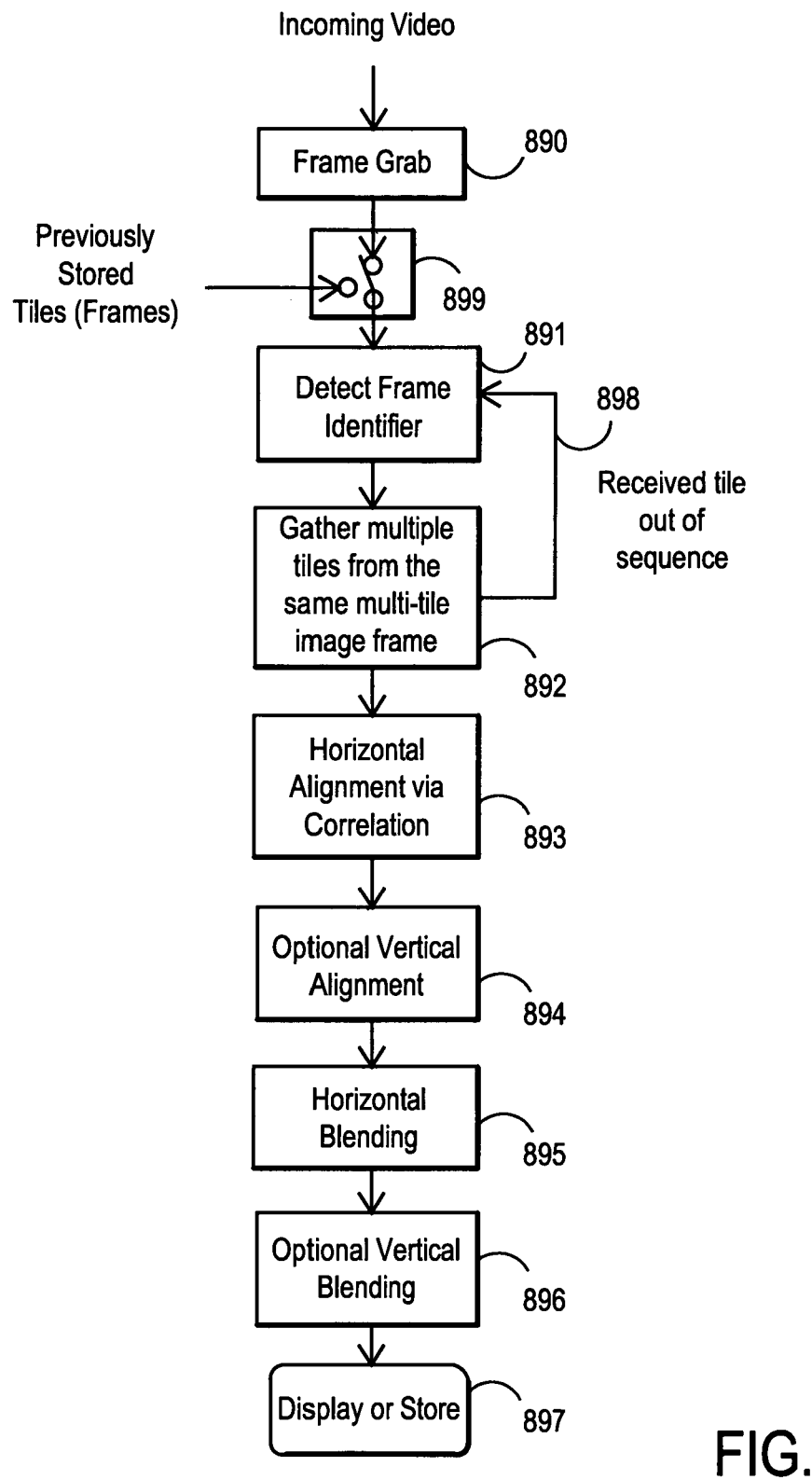
FIG. 13 illustrates image reconstruction methodology according to one embodiment of the disclosed systems and methods.

FIG. 13 illustrates one exemplary image reconstruction embodiment that may be implemented to reconstruct or reassemble an image from multiple tiles transmitted across an analog interface according to the disclosed systems and methods. The methodology of FIG. 13 may be implemented, for example, using multiple stream image receiving circuitry in the form of DVR 204, or using any other circuitry configuration suitable for image reconstruction/reassembly. As illustrated in FIG. 13, an incoming analog video signal (e.g., analog video signal received across analog interface 206 from camera 202) containing image tiles of a desired video scene may be received and converted from analog to digital signal form in frame grab step 890 (e.g., by frame grabber circuitry 250 or other suitable circuitry). In optional selection step 899, image tiles from frame grab step 890 may be selected for further processing, or alternatively, stored image tiles from an image storage source (e.g., image storage 256 or other suitable image storage device) may be selected for further processing.

Still referring to FIG. 13, tile identifier information of the multiple image tiles associated with a given multi-tile image selected in step 899 may be detected in step 891, and gathered together in step 892 (e.g., by Image Reconstruction circuitry 252 of video system 200). In the event that one or more tiles are received out of sequential order, they may be re-queued for processing as shown in step 898.

Next, the gathered multiple tiles of step 892 may be horizontally aligned for assembly into the full multi-tile image in step 893 using horizontal alignment information included in the individual multiple tiles. In optional step 894, the gathered multiple tiles may be vertically aligned for assembly into the full multi-tile image based on optional vertical alignment information that may be included in the tiles. In step 895, tiles received from step 893 (or from optional step 894 when present) may be horizontally blended together, followed by optional vertical blending of the tiles when appropriate in optional step 896. The blended (reconstructed) image may then be displayed (e.g., on image display 208 or other suitable display device/s) in step 897. It will be understood that the particular steps and sequence of steps illustrated and described in relation to FIG. 13 are exemplary only, and that other sequences, and/or additional or fewer steps may be employed. For example, horizontal alignment and blending steps 893 and 894 may be sequentially interchanged with vertical alignment and blending steps 895 and 896, etc.

With regard to the image reconstruction embodiment illustrated and described in relation to FIG. 13, FIG. 10 illustrates placement of a tile alignment pattern 410 with tile identifier pattern 416 when two respective tiles 1020 and 1022 are vertically assembled to form a vertical frame 1024, for example, by image reconstruction circuitry 252 of FIG. 2 or by any other suitable configuration of one or more circuits. As shown, a tile alignment pattern 410 and tile identifier pattern 416 may be present above and below the active tile areas 1010 of each of tiles 1020 and 1022, with a vertical blanking area 1030 being provided above the active tile areas 1010 of each of tiles 1020 and 1022. A horizontal blanking area 1032 may be present to the left of the active tile areas 1010 of each of tiles 1020 and 1022. These blanking areas may be optionally employed to contain other information such as camera ID, time stamp, etc.

Referring again now to FIGS. 9 and 11A-11D, following is an exemplary sequence of steps that may be employed to verify that frame 900 of FIG. 9 represents a high resolution tile instead of normal NTSC/PAL video, and to determine which tile segment (e.g., upper left, upper right, lower left, lower right) is contained therein:

Step 1: Verify lines 0 thru 28 and lines 31 thru 59 of frame 900 are full black;

Step 2: Verify lines 29 and 30 of frame 900 contain one of the patterns 1002, 1004, 1006 or 1008 of FIG. 11, e.g., via correlation;

Step 3: While performing step 2, store which pattern (i.e., 1002, 1004, 1006 or 1008) was detected on lines 29 and 30; and Step 4: Analyze the pattern detected in step 3 to determine the tile placement.

Figure 11A:
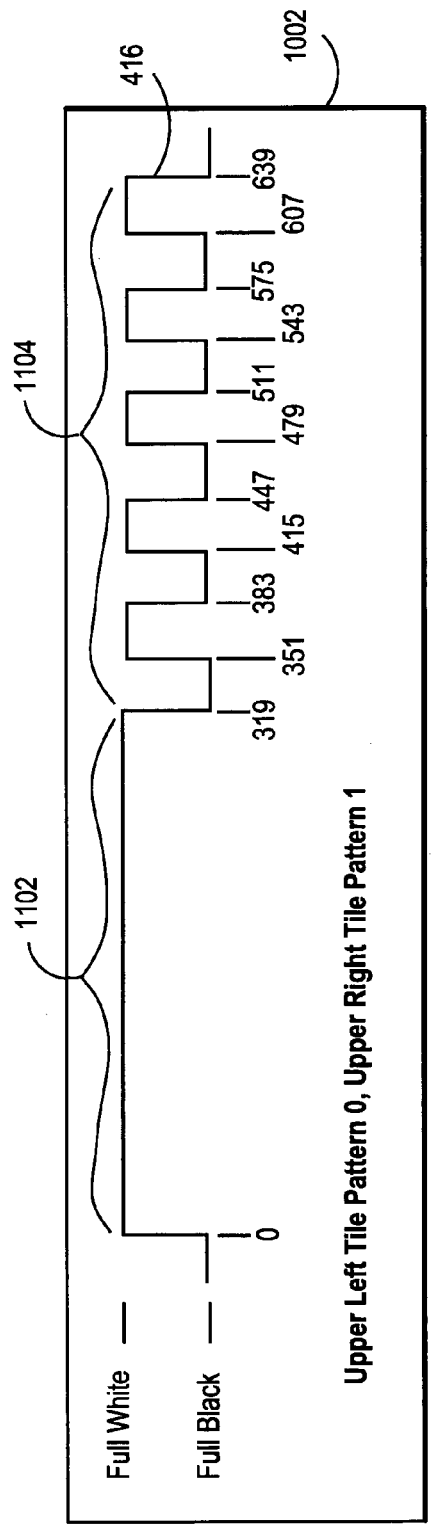
FIG. 11A-11D illustrates tile identifier patterns according to one embodiment of the disclosed systems and methods.
Figure 11B:
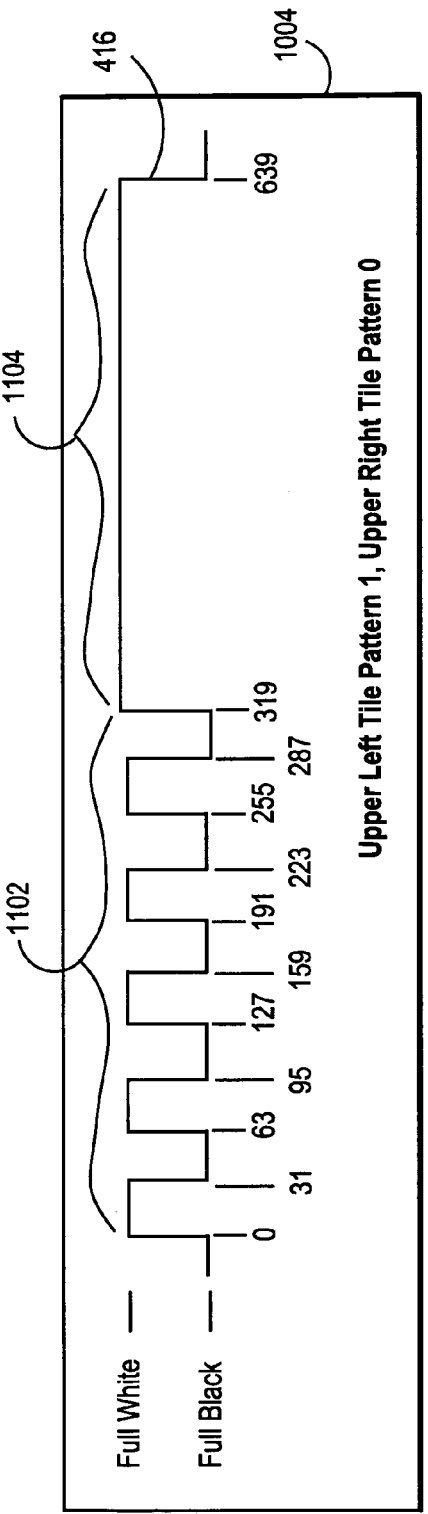
Figure 11C:
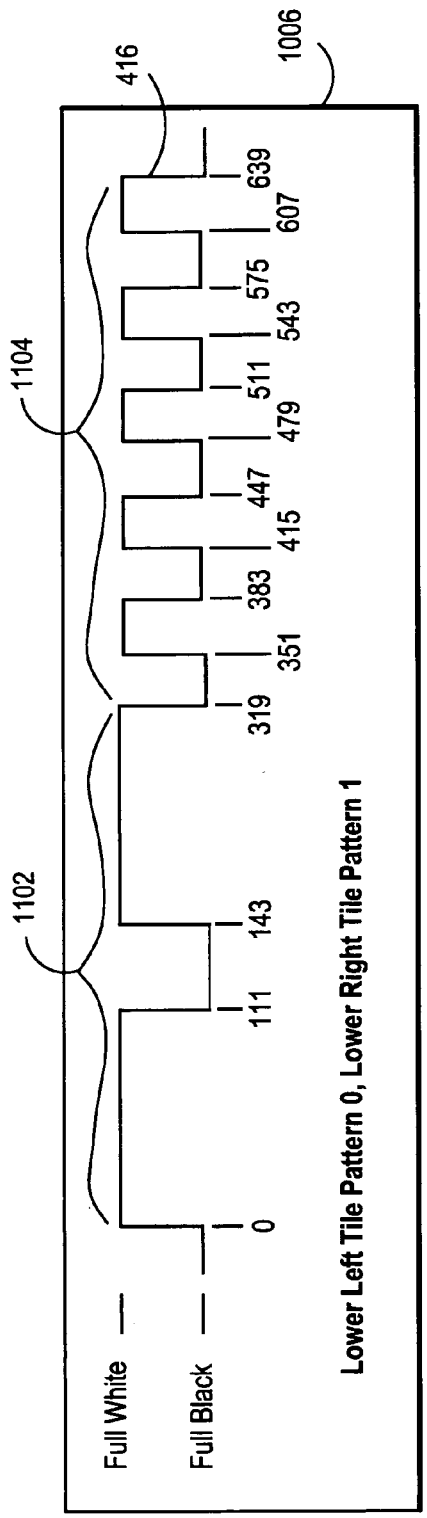
Figure 11D:
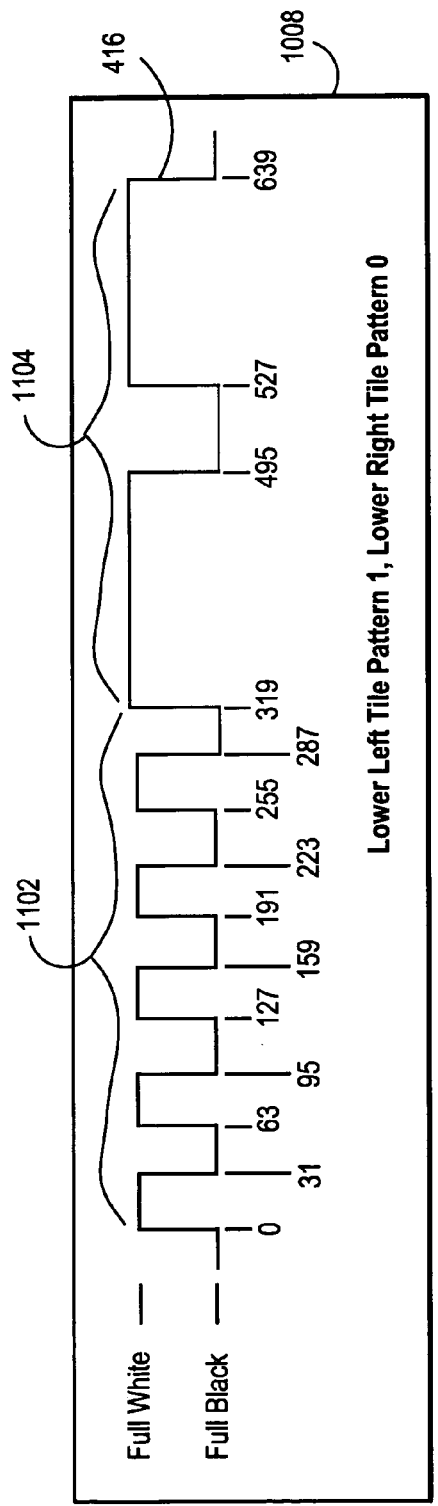

With regard to Step 4 of the above sequence, exemplary patterns 1002, 1004, 1006 or 1008 of respective FIGS. 11-11D each contain information that identifies both vertical and horizontal positioning of the tile segment of frame 900 within an image assembled from four tile segments. In this regard, a left pattern portion 1102 and a right pattern portion 1104 may be provided for each pattern. As illustrated, either the left pattern portion 1102 or the right pattern portion 1104 of each tile may be provided as an alternating white and black pattern to indicate horizontal positioning of the given tile, i e., whether the given tile is a left or right tile segment. For example, patterns 1002 and 1006 each have right pattern portions 1104 that repeatedly alternate between full white and full black to indicate that the tile is a right pattern. In the same manner, patterns 1004 and 1008 each have left pattern portions 1102 that repeatedly alternate between full white and full black to indicate that the tile is a left tile segment. Vertical positioning of a given tile may be indicated by the remaining pattern portion that is not used to indicate the horizontal positioning of the tile. For example, patterns 1002 and 1004 each have remaining pattern portions, 1102 and 1104 respectively, that have a non-broken full white pattern to indicate that the given tile is an upper tile. Patterns 1006 and 1008 each have remaining pattern portions, 1102 and 1104 respectively, that alternate twice between full white and full black to indicate that the given tile is a lower tile.

It will be understood that the illustrated patterns and pattern configurations of FIGS. 9-11 are exemplary only and that any other alignment and/or identifier pattern or other form of alignment and/or identifier information may be employed that is suitable for aligning adjacent tiles and/or identifying placement of a given tile within a given reconstructed image. For example, other forms of suitable identifier information include, but are not limited to identifier code, time stamp, camera identification, camera position in the case of a PTZ camera, etc. Other forms of suitable alignment information include, but are not limited to, square wave patterns, single pulse, ramp, smooth curve, etc. Furthermore, it will be understood that alignment and/or identifier information may be adaptive, meaning that the pattern can be commanded to change based on the type of compression method that is used or how stable the frame grabber interface is.

Since the standard DVR decoder produces 640×480 images, the resultant reconstructed image horizontally will be less than 1280 pixels. For example, in this described four-tile embodiment, a total of 8 pixels are used for alignment purposes and a total of 8 pixels are used to create a blended 4 pixel output. Therefore, the resultant image horizontal resolution will be 1268 pixels (i.e., 1280 total pixels—8 pixels alignment—4 pixels lost due to overlap). In terms of horizontal pixels numbered from 0 to 639 for each left and right tile, the horizontal structure of the reconstructed image of this embodiment may be correlated to pixels 0 to 1279 of the original image and characterized as follows:

| | Left Tile (upper or lower): |
|---|---|
| Pixel 0-631 = | pixels 4 thru 635 of the original image |
| Pixel 632-635 = | pixels 636 thru 639 of the original 1280 image |
| Pixel 636 = | alignment pattern pixel 0 = full black |
| Pixel 637 = | alignment pattern pixel 1 = full white |
| Pixel 638 = | alignment pattern pixel 2 = full black |
| Pixel 639 = | alignment pattern pixel 3 = full white |
| | Right Tile (upper or lower): |
| Pixel 0 = | alignment pattern pixel 0 = full black |
| Pixel 1 = | alignment pattern pixel 1 = full white |
| Pixel 2 = | alignment pattern pixel 2 = full black |
| Pixel 3 = | alignment pattern pixel 3 = full white |
| Pixel 4-7 = | pixels 636 thru 639 of the original 1280 image |
| Pixel 8-639 = | pixels 640 thru 1271 of the original image |

Note:
Original image pixels 0-3 and 1272-1279 may be discarded.

Although implementation of a horizontal overlap area is described in this example, it will be understood that an overlap area may be provided at one or more edges of a given video frame adjacent one or more respective borders of a tile segment contained in said given video frame, regardless of orientation (e.g., horizontal overlap area, vertical overlap area, etc.).

It will be understood that the preceding text describes one exemplary embodiment of the disclosed systems and methods that may be employed in the separation of an image into multiple (e.g., four) individual or separate tiles, and in the reconstruction of the image from the multiple separate tiles. It will be understood that this embodiment is exemplary only, and that other tile alignment configurations, tile segment sizes, original image sizes and/or number of tile segments may be employed to segment an original image into two or more multiple tile segments and to reconstruct at least a portion of the original image by assembling the multiple tile segments together.

Figure 3A:
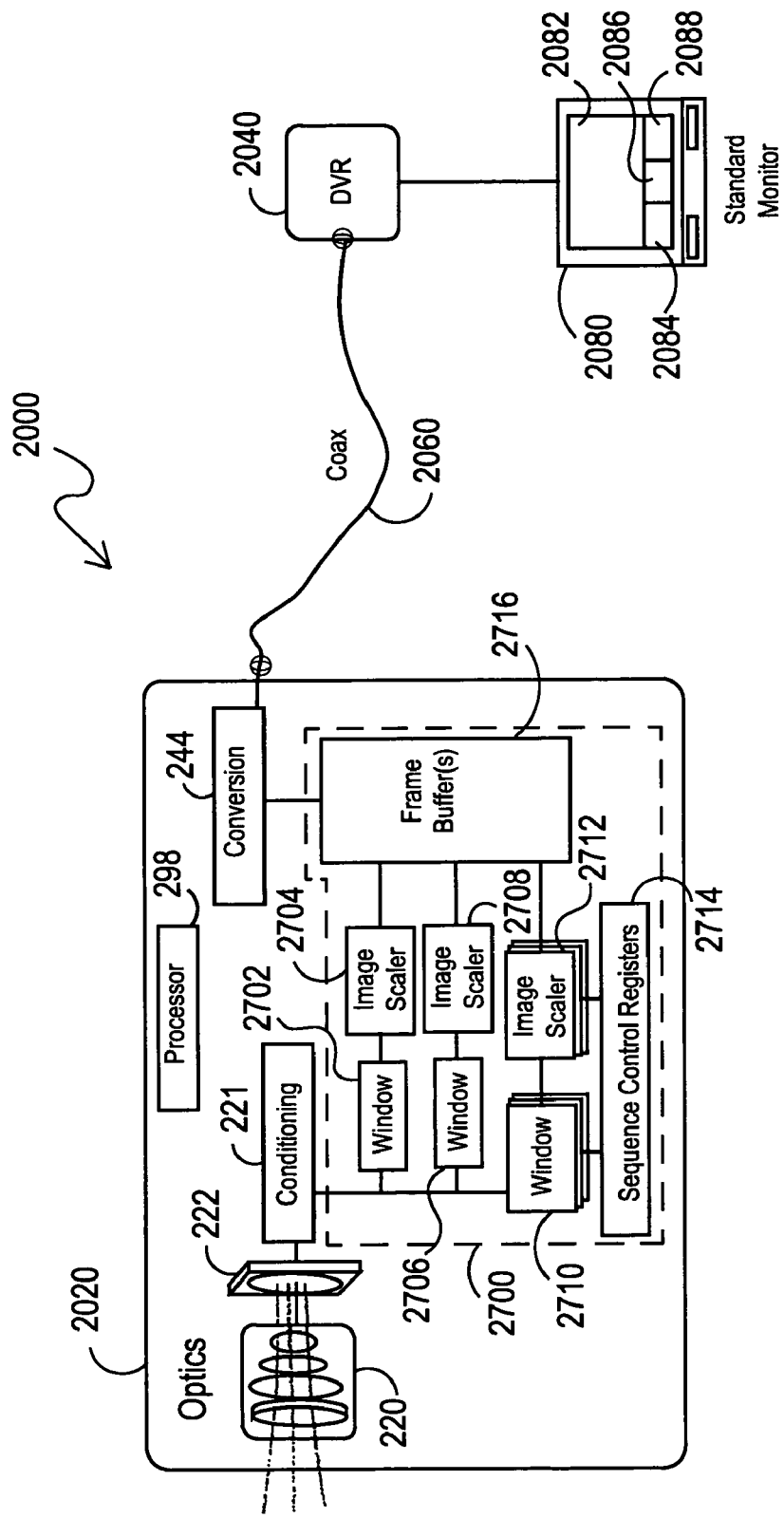
FIG. 3A is a simplified schematic of a video system according to one embodiment of the disclosed systems and methods.

Transmission Across Bandwidth Limited Analog Interface for Display on Analog Display Device FIG. 3A illustrates another embodiment of the disclosed systems and methods employing multiple resolution image creation circuitry that may be coupled to create and provide multiple image information in multiple resolutions via analog signals for display on one or more analog display devices. In this regard, FIG. 3A illustrates one exemplary embodiment of a video system 2000 having multiple resolution image capability that may be implemented in the practice of the disclosed systems and methods, for example, to create and provide multiple-resolution image transmission capability over a conventional analog transmission interface 2060.

As shown in FIG. 3A, video system 2000 may include multiple resolution image creation circuitry in the form of a digital camera 2020 that includes multiple resolution image processing components (2702, 2704, 2706, 2708, 2710, 2712, 2714 and 2716), the features of which may be implemented using any suitable hardware and/or software configuration (e.g., digital signal processor ("DSP"), application specific integrated circuit, field programmable gate array, combinations thereof, etc.). Also shown in FIG. 3A is DVR 2040 coupled between analog interface 2060 and analog display device 2080, in this case a standard analog display monitor 2080. Note that the DVR is not necessary for proper display on the monitor 2080. As shown in FIG. 3A, video system 200 may be implemented in one embodiment to provide a multiple resolution image display on monitor 2080 (e.g., simultaneous display of an entire standard resolution scene 2082 and three selected zoomed areas 2084, 2086 and 2088 of the scene in the area beneath the entire scene 2082).

Although FIG. 3A illustrates a multiple resolution video system 2000 capable of providing a particular multiple resolution image capability (e.g., in this exemplary embodiment simultaneous display of entire non-zoomed scene at standard resolution with three zoomed resolution areas displayed below the entire scene), it will be understood that the disclosed systems and methods may be alternatively implemented to provide a video system capable of providing any combination of zoomed and/or non-zoomed resolution images. For example, one or more zoomed areas may be simultaneously displayed with a non-zoomed area, or two or more zoomed areas may be simultaneously displayed alone (i.e., without simultaneous display of non-zoomed area). Furthermore, the particular size of any given zoomed or non-zoomed area relative to the size of other images that are simultaneously displayed may be varied as so desired, e.g., three zoomed areas may be displayed in a space occupying greater than half of the overall display space simultaneously with a non-zoomed image that occupies less than half of the overall display area. In addition, positioning of any given zoomed or non-zoomed area relative to positioning of other images that are simultaneously displayed in the same display space may also be varied as so desired, e.g., three zoomed areas may be simultaneously displayed above a non-zoomed area. Thus, it will be understood that the particular combination of zoomed and/or non-zoomed images simultaneously displayed on a common display, as well as the relative positioning and size thereof, may be varied (e.g., varied in real time or on a pre-determined basis) as needed or desired to meet the requirements of a given application.

In FIG. 3A, enhanced resolution digital camera 2020 is shown coupled to DVR 2040 and analog display device 2080 by analog interface 2060 (e.g., similar to the analog interface 106 of FIG. 1). In this regard, analog interface 206 may be any signal transmission format suitable for transmitting analog video signals. In one exemplary embodiment, analog interface 206 may be a typical coaxial cable-based analog video transmission format (e.g., standard composite video transmission interface). In this embodiment, analog interface is not necessarily bandwidth limited.

It will be understood that a standard composite video analog transmission interface is only one example of a suitable analog interface. Other examples of analog interfaces which may be advantageously employed to transmit a desired image signal using multi-resolution methodology include, but are not limited to, fiber optic, RF, etc. It will also be understood that additional processing or conversion may be employed as long as the transmission contains multi-resolution information in accordance with the systems and methods disclosed herein. Also note that in all cases simple viewing of the resultant image can be performed without the use of the DVR 2040.

As illustrated for the exemplary embodiment of FIG. 3A, digital camera 2020 includes optics 220 and an image source in the form of video or image sensor 222, in this exemplary embodiment a high resolution video sensor having a standard HDTV resolution of 1280×720 (as opposed to the standard 720×480 or 720×576 resolution of the video sensor of prior art digital camera 102 of FIG. 1). Although a HDTV high resolution sensor is illustrated and described in relation to the exemplary embodiment of FIG. 3A, it will be understood with benefit of this disclosure that a digital camera may be provided with any other type and/or resolution of high resolution or standard resolution image sensor or combination of such sensors that are suitable for generating image information having characteristics described further herein. Examples of suitable image sensors include, but are not limited to, image sensors having resolutions of 1920×1080, 1280×1024, 2048× 2048, etc. Suitable types of image sensors include, but are not limited to, CCD, CMOS, ultraviolet, near infrared, infrared, etc.

Although video system 2000 of the exemplary embodiment of FIG. 2 is configured having a camera with an image source in the form of an image sensor, it will be understood that a multiple resolution video system may be configured in the form of a camera or in a non-camera configuration with any one or more types of image sources that are suitable for generating image information in any picture format, e.g., including image sensors, storage devices capable of providing previously generated and stored image information, high frame rate images generated from RADAR or laser mapping, etc.). Furthermore, an image source may be a digital image source, or may be an analog image source producing an analog signal that is converted to digital signal via digital to analog ("DAC") conversion. In one embodiment, the disclosed systems and methods may be implemented to simultaneously receive, process and interleave image signals from two more image sources, e.g., image signals originating from wide-angle view and narrow angle view image sensors, image signals from IR and visible spectrum image sources, image signals from two image storage devices, etc.

As shown in FIG. 3A, camera 2020 may be configured with conditioning circuitry 221 that is capable of converting information from sensor 222 into video information having a desired digital video form. In this regard, conditioning circuitry 221 may be any circuitry suitable for converting raw sensor information into desired digital video form (e.g., standard format digital video form) including, but not limited to circuitry capable of converting CCD or CMOS sensor information (e.g., the bayer pattern red-green-blue ("RGB"), or alternately cyan-magenta-yellow ("CMY")) into planar RGB or CMY. Other possible tasks which may be performed by conditioning circuitry 221 include, but are not limited to, the control of a video sensor to produce the proper signal levels (exposure control), providing the correct synchronization of sensor control signals, and other conditioning aspects such as aperture correction (i.e. high frequency boost), white balance, color correction, demosaicing, dynamic range processing, formatting, etc. Color space conversion such as RGB or CMY to 4:4:4, 4:2:2 or 4:2:0 format YCrCb may also be performed by circuitry 221. In one exemplary embodiment, such conditioning processing may be performed via embedded digital logic or via algorithms running on a DSP or any other suitable processing element. It will be understood that type/s and combination/s of types of conditioning may vary and may be performed by circuitry 221 as desirable to fit the characteristics of a given application. It is also possible that no conditioning circuitry may be present, for example, in the case of a digital video signal received from a video source in the desired signal form (e.g., received in the form of a standard format digital video signal).

Not shown in FIG. 3A are optional image processing circuitry 223 and embedded processor/s 298, either or both of which may be present in camera 2020 to perform similar tasks as described in relation to camera 202 of FIG. 2.

As illustrated for the exemplary embodiment of FIG. 3A, multiple resolution image creation circuitry in the form of camera 2020 may be configured with multi-resolution image processing circuitry 2700 that includes Window circuitry components 2702, 2706 and 2710 coupled to respective image scaler circuitry components 2704, 2708 and 2712. Each of Window circuitry components 2702, 2706 and 2710 is configured to extract a selected portion of the higher resolution frame to form a windowed partial image, and each of image scaler circuitry components 2704, 2708 and 2712 is configured to scale the higher resolution image to a desired image size for inclusion into a NTSC, PAL, SECAM, etc. compatible format. In this regard, it will be understood that the zoomed resolution of a given image may be controlled by varying the extracted window size relative to the degree of image scaling between any given pair of coupled window and image scaler circuitry components (e.g., to achieve a zoomed, non-zoomed, or fractionally zoomed image).

It will be understood that multiple instances of window circuitry components (e.g., window circuitry components 2702, 2706 and 2710) and respectively coupled multiple instances of image scaler circuitry components (e.g., image scaler components 2704, 2708 and 2712) may be provided in order to implement separate image data paths that may be merged for transmission in a manner as will be described further herein, for example, in relation to FIG. 8B. Furthermore, as shown in FIG. 3A, within a given data path multiple instances of window circuitry components (e.g., multiple window circuitry components 2710) and respectively coupled multiple instances of image scaler circuitry components (e.g., multiple image scaler components 2712) may be provided in order to produce multiple windowed and scaled image areas within a given common data path that may be merged for transmission with images of other data paths in a manner as will be described further herein, for example, in relation to FIG. 8B. In the latter case, sequence control register circuitry 2714 (e.g., containing window definition registers and corresponding scaling definition registers) may be provided to direct sequential windowing and scaling operations for each of the multiple zoomed image areas created within a common data path, as will be described further herein in relation to FIG. 8B.

It will be understood that the number of instances of window circuitry components and respectively coupled image scaler components may be varied as needed or desired to fit the requirements of a given application, e.g., to provide more than three separate data paths, to provide less than three separate data paths, to implement more than one data paths that each have the capability to produce multiple zoomed image areas in the same common data path, etc.

Window circuitry components 2702, 2706 and 2710 and respective Image scaler components 2704, 2708 and 2712 may be implemented using any circuitry configurations suitable for respectively extracting portions of an image (e.g., higher resolution image) and for scaling the frames of the extracted image to frames having a desired resolution (e.g., to achieve the desired zoom magnitude) and having a resolution that is compatible with the video transmission interface (e.g., NTSC, PAL, SECAM, etc. compatible format), and for providing these scaled resolution frames to Frame Buffer circuitry 2716. Examples of suitable circuitry configurations that may be employed for Window circuitry components 2702, 2706 and 2710 and respective Image scaler components 2704, 2708 and 2712 include, but are not limited to, digital logic contained within an FPGA, ASIC, or standalone IC or algorithms running on a DSP or other suitable processing element, etc.

Figure 8B:
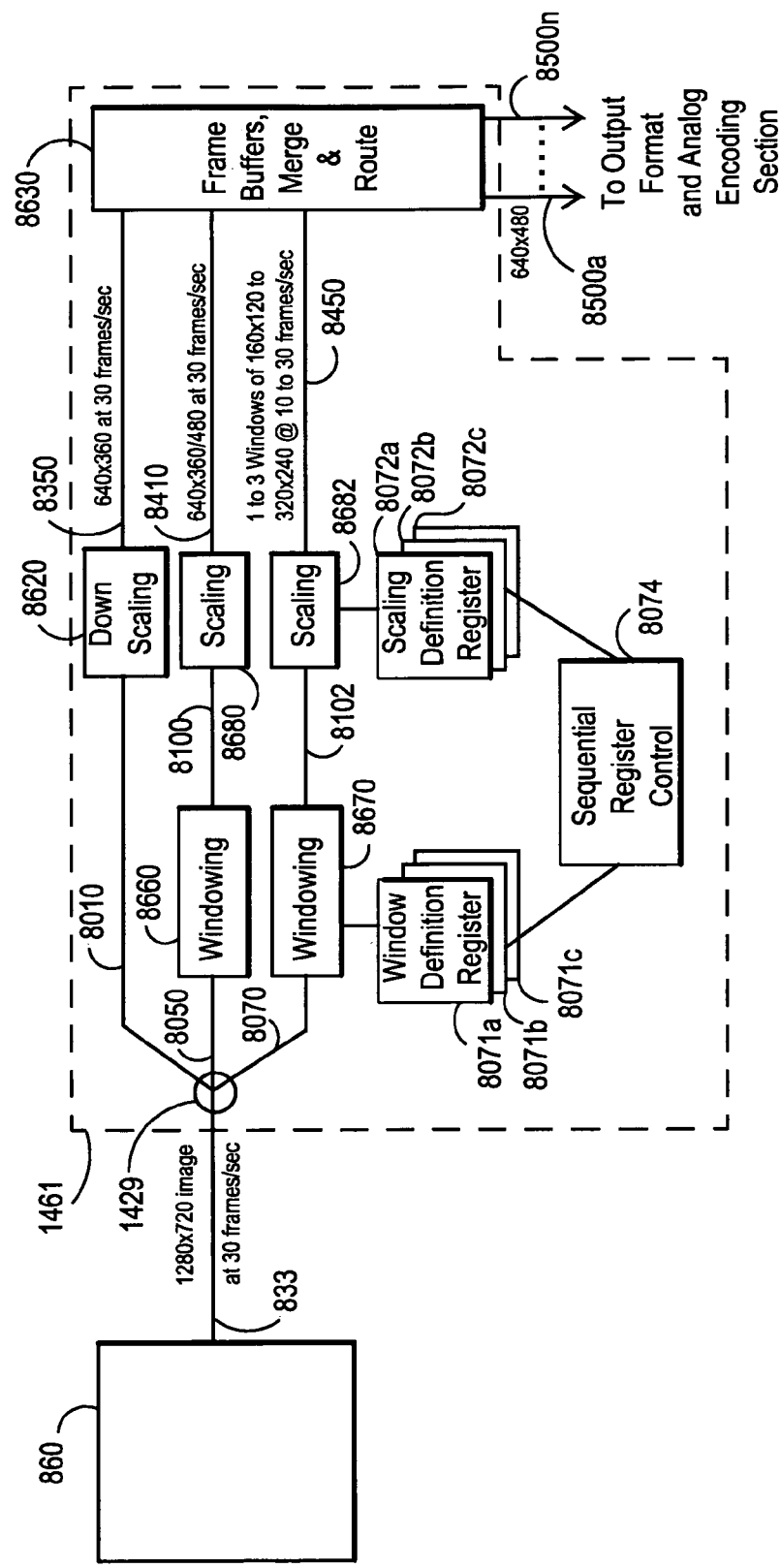
FIG. 8B is a diagram showing image data logic flow according to one embodiment of the disclosed systems and methods.

Frame Buffer circuitry 2716 may be any circuitry suitable for receiving and buffering frames from Image scaler components 2704, 2708 and 2712, for selectively merging two or more of these received frames into a composite video frame and for routing these frames, for example, in a manner described further herein in relation to FIG. 8B. In this regard, Frame Buffer circuitry 2716 may provide the selected image information to conversion circuitry 244 for digital to analog encoding (e.g., conversion from digital video to standard composite NTSC/PAL, etc. analog video) for transmission across interface 2060. In one embodiment, Frame Buffer circuitry 2716 may be configured to include digital buffering and switching circuitry and may be characterized as a media router. Examples of suitable circuitry configurations that may be employed for Frame Buffer circuitry 2716 include, but are not limited to, digital logic contained within an FPGA, ASIC, or standalone IC or algorithms running on a DSP or other suitable processing element, etc. In an alternative embodiment, analog multiplexing may be used. Although not illustrated, it will be understood that Frame Buffer circuitry 2716 may be configured to output multiple signal streams, e.g., to multiple buffers, media bus interfaces, and/or DAC circuits for transmission across one or more analog interfaces 2060.

Although FIG. 3A illustrates one exemplary embodiment including multiple stream image creation circuitry that is provided within a camera 2020 it will be understood that it is possible that multiple resolution image creation circuitry may be implemented in any other suitable form or configuration, e.g., as circuitry provided within a camera or as circuitry provided wholly or in-part separate to a camera, as circuitry with any other suitable configuration of optics and/or image sensor, as circuitry that is operably coupled for receiving signals from non-camera video sources, combinations thereof, etc. Furthermore, it will be understood that in other embodiments multiple resolution image creation circuitry (e.g., configured within a camera, configured as separate circuitry, etc.) may be implemented with other types of image processing circuitry.

It will also be understood that multi-resolution image processing components may be implemented using any alternative circuit configuration suitable for providing any one or more of the respective capabilities thereof as described herein. In this regard, one or more of the exemplary illustrated components of multi-resolution image processing circuitry 2700 (e.g., 2702, 2704, 2706, 2708, 2710, 2712, 2714, 2716) may be alternatively rearranged and/or combined in any alternative configuration suitable for implementing the functionality described herein, either in relation to each other, and/or in relation to other circuitry (e.g., such as optional image processing circuitry 223 (not shown), optional conditioning circuitry 221, conversion circuitry 244, etc.). Furthermore, it is possible that additional circuitry components may be provided in the path between multiple resolution creation circuitry and a coupled analog transmission interface as may be needed or desired for other purposes without departing from the scope of the disclosed systems and methods. In this regard, examples of such circuitry include, but are not limited to, image storage circuitry, one or more types of image conditioning circuitry, one or more types of supplemental image processing circuitry, etc.

Still referring to the exemplary embodiment of FIG. 3A, video system 2000 is shown configured with optional DVR 2040 coupled between analog interface 2060 and analog display device 2080. In this regard DVR 2040 may be optionally present, for example, to record incoming analog image data and/or for optionally implementing electronic pan-tilt-zoom ("EPTZ") capability as described further herein in relation to FIG. 8B. It will be understood, however, that the presence of DVR 2040 is optional and that in other embodiments an analog display device, such as standard analog monitor 2088, may be directly coupled to an analog interface (e.g. coaxial cable-based analog interface 2060) for directly receiving analog video images from multiple resolution image creation circuitry such as camera 2020. Alternatively, it is possible that analog video images received across an analog interface from multiple resolution image creation circuitry may be recorded by analog and/or digital recording device for later display, i.e., without real time display of the image information as it is received. It will also be understood that analog video recorder devices, additional analog displays and other image processing and/or display devices may be operably coupled to process or display image information received across the analog interface.

FIG. 8B illustrates one exemplary embodiment of image data logic flow as may be implemented, for example, using multi-resolution image processing circuitry components of camera 2020 of FIG. 3A. In addition to the exemplary circuitry embodiment of FIG. 3A, it will be understood that the image data flow illustrated in FIG. 8B may be implemented with any alternative circuitry configuration suitable for accomplishing one or more of the image data processing tasks described in relation thereto.

As shown in FIG. 8B, a digital image data 833 may be received from any suitable image source 860 and then travel down one of three exemplary paths 8010, 8050, 8070 before being selected during frame buffer/merge operations 8630 for final processing for transmission across an interface in a manner as previously described. This exemplary video flow may be employed, for example, to support the display mode of FIG. 5 described herein. In this embodiment, multiple windows and scaling functions may be implemented to provide for one or more zoomed images which may be transmitted across an analog interface for display on an analog display device. These windowing and scaling mechanisms may be implemented by logic contained within an FPGA or ASIC, or alternatively may be performed by a DSP or other suitable high speed processing element.

In the illustrated embodiment of FIG. 8B, image source 860 may provide digital image data 833 (e.g., full high resolution image data of 1280×720 pixels at 30 fps). Image source 860 may be any source of a suitable image, such as is described elsewhere herein. For example, image source 860 may be an image storage device, may be an image sensor that produces raw image data that may be converted into desired digital video form (e.g., standard format digital video form) by conditioning circuitry, etc. As illustrated, image source 860 may provide digital image data 833 for multi-resolution image processing operations 1461, e.g., as may be performed by multi-resolution image processing circuitry 2700 of FIG. 3A or other suitable multi-resolution image processing circuitry configuration. Digital image data 833 may be in any suitable digital image data form and, in one exemplary embodiment, may be digital video data having an image size of 1280×720 square pixels at 30 frames/second (fps), although digital image data 833 may also be of greater than or lesser resolution and/or greater than or lesser frame rate in other embodiments. Although digital image data 833 may originate from an image source such as image sensor 222 of FIG. 3A, it will be understood that digital image data may be received for multi-resolution image processing operations 1461 from any other suitable image source configuration, such as described elsewhere herein. Also possible is optional additional image processing (e.g., such as performed by optional supplemental image processing circuitry 223 of FIG. 2A) that may be performed prior to providing digital image data for multi-resolution image processing 1461.

Still referring to the exemplary embodiment of FIG. 8B, multi-resolution image processing operation 1461 may be implemented to provide three possible processing paths for digital image data 833, which for purposes of this discussion will be assumed to represent a high resolution image of a desired scene. Selection of one or more of these paths may be accomplished, for example, using a 1 to N switch or mux or other suitable selection mechanism 1429 provided within circuitry configured to perform multi-resolution image processing operations 1461. It will be understood that the embodiment of FIG. 8B is exemplary only and that it is possible that more than three, or less than three, data processing paths may be provided in other embodiments.

In first data path 8010, digital image data 833 may be downscaled without previous windowing in downscaling operations 8620 (e.g., by image scaler circuitry 2704 of FIG. 3A) to produce downscaled video data 8350 of the entire desired scene in standard resolution (e.g., an image scene size of 640×360 square pixels at 30 fps) and which may then be provided for merging with other image data as part of merged image data 8500 (e.g., by frame buffer circuitry 2716 of FIG. 3A) and then formatted and converted to suitable analog form (e.g., by conversion circuitry 244 of FIG. 3A) for transmission across the analog standard video interface 206 of FIG. 3A. In such an embodiment, when the analog-converted image information from downscaled video data 8350 is received by analog display device (e.g., standard analog monitor 2080 of FIG. 3A), the downscaled video data 8350 may be displayed, for example, as a 640×360 standard resolution image of the entire desired scene at 30 fps (e.g., as upper 640×360 image 2082 on 640×480 analog image display 2080 of FIG. 3A). In such a case, a space of 640×120 is left under image 2082 in which other merged image data may be displayed as will be further described.

Still referring to first data path 8010 of FIG. 8B, no windowing operations are performed so that a downscaled image of the entire scene may be obtained. Regarding the downscaling operations 8620, downscaling may be performed to take scale the high-resolution input stream 833 and scale it symmetrically into a 640×360 output stream @ 30 frames/sec. It will be understood that the use of symmetrical scaling is optional, but may be employed to retain the visual aspect ratio of the input image data 833 while at the same time matching the analog video interface standards-based output buffer requirement. In one exemplary embodiment, a scaling ratio of 0.5 may be applied to both the X and Y axes of the original image, thus rendering a ¼ scaled image that is smaller but identical in proportion to the input images.

As previously mentioned, the 640×360 frames of image data 8350 may then be forwarded to Frame Buffer/merger operations 8630 where they may be merged into standard-sized frame buffers of 640×480. In one exemplary embodiment, when so configured, scaled output frame buffers from image data 8450 may be merged in Frame Buffer/merge operations 8630 with the 640×360 frame buffers of image data 8350 into a standard 640×480 output frame buffer such that a composite analog video stream may be composed from both of these video data logic paths for transmission across a standard analog video interface. Such an exemplary embodiment may be used to implement the Zoom-Under-Picture ("ZUP") display capabilities illustrated by zoomed images 2084, 2086 and 2088 under downscaled image 2082 displayed on standard analog monitor 2080 of FIG. 3A (and further illustrated with regard to Example 5 herein). It will be understood that the 640×480 frame buffers described herein are standard TV resolution frame buffers but in a PC format that uses square pixels. In this regard, it will be understood that Frame Buffer/merge operations 8630 may also merge incoming video stream input data from two or more of data flow logic paths 8350, 8410 and 8450 into standard 720×480 frame buffers suitable for direct output on standard composite video (TV) media. Frame Buffer/merge operations 8630 (e.g., frame buffer circuitry 2716 of FIG. 3A) may also be configured to adapt and/or merge incoming video data streams and to route the resultant video output streams to one, or more, video media interfaces and conversion circuitry.

In second data path 8050 of FIG. 8B, a selected portion of the desired scene or other image may be extracted from frames of digital image data 833 during windowing operations 8660 (e.g., performed by window circuitry 2706 of FIG. 3A) to form a windowed partial image of the desired scene or other type of image. The windowed partial image of data 8100 may then be optionally scaled during optional scaling operations 8680 (e.g., by image scaler circuitry 2708 of FIG. 3A) to form a zoomed or non-zoomed partial image of the desired scene or other type of image for optional merging with other image data as part of merged data 8500 (e.g., by frame buffer circuitry 2716 of FIG. 3A) and then formatted and converted to suitable media form (e.g., by conversion circuitry 244 of FIG. 3A) for transmission across media interface 206 of FIG. 3A.

With regard to second data path 8050, a window may be extracted from the incoming image data (e.g., 1280×720 at 30 frames/sec) for output as an independent video stream. In one embodiment, data path 8050 may be implemented to allow a user to select a 'window' of the full resolution image and view this region-of-interest as a separate video stream. This also allows for optional scaling for magnification (i.e. 'zooming') of the selected window of the full resolution image and/or for adaptive scaling to fit the resultant images into a frame buffer resolution acceptable for the frame buffer processing logic (e.g., 640×360 or 640×480) of Frame Buffer/merge operations 8630. In one exemplary embodiment, two or more multiple image data output streams 8500a to 8500n may be provided, allowing multiple images or image areas to be provided by circuitry 1461 for transmission to multiple display devices (e.g., for simultaneous transmission of different image streams across multiple respective transmission interfaces to enable simultaneous display on multiple respective analog display devices).

In one exemplary embodiment, an area of 640×480 pixels may be extracted from the upper left quadrant of the full 1280×720 image and then sent out as buffers (e.g., as an independent image data stream 8500n) on a designated video media processor via the Frame Buffer processor of Frame Buffer/merge operations 8630. In this exemplary embodiment, no scaling is performed in scaling operations 8680, and instead the windowed image data 8100 may be allowed to pass through scaling operations 8680 unscaled and in its extracted windowed form. Since such images are passed through at their original resolution in such an embodiment (and not scaled by ¼ as described above in relation to one exemplary embodiment of data path 8010), to meet display resolution requirements, this accomplishes the equivalent of a 4×digital zoom. In this regard, the 4×zoom factor occurs since 4 times the pixels are passed through to the video media from the same area of the original full resolution image versus the scaling output performed in data path 8010 described above.

Still referring to second data path 8050 of FIG. 8B, another exemplary embodiment may be implemented in which a designated 320×240 area of the full resolution image is extracted in windowing operations 8660 and then passed to scaling operations 8680. In this case, since the 320×240 resolution is ¼ of the necessary pixels required for display on a TV, or equivalent device, scaling operations 8680 may be employed to scale the image symmetrically into 640×480 output frame buffers that are readily displayable on standard media (this results in the equivalent of an 8× digital zoom factor). In such a case, the original 320×240 image is 4× the number of pixel data normally used to represent the same area on standard display media (since it wasn't equivalently downscaled), and by scaling the 320×240 images to 640×480, another 4× of magnification is provided by scaling each pixel into 4 pixels worth of data. To further illustrate image manipulation flexibility that may be realized in the practice of this embodiment of the disclosed systems and methods, second data path 8050 may be alternatively implemented without scaling operation 8680 in combination with one of the following two exemplary choices (it being understood that the following are exemplary only and that a wide variety of other image manipulation variations may be implemented)

1) No scaling of the 320×240 windowed output data 8100 and placement of the under-sized image buffers into 640×480 output buffers readily routable by the Frame Buffer logic of Frame Buffer/merge operations 8630; or
. . . .
2) Output the undersized 320×240 buffers of windowed output data 8100 to Frame Buffer/merge operations 8630 where Frame Buffer logic may merge the incoming undersized video frame buffers with other video frame buffers (in one exemplary embodiment these may also be undersized) to create a resultant video stream data comprised of images from several input video stream data paths. Using this methodology, for example, a Picture-In-Picture scenario may be implemented where a small video buffer from data path 8050 is overlayed on a section of a full screen video buffer from another data path, e.g., data path 8010. In another example, the output video stream buffers from data path 8050 may be merged with the scaled output of data path 8070 (to be described below) to create several video 'windows' in composite video image stream.

In third data path 8070 of FIG. 8B, multiple selected window (e.g., regions of interest) of the desired scene or other image may be extracted from frames of digital image data 833 during multiple windowing operations 8670 (e.g., by multiple instances of window circuitry 2710 of FIG. 3A) to form multiple windowed partial images of the desired scene(s) or other image(s) in image data 8102. Each of these extracted multiple windowed images of image data 8102 may then be optionally scaled during multiple scaling operations 8682 (e.g., by respective multiple instances of image scaler circuitry 2712 of FIG. 3A) to form respective zoomed or non-zoomed partial images of the desired scene (or other type of image) that is contained in image data 8450. Image data 8450 may then be merged with other image data in frame buffer/merge operations 8630 to form part of merged image data 8500 (e.g., by frame buffer circuitry 2716 of FIG. 3A) and then formatted and converted to suitable media form (e.g., by conversion circuitry 244 of FIG. 3A) for transmission across analog video or other suitable media interface 206 of FIG. 3A.

With regard to third data path 8070, multiple windowing operations 8670 and multiple scaling operations 8682 may be performed in a cyclic manner. In this regard, windowing operations 8670 may be performed using respective multiple instances of window definition register operations 8071 (e.g., 8071a to 8071c) and respective scaling definition register operations 8072 (e.g., 8072a to 8072c) that may be present, for example, if multiple settings are contained in these windowing and scaling registers the sequence control register circuitry 2714 of FIG. 3A will cycle through these settings to create individually scaled versions of part(s) of the original image. Using this methodology, windowing operations 8670 (e.g. performed by multiple instances of window circuitry 2710 of FIG. 3A) may be configured to use configuration, or control, data setup that is contained in respective Window Definition register sets to determine where, and how much, pixel data to extract from the incoming full resolution frame buffers. In one exemplary embodiment, Window Definition Registers sets may be used by all Windowing logic units to identify the location of a 'window' and its size. The register notation may be in any suitable form (e.g., format), but in one embodiment a register notation format may be employed that has an 'X axis offset' register, a 'Y axis offset' register', a 'X axis size/length' register, and a 'Y axis size/length register; these four registers comprising the Window Definition Registers and defining where, and how large, an image window is. Although three window definition register operations 8071 are illustrated in FIG. 8B, it will be understood that there may be any number of Windows Definition registers used for defining various 'windows' (i.e., areas to be extracted).

Scaling operations 8682 may employ a set of Scaling Definition register set operations 8072 that each correspond to a respective window definition register set and that define, per each respective input 'window' video stream of image data 8102, what scaling ratio to employ for generating the resultant output video frame buffers in image data 8450. In one exemplary embodiment, Scaling Definition Registers may be common to all Scaling logic units and may define the scaling ratio for both the X and Y axes. Similar to multiple windowing operations 8071, multiple Scaling operations 8682 in data path 8070 may be implemented with multiple scaling definition registers, in contrast to a single scaling operation that may employ a single scaling definition registers.

As illustrated in FIG. 8B, Window Definition register operations (8071a to 8071c) and respective Scaling Definition register operations (8072a to 8072c) are logically linked together. Therefore, for each 'window' defined to be extracted from image data 833, there is a Window Definition register set 8071 and a directly corresponding Scaling Definition register set 8072. Together these corresponding register sets may be used to identify a specific video data stream for a particular video 'window' to be extracted. It will be understood that three window definition register sets and the corresponding three scaling definition register sets are exemplary only, and that less than three or more than three windows may be defined and scaled in other embodiments using a corresponding number of respective window and scaling definition registers. It will also be understood that cases may exist where windowing is performed with no scaling, etc.

In one exemplary embodiment of data path 8070, all of the defined video 'window' data streams may be frame multiplexed into a single video output data stream. This may be done, for example, by also correlating the Window Definition register and Scaling Definition register activity with their respective processing units via a sequential register control logic unit in Sequential Register Control operations 8074 (e.g., in sequence control register circuitry 2714 of FIG. 3A). In this exemplary embodiment, a Sequential Register Control operation 8074 may be used to determine when, and how many, video frames are processed for each designated video 'window' stream. In this fashion, it may drive 'n' number of frames per each video 'window' in a continuous cyclic fashion. For example, one may assume that a user has configured three video windows of 212×120. Since the output video rate of the attached video media is 30 frames/second, the Windowing and Scaling operations 8670 and 8672 may be implemented to render a total of 30 frames/second. Since there are three video 'windows' defined by the user for this case, then these windows may be processed at an effective rate of 10 frames/second each to derive a resultant video data stream 8102 of 30 frames/second. Thus the Sequential Control register operation 8074 may be used to drive which Windows Definition register sets and corresponding Scaling Definition register sets are active at each given interval thereby determining the multiplexing rate, sequence and overall timing. Optionally, the Sequential Register Control operations 8074 may also be implemented using an optional signaling or control path to the Frame Buffer processing logic of frame buffer/merge operations 8630 to drive a cyclic form of frame buffer merging or placement.

In one exemplary embodiment for creation of multiple zoomed image areas in data path 8070, Sequential Control Register logic may be implemented in sequential control register operation 8074 to evenly subdivide the available frame rate (e.g., 30 frames/second video frame rate) among the active 'windows' for purposes of windowing operations 8670 and scaling operations 8682. Therefore one active zoomed may be implemented with 30 frames/second (e.g., when a user selects to implement multiple window operation 8670 and multiple scaling operation 8682 to only create one zoomed image area in data path 8070), two active zoomed image areas may be implemented to each get 15 frames/second, three active zoomed image areas may be implemented to each get 10 frames/second, and so on. Also, the output video frame buffers may be sent to the Frame Buffer processor for merging, 'underneath or below', the 640×360 frame buffers from Path 1 into a composite 640×480 frame buffer output stream.

It will be understood that many other image processing options are available using the set of logical operations that comprise data path 8070 illustrated in the exemplary embodiment of FIG. 8B. For example, it is possible that Sequential Register Control operation 8074 may be implemented to drive different video 'windows' at longer intervals (e.g., up to several seconds) in a contiguous manner so as to emulate 'camera tours'. In this regard, camera tours are typically performed by taking video streams from several separate cameras and 'cycling' through the views on a monitor at a fixed rate of 'n' seconds each. In another example, it is possible to create many smaller video 'windows' in windowing and scaling operations 8670 and 8682 and to output these as data stream 8450 to the Frame Buffer processor or other circuitry employed in frame buffer/merge operation 8630 along with proper buffer placement logic such that a video stream which is a composite of multiple video 'windows' may be generated. For example, six video 'window' definitions that are sufficiently small (e.g., in the 160×120 pixel range) will fit into a 640×480 frame buffer in a '2 rows of 3 windows each' configuration. Using a standard 'round-robin' approach, the Sequential Register Control logic of sequential register control operation 8074 may be implemented to update each 'window' at an effective rate of 5 frames/second, though the actual output rate for each video media may always be at 30 frames/second. The preceding examples of this paragraph are exemplary only, with it being understood that a variety of other image processing methodologies may be implemented as needed or desired to fit a given application.

Still referring to FIG. 8B, frame buffer/merge operation 8630 may be implemented to receive input image data streams (data streams 8350, 8410 and 8450), that each consist of frame buffers. Frame buffer/merge operation 8630 may then be implemented to perform buffer adaptation and/or merging, where needed or specified, and then to route the resultant image data stream to on or more video media interfaces. In this regard, in one exemplary embodiment buffer adaptation and/or merging may performed under the following three exemplary conditions:

1) The frame size of an incoming image data stream may be incompatible with a particular video media interface to which it is specified to be routed. For example, data path 8010 may be generating a 640×360 frame buffer stream, but the backend video media requires a 640×480 video stream. In this case, Frame buffer/merge operation 8630 may be implemented to either: a) Generate the frame data on-the-fly (i.e. by sending the 640×360 frame buffer out and then generating the final 640×120 frame data for transmission), to satisfy the outgoing media requirements, or b) Place the incoming 640×360 buffers into 640×480 frame buffers before transfer to the video media interface.

2) The incoming video frame buffers of a given data path are significantly smaller than required by the target video media interface (e.g., such as case where 320×240 input frame buffers are designated to be transmitted on a video media interface that requires a 640×480 or greater output frame buffer size). In such a case, the frame buffer/merge operation 8630 may be implemented to provide several configuration options for encapsulating the 320×240 images in 640×480 frame buffers. Example of possible encapsulation options include, but are not limited to, center versus top versus bottom justification, border generation, black space generation, etc.;

3) Merging may be performed by capturing incoming frame buffers from two or more image data streams and placing them into a unified buffer, using specified placement information (that may be configured), such that the incoming streams are merged into one outgoing data stream. For example, 640×360 input frame buffers of data stream 8350 may be placed at the top of 640×480 frame buffers, and 212×120 input frame buffers of data stream 8450 may be placed sequentially along the bottom 640×120 area of the same 640×480 frame buffers. The buffers may then be adapted, if needed (see above), to the outgoing video media interface and routed to that media device. It will be understood that any number of merging methods may be used to created a variety of composite 'views' in outgoing video streams.

As mentioned above, in addition to buffer adaptation and merging, frame buffer/merge operation 8630 may be implemented in one exemplary embodiment to route the resultant image data streams to one or more video media interfaces (e.g., video media devices) based on configuration parameters. Such configuration parameters may be fixed, user set, or dynamic. In any case, each output image data stream may be considered to represent a logical, or virtual, camera output. This routing capability advantageously may be implemented to enable numerous viewing options. For example, multiple data streams may be routed over one video media interface using a time multiplexed method. With multiple video media interfaces, any one data streams (e.g., data stream 8350, 8410, 8450) may be configured, either statically or dynamically, to be routed to one or more of the video media interfaces. Furthermore, as described below, each transmission interface may be supported as a virtual camera and additionally support the ability to provide a Pan-Tilt-Zoom ("PTZ") functionality for each image data stream in an independent manner.

Although not illustrated in FIG. 8B, frame buffer/merge operation 8630 may be configured to route the final output image data streams to one or more video media interfaces. It will be understood that the predominant standards for TV-related media are analog based, and the primary standards are NTSC (720×480 @ 30fps) and PAL (720×576 @ 25fps). Additionally, these standards assume interlaced video input. Given these standards, standard square pixel-based images may be converted to rectangular pixel based images as used by NTSC and PAL. This may be implemented by scaling the images from 640×480 (or whatever the case may be) to NTSC or PAL format, and then clocking the data to the various transmission video media interfaces in either an interlaced or progressive manner.

It will be understood that the illustrated embodiment of FIG. 8B is exemplary only, and that any other combination of different number and types of image streams and image stream operations may be implemented. In this regard, the number of data paths may be greater or lesser than three, and any given data path may represent any one or more window or scaling operations suitable for achieving desired image characteristics. Furthermore, although not illustrated in FIG. 8B, it will be understood that the frame rate of any given image data path may vary as may be desired in order to meet the needs of a given application (e.g., to allow transmission of the desired amount of image information within the bandwidth of an analog interface.

In the foregoing discussions, image processing is described that may be implemented to allow multiple image streams (e.g., video streams) to be generated at potentially varying resolutions. Also described are scenarios where a given image stream may be a composite of two or more individual image data streams. In one embodiment of the disclosed systems and methods, it is possible to take any of the sub-high resolution 'windows' within a given image stream and to control them in a dynamic (i.e., real-time) manner such that one or more of the 'windows' behaves as an individual PTZ camera. This PTZ methodology may be implemented in a digital manner to achieve an Electronic PTZ ("EPTZ")-like or Digital PTZ ("DPTZ")-like functionality.

Referring to the embodiments of FIGS. 3 and 8B, any given image 'window' that is smaller than the full resolution image may be moved around within the spatial dimensions of the full resolution image. For example, a 320×240 video 'window' may be moved around significantly within a full resolution 1280×720 image. By employing the multiple Windowing and Scaling processing operations of the disclosed systems and methods as described herein in relation to FIGS. 3 and 8B, 'windows' may be dynamically moved around by updating the register values of the Windowing Definition Register operations 8071 in a real-time fashion. The register values of the Scaling Definition Register operations 8072 may also be updated in real-time, thus providing digital zoom, or magnification, of the images in each selected 'window'. This methodology may be implemented in any manner suitable for updating the appropriate respective window and/or scaling register values to achieve the desired effect. One exemplary embodiment is described below, although other methodologies are possible.

Conventional mechanical PTZ cameras are typically controlled via camera control protocols (e.g., Pelco-P, Pelco-D, AutoDome Control Code protocol, SpeedDome RS-422/RS-485 protocol, etc.) that are transferred via serial communications links such as RS-485, RS-422, or RS-232. These camera control protocols are well documented and they enable the management of multiple cameras per serial link using serial messages that contain unique camera IDs. Camera IDs are also called 'addresses', 'device IDs, or 'camera numbers', and they uniquely identify the specific camera on a serial link as the designated target of a camera control message. Each of these protocols enables a set of basic commands such as 'Pan-Right', 'Pan-Left', 'Tilt-Up', 'Tilt-Down', 'Zoom-In' (greater magnification), 'Zoom Out' (lesser magnification), and so on.

Figure 3B:
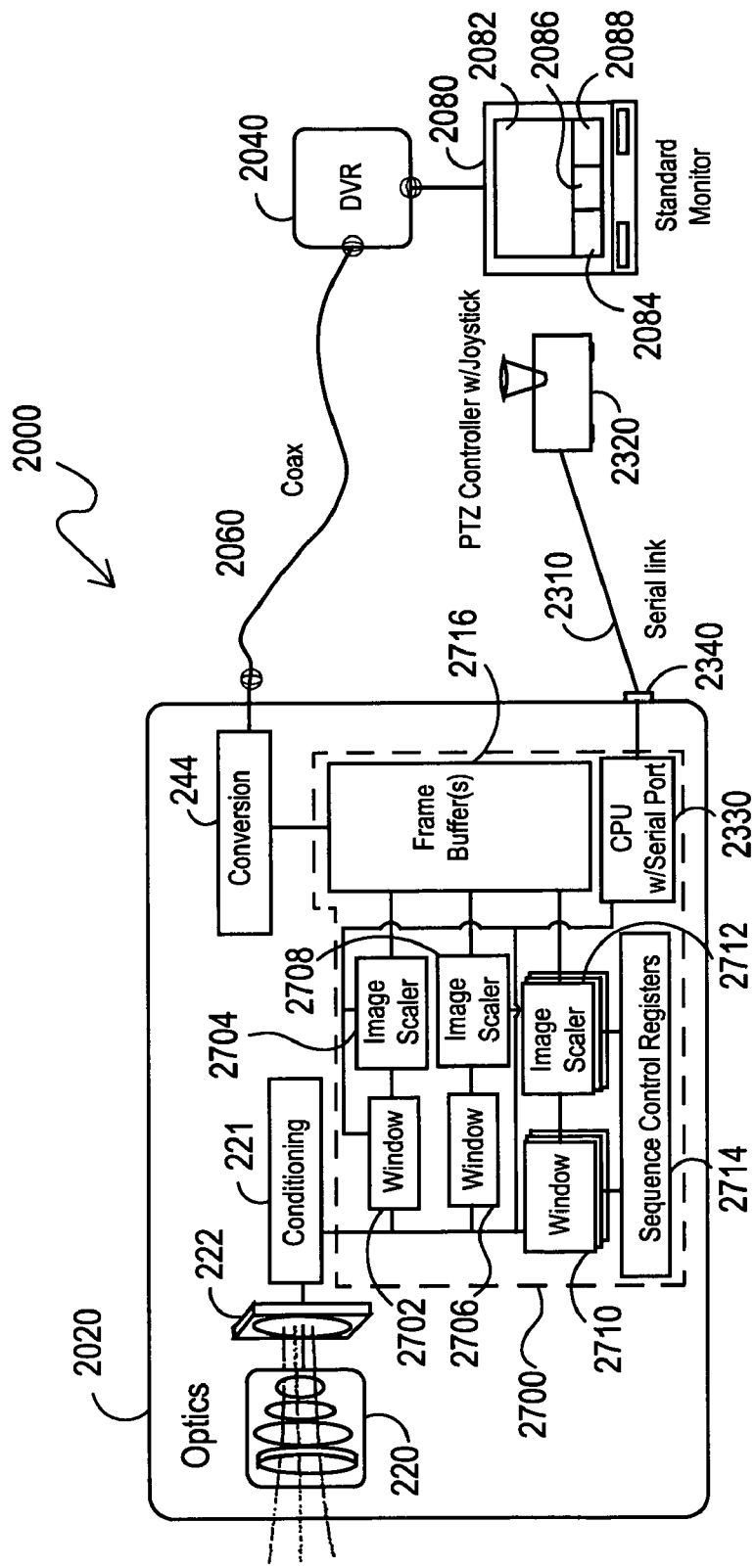
FIG. 3B is a simplified schematic of a video system according to one embodiment of the disclosed systems and methods.

In the practice of the disclosed systems and methods, a serial link may be attached to multiple resolution image creation circuitry (e.g., camera 2020 of FIG. 3A) for supporting camera control commands such as described in the preceding paragraph. Additionally, multiple resolution image creation circuitry may be configured to emulate multiple cameras on a serial link by mapping camera IDs/addresses to specific 'windows' in its output image data streams (e.g., data streams 8350, 8410 and 8450 of FIG. 8B), which may optionally be further mapped to two or more respective separate multiple image data output streams 8500 (e.g., to 8500a, 8500b, and 8500c, respectively) for display on two or more separate analog display monitors. FIG. 3B illustrates the implementation of one such exemplary embodiment having a serial link 2310 (e.g., RS-485, RS-422, RS-232, etc.) that couples a PTZ controller with joystick 2320 to an optional processor 2330 provided in multiple resolution image creation circuitry 2700 of camera 2020 via serial port 2340. As illustrated, processor 2330 is coupled to each window circuitry component (2702, 2706, 2710), and to each image scaler circuitry component (2704, 2708, 2712) in a manner so as to enable selective control of these components in order to provide the PTZ capabilities described further herein.

When optional multiple image data output streams 8500 are provided it is possible, for example, to display multiple zoomed areas on one analog display device, and then selectably display and control a full screen zoomed image (e.g. of one of the multiple zoomed areas displayed on the other monitor) on another analog display device using camera control commands mapped to specific windows. However, any other combination of two or more images on two or more display devices is also possible when multiple image data output streams 8500 are provided.

Figure 14:
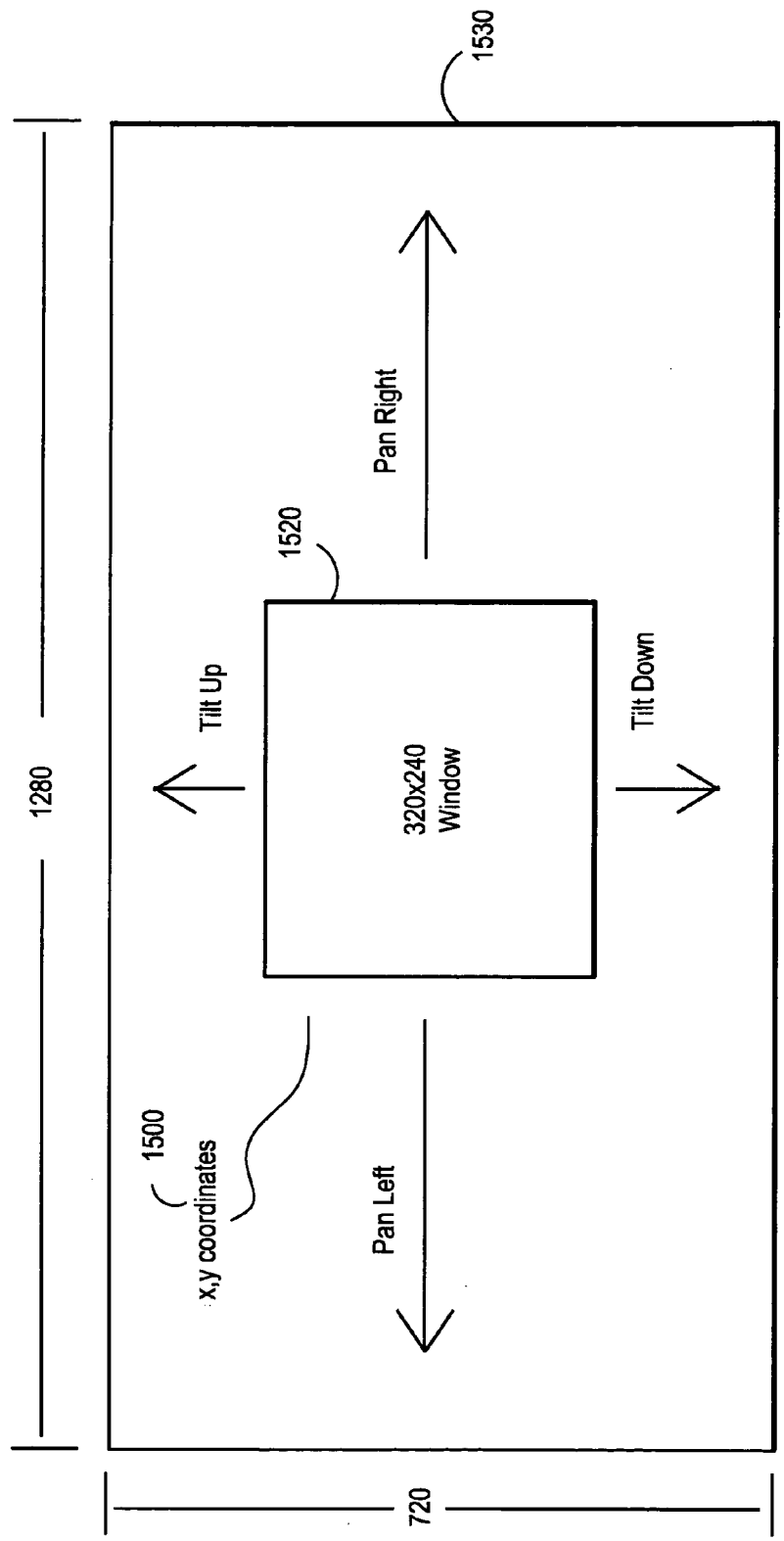
FIG. 14 illustrates selection of a variable sized subset of a larger resolution image and positioning of the selection area within the larger image in relationship to external pan and tilt commands.

In one exemplary embodiment, multiple resolution image creation circuitry such as camera 2020 of FIG. 3A or 3B may be configured to support camera IDs/addresses, e.g., such as camera addresses 3 and 4 (for illustration purposes). For example, camera 2020 may map camera ID/address 3 to a 320×240 viewing window in an image data stream provided by second data path 8050 of FIG. 8B and it may map camera ID/address 4 to one of multiple 212×120 zoomed image areas such as defined by Windowing Definition Register set operation 8071 and Scaling Definition Register set operations 8072 in third data path 8070 of FIG. 8B. Pan Right/Left/Up/Down commands may be then be provided for either camera ID 3 or 4, and the corresponding Window Definition Register sets are modified in Windowing Definition Register operations 8071 to emulate camera panning within the full resolution image of data stream 833. For example, FIG. 14 illustrates how x and coordinates 1500 within a window definition register for a particular windowing operation may be varied in one exemplary embodiment to pan and/or tilt a 320×240 window area 1520 within a 1280×720 full resolution image 1530, it being understood that these particular window and overall image resolution values are exemplary only.

Using the above methodology, if a Pan command causes a 'window' to hit the viewing boundary of the full resolution image, the 'window' may be configured in one embodiment to stop moving (i.e., to ignore Pan commands that are operating in the errant direction), or move into 'black space'. When Zoom commands are received for a 'virtual' camera, the corresponding Scaling Definition Register set may be modified to either increase the scaling factors/ratios (i.e., to Zoom-Out) or decrease the scaling factors/ratios (i.e., to Zoom-In). In this manner, multiple virtual cameras may be emulated in one embodiment by mapping camera IDs/addresses in standard PTZ camera control protocols to EPTZ functionality provided by the Windowing and/or Scaling operations (e.g., 8670 and/or 8682 of FIG. 8B) on a per 'window' basis, and such that any chosen 'window' is spatially smaller than the source full resolution image (e.g., full high resolution image of image data path 833 of FIG. 8B).

It will be understood that the forgoing EPTZ/DPTZ methodology may be implemented with regard to any given one or more image data path/s of multiple resolution image creation circuitry, regardless of the number and/or type of data paths implemented therein.

EXAMPLES

The following exemplary and hypothetical examples are illustrative and should not be construed as limiting the scope of the invention or claims thereof.

Example 1

Selectable Extraction of Higher Rate High Resolution Image Area Out of a Lower Rate High Resolution Image for Digital Display Device FIGS. 5A and 5B illustrate one exemplary embodiment of the disclosed systems and methods in which a reconstructed high resolution image (e.g., 1280×720) of an entire scene 506 of FIG. 5A may be displayed at a reduced frame rate (e.g., at 3.75 frames/second) simultaneously with a selected or selectable portion 508 of the scene (e.g., a 640×480 image area) that may be displayed as a high resolution image 510 of FIG. 5B at a higher frame rate (e.g., at 15 frames/sec), e.g., displayed together on image display 208 of multi-resolution image video system 200 or on other suitable digital display device/s. In one embodiment, the high resolution image 510 of the selected portion 508 of the scene 506 may be extracted at the camera end prior to transmission, e.g., by image deconstruction circuitry 228 and image scaling circuitry 226 of video system 200, or other suitable circuitry.

In one embodiment, a RS485 interface or other suitable control interface may be provided to allow an operator to select the window area for display of the smaller image at the higher frame rate, e:g., at image display 208 or at other suitable interface location. In the case shown in FIGS. 5A and 5B, the selected area is 640×480 and represents the full sensor high resolution image 510 for the selected specific area 508 at any given time. In a further exemplary embodiment, an operator may be provided with a control interface that allows the operator to slide portion 508 as a selectable window area around the area of full image 506 in order to vary the identity of the selected area or portion 508 of the scene 506 for display as image 510, e.g., to achieve a 15 frames/sec electronic pan-tilt-zoom (EPTZ) function display of selectable image 510. This windowing function may be provided, for example, in image deconstruction circuitry 228 of system 200. In one embodiment, embedded processor 298 (e.g., multiprocessor, DSP or other suitable processing circuitry) may intercept the serial (i.e., RS-485, RS-422, RS-232, etc.) commands that may originate from a control interface (e.g. joystick, keyboard, touch screen) and then direct the image deconstruction circuitry 228 to selectively sample the overall sensor area. The image scaler circuitry 226 may also be used to either expand or contract (ie., scale) the selected area to produce the desired size output image. It will be understood that multiple instances of both 226 and 228 may be employed to allow for multiple areas at different scaling factors. In such an embodiment, a control interface may be configured to select which pair of image scaler circuitry 226 and image deconstruction circuitry 228 is actively being controlled. This may be accomplished, for example, via interpretation of the serial commands by processing circuitry 298 of system 200.

Using the above-described technique, one or more selected or selectable higher frame rate areas may be displayed in any suitable manner, for example, displayed simultaneously with the entire lower frame rate scene on a separate monitor or other display device, or simultaneously displayed with the lower frame area on the same monitor or display device (e.g., in a window separate from the entire lower frame rate scene, or superimposed over a corresponding portion of the lower frame rate scene in the same window).

In another exemplary embodiment, when a standard resolution CCTV monitor is employed as part of a system (e.g., as a spot monitor), a scaled image transmitted at a first rate (e.g., at 15 frames/sec) may be temporarily up-scaled to a higher frame rate (e.g., 30 frames/sec) via frame replication. Furthermore, for display of a HDTV image (ie., having 16:9 aspect ratio) on the standard monitor (e.g., having 4:3 aspect ratio), a choice may be made to display the image with blanked vertical lines (cinema mode) or by cropping the edges of the images to fit the 4:3 format.

The advantage of this exemplary embodiment is that it may be used to allow an operator to maintain an overall situational awareness while simultaneously being able to watch high motion rate events.

Example 2

Selectable Extraction of Zoomed High Resolution Image Area Out of a Larger High Resolution Image for Digital Display Device FIGS. 5C and 5D illustrate another exemplary embodiment of the disclosed systems and methods in which a high resolution image (e.g., 1280×720) of an entire scene 502 of FIG. 5C may be displayed (e.g., at 3.75 frames/sec) simultaneously with a selected or selectable zoomed portion 504 of the scene that may be displayed as a higher frame rate image 550 of FIG. 5D (e.g., at 15 frames/sec or other desirable frame rate), e.g., displayed together on image display 208 of multi-resolution image video system 200 or on other suitable digital display device/s. For example, in the exemplary embodiment of FIG. 5B the windowed area 504 represents a selected or selectable 320×240 area (at the sensor native resolution) that is expanded to 640×480 before being transmitted from the camera, e.g., by image scaling circuitry of video system 200. As in the embodiment of Example 1, window 504 may be optionally movable in a selectable manner by an operator in real time, e.g., to scan the scene 502 during an alarm event.

Using the above-described technique, one or more selectable zoomed areas may be displayed in any suitable manner, for example, displayed simultaneously with the entire unzoomed scene on a separate monitor or other display device, or simultaneously displayed with the entire scene on the same monitor or display device (e.g., in a window separate from the entire scene). Selectable zoomed image/s may also be displayed in a superimposed manner over a corresponding portion of the unzoomed scene in the same window and, if desired, appropriate image scaling may be employed so that the entire scene is viewable in either of the zoomed or unzoomed portions of the total displayed image.

The advantage of this exemplary embodiment is that it may be used to allow an operator to gain more usable detail out of a specific area (e.g., during an alarm event) while simultaneously maintaining visual awareness of a much larger area.

Example 3

Figure 6A:
FIG. 6A represents an non-zoomed stored image taken by a video surveillance camera.
Figure 6B:
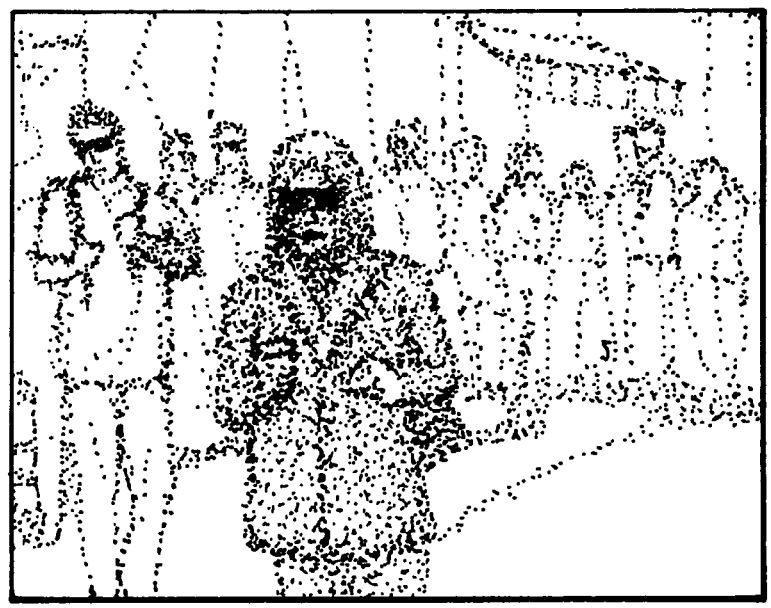
FIG. 6B represents a digitally zoomed image of the non-zoomed stored image of FIG. 6A obtained when starting with a standard resolution image.
Figure 6C:
FIG. 6C represents a digitally zoomed image of the non-zoomed stored image of FIG. 6A obtained when starting with a high resolution image according to one embodiment of the disclosed systems and methods.

Selectable Extraction of Zoomed High Resolution Image Area Out of a Stored Larger High Resolution Image for Digital Display Device FIGS. 6A-6C illustrate the significant advantages that may be achieved with stored video content obtained using the higher resolution imaging of the disclosed systems and methods as compared to existing standard resolution imaging. In this regard, FIG. 6A represents an stored unzoomed image taken by a video surveillance camera of an overall scene 600 and, for purposes of this example, may be considered to be a standard resolution image, or alternatively a high resolution (e.g., HDTV) image according to the disclosed systems and methods. Scene 600 includes a portion 602 of the scene 600 that corresponds to an event of interest (e.g., person of interest, item of interest, activity of interest, etc.). FIG. 6B illustrates a 4× digital zoom of portion 602 of scene 600 that results when starting from a stored unzoomed standard resolution image of scene 600. In contrast, FIG. 6C illustrates the increased scene detail that is obtained from a 4× digital zoom of portion 602 of scene 600 that results when starting from an unzoomed HDTV resolution image of scene 600, such as may be provided as described elsewhere herein across a standard analog interface using the disclosed systems and methods. In this regard, higher resolution information captured using the disclosed systems and methods may be used to provide substantially increased detail of a given portion of a video image and to provide greater information as to what was occurring at the time around an event of interest, even when the video camera is not zoomed into that given portion of the video image.

Example 4

Simultaneous Monitoring of zoomed and Unzoomed Images on Digital Display Device

Figure 7:
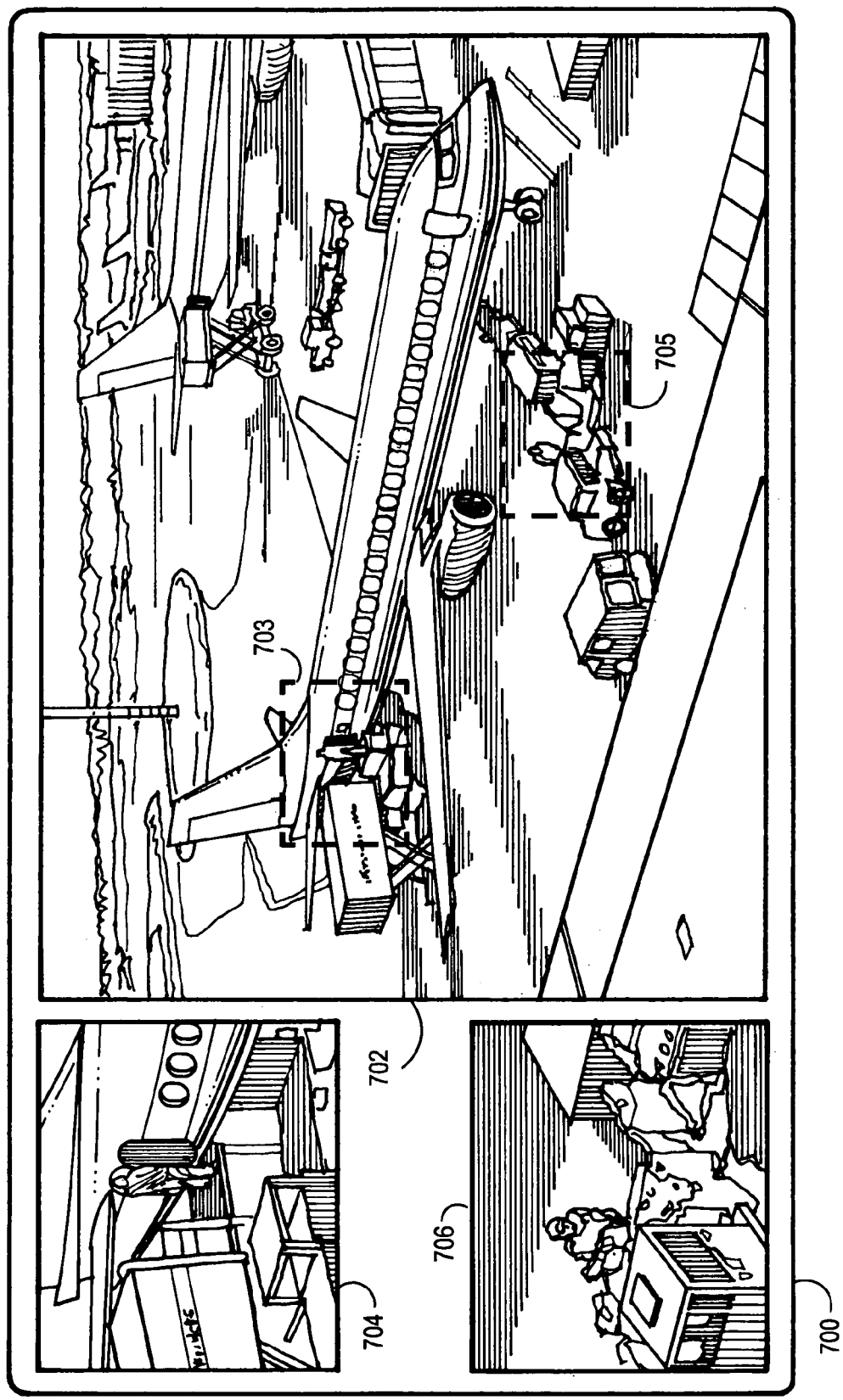
FIG. 7 represents selectable extraction, scaling, and display of image areas out of a higher resolution image according to one embodiment of the disclosed systems and methods.

FIG. 7 illustrates a graphic display 700 (e.g., computer monitor), and shows how the overall area around an aircraft may be monitored in a first window display 702 (e.g., image display 208 of multi-resolution image video system 200 or other suitable digital display device/s) to maintain overall situation awareness, while one or more zoomed images of specific portions of the overall video image may be simultaneously monitored to observe one or more specific area/s of activity or interest. Specifically, FIG. 7 shows how multiple zoomed images (second and third window displays 704 and 706 of the graphic display 700) may be simultaneously monitored with overall area display 702. It will be understood that one or more specific portions of an overall video image may also or alternatively be viewed simultaneously and/or sequentially on one or more graphic displays (e.g., multiple computer monitors or standard television monitors) as may be desirable or needed in a given application. The resultant display may be formed from post-transmission processing (e.g. in a PC) or pre-transmission processing (e.g. in the camera) depending on the which system and method is used.

Example 5

Simultaneous Monitoring of Zoomed and Unzoomed Images on Analog Display Device

Figure 12:
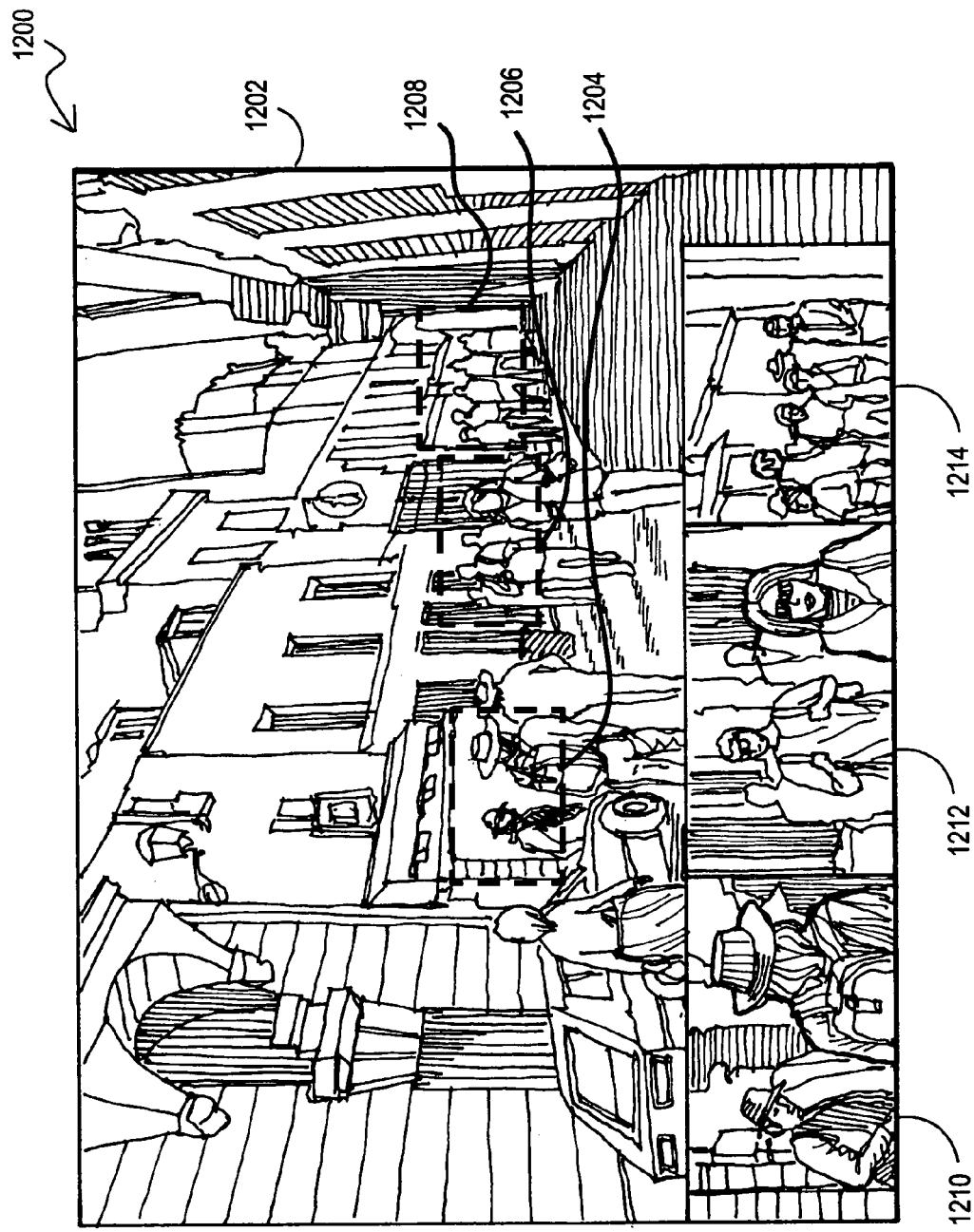
FIG. 12 illustrates display of multiple images according to one embodiment of the disclosed systems and methods.

FIG. 12 illustrates simultaneous display of a primary image 1202 of an entire or overall scene and three zoomed image areas 1210, 1212 and 1214 (taken from respective locations 1204, 1206 and 1208 of primary image 1202 of the entire scene) on an analog display device 1200, such as conventional analog display device 2080 of FIG. 3A or 3B or other suitable analog display device. In the illustrated embodiment, display of the entire scene in primary image 1202 may be used to maintain overall situation awareness, while zoomed image areas 1210, 1212 and 1214 may be simultaneously monitored to observe more specific area/s of activity or interest.

As illustrated, zoomed image areas 1210, 1212 and 1214 do not overlay the primary image 1202 of the entire scene, but are instead displayed outside the perimeter of the primary image (i.e., without occluding the viewing space of the primary image). In one exemplary embodiment, primary image 1202 may be displayed so that it occupies the upper 75% of a standard TV resolution video frame (e.g., displayed as upper 640×360 out of total 640×480) displayed on analog display device 1200. In this embodiment, primary image 1202 represents the entire image source field of view ("FoV"), e.g., of image sensor 222 or other suitable image source. Because primary image 1202 has a 16:9 aspect ratio, it does not completely fill the full vertical image space of a standard TV-resolution video frame (i.e., having a 4:3 aspect ratio) that is displayed on analog display device 1200. As such, one or more other images may be displayed in the remaining 640× 120 space that remains at the bottom of the TV-resolution video frame. In the illustrated embodiment of FIG. 12, three zoomed image areas 1210, 1212 and 1214 are each 212×120 SQP images that are displayed side by side beneath primary image 1202 in a zoom-zone under picture ("ZUP") configuration.

In the illustrated embodiment of FIG. 12, each of zoomed image areas 1210, 1212 and 1214 may be, for example, fixed size zoomed areas of selected sections of an original high resolution image prior to being scaled to 212×120 (e.g., fixed size zoomed areas of an original 1280×720 sensor image from image sensor 222 of video system 2000 or other suitable image source). In one embodiment, zoomed image areas 1210, 1212 and 1214 may be selectively zoomed areas (e.g., selected by system operator or suitable image control mechanism) of primary image 1202, having locations 1204, 1206 and 1208, respectively, within the primary image 1202 as shown. It will be understood that zoomed area/s may alternatively be of fixed location within primary image 1202 if selectability is not desired or needed. In any event, whether fixed or selected, zoomed image areas 1210, 1212 and 1214 may be extracted, zoomed, and placed (e.g., by multiple resolution image creation circuitry 2700 of FIG. 3A or 3B) within a standard TV-resolution video frame, along with primary image 1202, at the lower section of the video frame as shown for display on standard analog display device (e.g., display device 2080 of FIG. 3A or 3B). Further, in one exemplary embodiment, the number of displayed zoomed image areas, dimensions of displayed zoomed image areas, and/or position of zoomed image areas within a given display relative to a primary image may be selectable, either beforehand and/or in real time (e.g., allowing selection of a single zoomed image area to be centered below primary image 1202, rather than display of all three zoomed image areas 1201, 1212, and 1214).

The amount of zoom magnification magnitude of zoomed image areas 1210, 1212 and 1214 may be fixed, and/or in one embodiment may be selectively varied (e.g., in real time). For example, in one exemplary embodiment, each of zoomed image areas 1210, 1212 and 1214 may have a zoom factor that may be selectively varied from about 2× to about 20× magnification, a zoom magnification of about 4× being a default value, although magnification greater than about 20× is also possible. Magnification less than 1× (i.e., fractional magnification) is also possible, e.g., entire 1280×720 may be downscaled to a 212×720 image area for display as one of zoomed image areas 1210, 1212 or 1214.

In one exemplary embodiment, all active zoomed image areas (e.g., zoomed image areas 1210, 1212 and 1214 of FIG. 12) may share a video scaling unit within hardware scaling circuitry. In this regard, hardware scaling circuitry may be configured to operate at the appropriate frame rate for the transmission standard employed, e.g., 30 fps for NTSC, 25 fps for PAL, etc. Thus, the frame rate for each given zoomed image area may be equal to the total frame rate (e.g., NTSC, PAL, etc.) divided by the number of active zoomed image areas, as shown in the following table:

| Number of Active Zoomed Image Areas (ZUPs) | Effective NTSC Frame Rate per Zoomed Image Area | Effective PAL per Frame Rate Zoomed Image Area |
|---|---|---|
| 1 | 30 fps | 25 fps |
| 2 | 15 fps | 12.5 fps |
| 3 | 10 fps | 8.33 fps |

As previously described, one or more of zoomed image areas 1210, 1212 and 1214 may be manipulated as a virtual pan-tilt-zoom ("PTZ") camera using standard camera control protocol commands, and/or protocol extensions.

In the preceding example square pixel units have been used to describe zoomed image areas having 212×120 resolution. It will be understood that this resolution may be changed to rectangular pixel format. Furthermore, it will be understood that any given number of one or more zoomed image areas may be simultaneously displayed with a primary image, including more than three zoomed image areas. Furthermore, it will be understood that zoomed image areas may be alternatively displayed in a space above a primary image, and/or simultaneously in spaces above and below a primary image (e.g., with appropriate size adjustment). Furthermore one or more secondary outputs may be utilized to provide a higher resolution presentation to one of the selected 212×120 images.

Examples 1-5 describe and illustrate just a few of the many multiple resolution image combinations that may be realized using the disclosed systems and methods, with it being understood that other combinations of image resolutions, image frame rates, numbers of displayed image areas, display formats (e.g., zoomed or unzoomed), display devices, etc. may be implemented as desirable or needed for a given application using the disclosed systems and methods.

Various embodiments of the disclosed systems and methods have been illustrated and described herein with respect to CCTV technology. However, it will be understood that the disclosed systems and methods may be implemented with any video system technology and associated components in which one or more benefits of the disclosed systems and methods may be realized or suitably implemented. Furthermore, the disclosed systems and methods may be advantageously implemented in any video system environment in which one or more benefits of the disclosed systems and methods may be realized or suitably implemented. Examples of such environments include, but are not limited to, video surveillance environments, television studio environments, televised sports event environments, military targeting or imaging environments, stored image analysis environments, etc. Furthermore, it will be understood that although described herein in relation to square pixel, images of the disclosed systems and methods may be alternatively scaled, displayed and/or processed using rectangular pixels.

While the invention may be adaptable to various modifications and alternative forms, specific embodiments have been shown by specific way of example and described herein. However, it should be understood that the invention is not intended to be limited to the particular forms disclosed. Rather, the invention is to cover all modifications, equivalents, and alternatives falling within the spirit and scope of the invention as defined by the appended claim. Moreover, the different aspects of the disclosed systems and methods may be utilized in various combination and/or independently. Thus the invention is not limited to only those combinations shown herein, but rather may include other combinations.

What is claimed is:

1. A method comprising:
receiving at least one digital image data input stream from a video camera, said at least one digital image data input stream from a video camera containing digital image information;
determining a transmission capacity of a video transmission interface;
comparing, via a processor, the transmission capacity of the video transmission interface with a capacity of said at least one digital image data input stream;
creating at least two digital image data streams from said at least one digital image data input stream, each of said at least two digital image data streams comprising at least a portion of said digital image information;
converting said at least two digital image data streams into at least two respective output image streams; and
providing said at least two respective output image streams for transmission together without image compression across the video transmission interface that has, based on the comparing, insufficient transmission capacity to transmit said at least one digital image input data stream without image compression.

2. The method of claim 1, further comprising
providing said at least two respective output image streams for transmission together without image compression from said video camera across said video transmission interface to a device, wherein said device is at least one of a digital video recorder and a display device;
wherein said at least one digital image input data stream has a first data content, wherein said at least two respective output image streams each has a data content less than said first data content, and wherein said video transmission has sufficient transmission capacity to transmit each of said at least two respective output image streams without image compression.

3. The method of claim 2, wherein said video transmission interface comprises an analog transmission interface;

wherein said at least two respective output image streams comprise at least two respective analog image output streams, and wherein said method further comprises:
converting said at least two digital image data streams into said at least two respective analog image output streams; and
providing said at least two respective analog image output streams for transmission without image compression across said video transmission interface.

4. The method of claim 3,
wherein one of said at least two respective analog image output streams comprises a first image having a first resolution and a first frame rate;
wherein another of said at least respective analog image output streams comprises a second image having a second resolution and a second frame rate; and
wherein at least one of:
said first and second resolutions are different, or
said first and second frame rates are different, or
said first image comprises a different portion of said digital image data input stream than said second image, or
a combination thereof 5. The method of claim 4, wherein said at least one digital image data input stream comprises a digital video signal received from a digital video source; and
wherein said method further comprises providing each of said at least two respective analog image output streams as part of an analog video signal for transmission across said analog transmission interface.

6. The method of claim 5, further comprising
receiving said at least two respective analog image output streams as part of said analog video signal from across said analog transmission interface;
converting each of said at least two received respective analog image output streams into at least one digital image data stream comprising said first image and into at least one digital image data stream comprising said second image; and
at least one of displaying or storing said respective first and second images, or a combination thereof.

7. The method of claim 6, wherein said first and second frame rates are different and wherein said method further comprises displaying said first image at said first frame rate while simultaneously displaying said second image at said second frame rate.

8. The method of claim 6, wherein said first and second resolutions are different and wherein said method further comprises displaying said first image at said first resolution while simultaneously displaying said second image at said second resolution.

9. The method of claim 6, wherein said creating comprises using scaling to create said first image as a zoomed image prior to said step of converting said at least two digital image data streams into said at least two respective analog image output streams;
wherein said second image is not a zoomed image; and wherein said step of displaying comprises displaying said zoomed first image while simultaneously displaying said second unzoomed image.

10. The method of claim 3, wherein said digital image information comprises an original image;
wherein said step of creating comprises segmenting at least a part of said original image into at least a first image tile segment comprising a first portion of said original image in a first digital image data stream, and a second image tile segment comprising a second portion of said original image in a second digital image data stream, said first and second portions of said original image being different portions of said original image having a position relative to each other within said original image;
wherein said step of converting comprises converting said first and second digital image data streams into respective first and second analog image output streams; and
wherein said method further comprises:
receiving said first and second analog image output streams as part of said analog video signal from across said analog transmission interface,
converting each of said received first and second analog image output streams into respective third and fourth digital image data streams comprising said respective first and second image tile segments, and
reassembling said first and second tile segments from said third and fourth digital data streams to form said at least a part of said original digital image.

11. The method of claim 1, wherein said video transmission interface comprises a digital transmission interface.

12. A method comprising:
receiving digital image data from a video camera;
determining a transmission capacity of a video transmission interface;
comparing, via a processor, the transmission capacity of the video transmission interface with a capacity of said digital image data;
processing said digital image data in a first processing operation to create first processed image data;
processing said digital image data in a second processing operation to create second processed image data; and
providing said first and second processed image data for communication together without image compression across the video transmission interface that has, based on the comparing, insufficient transmission capacity to transmit said digital image data without image compression;
wherein at least one of:
said first processed image data has an image resolution that is different from an image resolution of said second processed image data, or
said first processed image data is provided for communication across said video transmission interface at an image frame rate that is different from an image frame rate at which said second processed image data is provided for communication from said video camera across said video transmission interface, or
said first processed image data comprises a different portion of said digital image data than said second processed image data, or
a combination thereof.

13. The method of claim 12, further comprising:
providing said first and second processed imaged data for communication together without image compression across said video transmission interface to a device, wherein said device is at least one of a digital video recorder and a display device.

14. The method of claim 13, wherein said video transmission interface comprises an analog transmission interface;
wherein said method further comprises converting said first and second processed image data to respective first and second analog image information for communication together across said analog transmission interface; and
wherein said method further comprises converting said first and second analog image information back into said respective first and second processed image data after receiving said first and second analog image information from across said analog transmission interface.

15. The method of claim 14, wherein each of said first and second processing operations comprises at least one of an image scaling operation, an image windowing operation, an image deconstruction operation, or a combination thereof.

16. The method of claim 14, wherein each of said first processed image data and said second processed image data comprises at least one of a windowed image, a scaled image, and an image tiled segment.

17. The method of claim 12, further comprising:
processing said digital image data in a third processing operation to create third processed image data; and
wherein at least one of:
said third processed image data has an image resolution that is different from an image resolution of said first and second processed image data, or
said third processed image data is provided for communication across said common interface at an image frame rate that is different from image frame rates at which said first and second processed image data is provided for communication across said common interface, or
said third processed image data comprises a different portion of said digital image data than said first and second processed image data, or
a combination thereof 18. The method of claim 12, wherein said video transmission interface comprises a digital transmission interface.

19. Multiple stream image creation circuitry configured to receive at least one digital image data input stream containing digital information from a video camera, said multiple stream image creation circuitry comprising multiple stream image processing circuitry configured to:
determine a transmission capacity of a video transmission interface;
compare the transmission capacity of the video transmission interface with a capacity of said at least one digital image data input stream;
create at least two digital image data streams from said at least one digital data input stream, each of said at least two digital image data streams comprising at least a portion of said digital image information;
convert said at least two digital image data streams into at least two respective output image streams; and
provide, from a video camera, said at least two respective output image streams for transmission together without image compression across a video transmission interface that has, based on the comparing, insufficient transmission capacity to transmit said digital image data input stream without image compression.

20. The multiple stream image creation circuitry of claim 19, wherein said at least one digital image input data stream has a first data content;
wherein said at least two respective output image streams each has a data content less than said first data content; and
wherein said common video transmission interface has sufficient transmission capacity to transmit each of said at least two respective output image streams.

21. The multiple stream image creation circuitry of claim 20, wherein said video transmission interface comprises an analog transmission interface;
wherein said at least two respective output image streams comprise at least two respective analog image output streams; and
wherein said multiple stream image creation circuitry further comprises conversion circuitry configured to:
convert said at least two digital image data streams into said at least two respective analog image output streams; and
provide, from said video camera, said at least two respective analog image output streams for transmission without image compression across said video transmission interface to a device.

22. The multiple stream image creation circuitry of claim 21,
wherein one of said at least two digital image data streams comprises a first image having a first resolution and being provided at a first frame rate for transmission without image compression across said video transmission interface;
wherein another of said at least two digital image data streams comprises a second image having a second resolution and being provided at a second frame rate for transmission without image compression across said video transmission interface; and
wherein at least one of:
said first and second resolutions are different, or
said first and second frame rates are different, or
said first image comprises a different portion of said digital image data input stream than said second image, or
a combination thereof.

23. The multiple stream image creation circuitry of claim 22,
wherein said at least one digital image data input stream comprises a digital video signal received from a digital video source; and
wherein said multiple stream image creation circuitry is configured to provide each of said at least two respective analog image output streams as part of an analog video signal for transmission across said analog transmission interface.

24. The multiple stream image creation circuitry of claim 19,
wherein said multiple stream image processing circuitry comprises at least one window circuitry component, at least one image scaler circuitry component, and at least one image mux circuitry component; and
wherein said at least one window circuitry component, at least one image scaler circuitry component, and at least one image mux circuitry component are operably coupled to create said at least two digital image data streams from said at least one digital data input stream, and to convert said at least two digital image data streams into said at least two respective output image streams.

25. The multiple stream image creation circuitry of claim 19,
wherein said multiple stream image processing circuitry further comprises at least one image deconstruction circuit component, at least one alignment data circuitry component, and at least one image mux circuitry component; and wherein said at least one image deconstruction circuit component, at least one alignment data circuitry component, and at least one image mux circuitry component are operably coupled to create said at least two digital image data streams from said at least one digital data input stream, and to convert said at least two digital image data streams into said at least two respective output image streams.

26. The multiple stream image creation circuitry of claim 19,
wherein said multiple stream image processing circuitry further comprises at least one window circuitry component, at least one image scaler circuitry component, at least one image deconstruction circuit component, at least one alignment data circuitry component, and at least one image mux circuitry component; and
wherein said at least one window circuitry component, at least one image scaler circuitry component, at least one image deconstruction circuit component, at least one alignment data circuitry component, and at least one image mux circuitry component are operably coupled to create said at least two digital image data streams from said at least one digital data input stream, and to convert said at least two digital image data streams into said at least two respective output image streams.

27. An image processing system comprising the multiple image creation circuitry of claim 26, and further comprising said device coupled to said multiple image creation circuitry by said video transmission interface, said device configured to:
receive said at least two respective output image streams from across said video transmission interface,
convert each of said at least two received respective analog image output streams into at least one digital image data stream comprising said first image and into at least one digital image data stream comprising said second image; and
at least one of:
store said respective first and second images,
provide said first and second images for simultaneous display, or
a combination thereof,
wherein said device is at least one of a digital video recorder and a display device.

28. An image processing system comprising the multiple image creation circuitry of claim 19, and further comprising a device coupled to said multiple image creation circuitry by said video transmission interface, said device configured to receive said at least two respective output image streams from across said video transmission interface, wherein said device is a at least one of a digital video recorder and a display device.

29. An image processing system comprising the multiple image creation circuitry of claim 23, and further comprising said device coupled to said multiple image creation circuitry by said analog transmission interface, device configured to:
receive said at least two respective analog image output streams as part of said analog video signal from across said analog transmission interface;
convert each of said at least two received respective analog image output streams into at least one digital image data stream comprising said first image and into at least one digital image data stream comprising said second image; and
at least one of store said respective first and second images, provide said first and second images for simultaneous display, or a combination thereof.

30. An image processing system comprising the multiple image creation circuitry of claim 23, and further comprising said device couple to said multiple image creation circuitry by said analog transmission interface,
said device comprising a PC-based digital video recorder configured to:
receive said at least two respective analog image output streams at said device as part of said analog video signal from across said analog transmission interface;
convert each of said at least two received respective analog image output streams into at least one digital image data stream comprising said first image and into at least on digital image data stream comprising said second image;
compress said at least one digital image data stream to form compressed image information; and
further transmit said compressed image information from said device to other viewing stations via a local are network (LAN) or a wide area network (WAN).

31. The image processing system of claim 29, wherein said first and second frame rates are different and wherein said multiple stream image receiving circuitry is further configured to provide said first image for display at said first frame rate while simultaneously providing said second image for display at said second frame rate.

32. The image processing system of claim 29, wherein said first and second resolutions are different and wherein said device is further configured to provide said first image at said first resolution for simultaneous display with said second image at said second resolution.

33. The image processing system of claim 29,
wherein said multiple image creation circuitry is further configured to use scaling to create said first image as a zoomed image prior to converting said at least two digital image data streams into said at least two respective analog image output streams;
wherein said second image is not a zoomed image; and
wherein said device is further configured to provide said zoomed first image for simultaneous display with said second unzoomed image.

34. An image processing system comprising the multiple image creation circuitry of claim 21, and further comprising said device coupled to said multiple image creation circuitry by said analog transmission interface;
wherein said digital image information comprises an original image;
wherein said multiple stream image processing circuitry is further configured to segment at least a part of said original image into at least a first image tile segment comprising a first portion of said original image in a first digital image data stream, and a second image tile segment comprising a second portion of said original image in a second digital image data stream, said first and second portions of said original image being different portions of said original image having a position relative to each other within said original image; and
wherein said device is configured to:
receive said at first and second analog image output streams as part of said analog video signal from across said analog transmission interface,
convert each of said received first and second analog image output streams into respective third and fourth digital image data streams comprising said respective first and second image tile segments, and
reassemble said first and second tile segments from said third and fourth digital data streams to form said at least a part of said original digital image.

35. The multiple stream image creation circuitry of claim 19, wherein said video transmission interface comprises a digital transmission interface.

36. A video camera, comprising:
multiple stream image creation circuitry; and
multiple stream image processing circuitry configured to determine a transmission capacity of a video transmission interface and compare the transmission capacity of the video transmission interface with a capacity of a digital data input stream, said multiple stream image processing circuitry comprising:
at least one window circuitry component configured to extract a selected portion of an original higher resolution image frame from the digital data input stream to form a lower resolution windowed partial image,
at least one image scaler circuitry component configured to scale the lower resolution windowed partial image,
at least one image deconstruction circuit component configured to segment an original image frame into two or more segmented higher resolution frames or tiled higher resolution images,
at least one alignment data circuitry component configured to insert at least one of tile identification information or horizontal alignment information or vertical alignment information into unused lines of said segmented higher resolution frames or tiled higher resolution images, and
at least one image mux circuitry component configured to select either or both of said scaled lower resolution frames from said image scaler circuitry component or said higher resolution tile images from said alignment data circuitry component for transmission without image compression across a video transmission interface that has, based on the comparing, insufficient transmission capacity to transmit the digital image data input stream without image compression.

37. The video camera of claim 36,
wherein said video transmission interface comprises an analog transmission interface; and
wherein said multiple stream image creation circuitry further comprises conversion circuitry coupled between said multiple stream image processing circuitry and said analog transmission interface.

38. An image processing system comprising:
the multiple image creation circuitry of claim 37, and
a device including multiple stream image receiving circuitry coupled to said multiple image creation circuitry of said video camera by said analog transmission interface,
wherein said device is at least one of a digital video recorder and a display device.

39. The image processing system of claim 38, wherein said multiple stream image receiving circuitry comprises a frame grabber and multiple stream image processing circuitry.

40. The image processing system of claim 39, wherein said multiple stream image processing circuitry of said multiple stream receiving circuitry of said digital video recorder comprises:
at least one image reconstruction circuit component configured to reconstruct said segmented higher resolution frames or said tiled higher resolution images back into said original higher resolution image based on said alignment information inserted by said alignment data circuitry component into said unused lines of said segmented higher resolution frames or tiled higher resolution images,
at least one compression circuitry component configured to compress image information received by said multiple stream receiving circuitry of said digital video recorder, and
at least one storage device component configured to store said compressed image information.

41. The image processing system of claim 40, wherein said analog transmission interface comprises a NTSC, PAL or SECAM interface.

42. The image processing system of claim 40, wherein said digital video recorder comprises a PC-based digital video recorder configured to transmit said compressed image information from said digital video recorder to other viewing stations via a local area network (LAN) or a wide area network (WAN).

43. The image processing system of claim 42, wherein said analog transmission interface comprises a NTSC, PAL or SECAM interface.

44. An image processing system, comprising:
a video camera including multiple image creation circuitry;
a digital video recorder including multiple image receiving circuitry; and
a processor configured to determine a transmission capacity of a video transmission interface and compare the transmission capacity of the video transmission interface with a capacity of a digital data input stream;
wherein said video camera is coupled to said digital video recorder by the video transmission interface that has, based on the comparing, insufficient transmission capacity to transmit the digital image data input stream without image compression;
wherein said multiple image creation circuitry comprises multiple image processing circuitry that comprises:
at least one window circuitry component configured to extract a selected portion of an original higher resolution image frame from to form a lower resolution windowed partial image,
at least one image scaler circuitry component configured to scale the lower resolution windowed partial image,
at least one image deconstruction circuit component configured to segment an original image frame into two or more segmented higher resolution frames or tiled higher resolution images,
at least one alignment data circuitry component configured to insert at least one of tile identification information or horizontal alignment information or vertical alignment information into unused lines of said segmented higher resolution frames or tiled higher resolution images, and
at least one image mux circuitry component configured to select either or both of said scaled lower resolution frames from said image scaler circuitry component or said higher resolution tile images from said alignment data circuitry component for transmission without image compression across a video transmission interface from said video camera to said digital video recorder.

45. The image processing system of claim 44, wherein said video transmission interface comprises an analog transmission interface.

46. The image processing system of claim 45, wherein said multiple stream image receiving circuitry comprises a frame grabber and multiple stream image processing circuitry.

47. The image processing system of claim 46, wherein said multiple stream image processing circuitry of said multiple stream receiving circuitry comprises:

at least one image reconstruction circuit component configured to reconstruct said segmented higher resolution frames or said tiled higher resolution images back into said original higher resolution image based on said alignment information inserted by said alignment data circuitry component into said unused lines of said segmented higher resolution frames or tiled higher resolution images, at least one compression circuitry component configured to compress image information received by said multiple stream receiving circuitry of said digital video recorder, and at least one storage device component configured to store said compressed image information.

48. The image processing system of claim 47, wherein said analog transmission interface comprises a NTSC, PAL or SECAM interface.

49. The image processing system of claim 47, wherein said digital video recorder comprises a PC-based digital video recorder configured to transmit said compressed image information from said digital video recorder to other viewing stations via a local are network (LAN) or a wide area network (WAN).

50. The image processing system of claim 49, wherein said analog transmission interface comprises a NTSC, PAL or SECAM interface.

51. A system for processing digital image data, said system comprising image creation circuitry configured to:
determine a transmission capacity of a video transmission interface;
compare the transmission capacity of the video transmission interface with a capacity of said digital image data
process said digital image data in a first processing operation to create first processed image data;
process said digital image data in a second processing operation to create second processed image data; and
provide, from a video camera, said first and second processed image data for communication together without image compression across a video transmission interface to a device, wherein said video transmission interface has, based on the comparing, insufficient transmission capacity to transmit said digital image data without image compression;
wherein at least one of:
said first processed image data has an image resolution that is different from an image resolution of said second processed image data, or
said first processed image data being provided for communication across said interface at an image frame rate that is different from an image frame rate at which said second processed image data is provided for communication across said interface, or
said first processed image data comprises a different portion of said digital image data than said second processed image data, or
a combination thereof.

52. The system of claim 51, further comprising image receiving circuitry configured to:
receive said first and second processed image data together from across said video transmission interface; and
at least one of display or store said first and second processed image data on said device, wherein said device is at least one of a digital video recorder and a display device.

53. The system of claim 52,
wherein said video transmission interface comprises an analog transmission interface;
wherein said image creation circuitry is further configured to convert said first and second processed image data to respective first and second analog image information for communication together from said video camera across said analog transmission interface;
and wherein said image receiving circuitry is further configured to convert said first and second analog image information back into said respective first and second processed image data after receiving said first and second analog image information at said device from said video camera across said analog transmission interface.

54. The system of claim 53, wherein said video transmission comprises a bandwidth-limited analog transmission interface.

55. The system of claim 53, wherein each of said first and second processing operations comprises at least one of an image scaling operation, an image windowing operation, an image deconstruction operation, or a combination thereof.

56. The system of claim 53, wherein each of said first processed image data and said second processed image data comprises a windowed image, a scaled image, or a image tiled segment.

57. The system of claim 51, wherein said image creation circuitry is further configure to process said digital image data in a third processing operation to create third processed image data; and
wherein at least one of:
said third processed image resolution that is different from an image resolution of said first and second processed image data, or
said third processed image provided for communication across said interface at an image frame rate that is different from image frame rates at which said first and second processed image data are provided for communication across said video transmission interface, or
said third processed image data comprises a different portion of said digital image data than said first and second processed image data, or
a combination thereof.

58. The method of claim 5, further comprising:
receiving said at least two respective analog image output streams at said device as part of said analog video signal from across said analog transmission interface;
converting each of said at least two received respective analog image output streams into at least one digital image data stream comprising said first image and into at least one digital image data stream comprising said second image;
compressing said at least one digital image data stream in said device to form compressed image information; and
further transmitting said compressed image information from said device to other viewing stations via a local area network (LAN) or a wide area network (WAN),
wherein said device comprises a video recorder.

* * * * *

UNITED STATES PATENT AND TRADEMARK OFFICE
CERTIFICATE OF CORRECTION

PATENT NO.         : 7,995,652 B2                                         Page 1 of 2
APPLICATION NO.    : 10/804478
DATED              : August 9, 2011
INVENTOR(S)        : Richard G. Washington It is certified that error appears in the above-identified patent and that said Letters Patent is hereby corrected as shown below:

Title Pg, Item (57) Line 8-9, Abstract
  Insert --to-- before "obtain useful information from digitally zoomed and enhanced video."

Col. 1, Line 4
  Insert --copending-- before "U.S. Provisional patent application"

Col. 26, Line 35
   Delete "11-11D"
   Insert --11A-11D--

Col. 35, Line 33
   Insert --:-- after "implemented)"

Col. 42, Line 53
   Delete "SD"
   Insert --5D--

Col. 46, Line 29-30
   Delete "aquivalents"
   Insert --equivalents--

Col. 46, Line 31
   Delete "claim"
   Insert --claims--

Col. 47, Line 32
   Insert --.-- at end of claim.

Signed and Sealed this
Twenty-seventh Day of December, 2011

David J. Kappos
*Director of the United States Patent and Trademark Office*

Col. 49, Line 37
    Insert --.-- at end of claim.